US011734393B2

(12) United States Patent
Marking et al.

(10) Patent No.: US 11,734,393 B2
(45) Date of Patent: Aug. 22, 2023

(54) CONTENT DISTRIBUTION WITH RENEWABLE CONTENT PROTECTION

(71) Applicant: Secure Content Storage Association LLC, Beaverton, OR (US)

(72) Inventors: Aaron Marking, Portland, OR (US); Jeffrey B. Lotspiech, Henderson, NV (US); Kenneth Goeller, Los Angeles, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 1133 days.

(21) Appl. No.: 14/995,114

(22) Filed: Jan. 13, 2016

(65) Prior Publication Data
US 2016/0171186 A1 Jun. 16, 2016

Related U.S. Application Data

(63) Continuation-in-part of application No. 14/341,569, filed on Jul. 25, 2014, now abandoned, which is a
(Continued)

(51) Int. Cl.
*G06F 21/10* (2013.01)
*H04L 9/08* (2006.01)
(Continued)

(52) U.S. Cl.
CPC ............ *G06F 21/10* (2013.01); *G06F 3/0482* (2013.01); *H04L 9/0861* (2013.01);
(Continued)

(58) Field of Classification Search
CPC .............................. H04L 9/0861; G06F 21/10
See application file for complete search history.

(56) References Cited

U.S. PATENT DOCUMENTS 4,510,572 A 4/1985 Reece et al.
4,577,289 A 3/1986 Comerford et al.
(Continued)

FOREIGN PATENT DOCUMENTS

CA 2619962 A1 * 3/1998 ............. G06F 21/10
CN 1365056 8/2002
(Continued)

OTHER PUBLICATIONS

Peyravian, Mohammad, Allen Roginsky, and Nevenko Zunic. "Methods for preventing unauthorized software distribution." Computers & Security 22.4 (2003): 316-321. Retrieved from the Internet on Mar. 11, 2023. Retrieved from: URL:<https://doi.org/10.1016/S0167-4048(03)00411-5>. (Year: 2003).*

(Continued)

*Primary Examiner* — Hajime Rojas
*Assistant Examiner* — Monica A Mandel
(74) *Attorney, Agent, or Firm* — Gates & Cooper LLP

(57) ABSTRACT

A method and apparatus for playing back a media content instance is disclosed. The method permits the use of downloadable variants to upgrade or change cryptographic functions performed by the playback device, thus permitting content protection schemes to be renewed.

21 Claims, 38 Drawing Sheets

Related U.S. Application Data continuation of application No. 13/207,914, filed on Aug. 11, 2011, now Pat. No. 8,793,762, which is a continuation-in-part of application No. 12/839,105, filed on Jul. 19, 2010, and a continuation-in-part of application No. 12/713,111, filed on Feb. 25, 2010, now abandoned, and a continuation-in-part of application No. 12/369,708, filed on Feb. 11, 2009, now Pat. No. 8,775,811, said application No. 12/713,111 is a continuation-in-part of application No. 10/945,623, filed on Sep. 20, 2004, now abandoned, application No. 14/995,114 is a continuation-in-part of application No. 12/839,105, filed on Jul. 19, 2010.

(60) Provisional application No. 61/372,695, filed on Aug. 11, 2010, provisional application No. 61/226,421, filed on Jul. 17, 2009, provisional application No. 61/159,054, filed on Mar. 10, 2009, provisional application No. 61/155,489, filed on Feb. 25, 2009, provisional application No. 61/148,295, filed on Jan. 29, 2009, provisional application No. 61/096,686, filed on Sep. 12, 2008, provisional application No. 61/082,404, filed on Jul. 21, 2008, provisional application No. 61/027,757, filed on Feb. 11, 2008.

(51) Int. Cl.

| | | |
|---|---|---|
| *G06F 3/0482* | (2013.01) | |
| *H04L 67/1061* | (2022.01) | |
| *H04N 21/00* | (2011.01) | |
| *H04N 21/4405* | (2011.01) | |
| *H04L 67/104* | (2022.01) | |
| *H04N 21/254* | (2011.01) | |
| *H04N 21/433* | (2011.01) | |
| *H04N 7/16* | (2011.01) | |
| *H04L 67/1097* | (2022.01) | |
| *H04N 21/4627* | (2011.01) | |
| *H04L 67/01* | (2022.01) | |
| *H04L 67/50* | (2022.01) | |
| *H04L 9/40* | (2022.01) | |

(52) U.S. Cl.
CPC .......... *H04L 63/0428* (2013.01); *H04L 63/08* (2013.01); *H04L 63/126* (2013.01); *H04L 67/01* (2022.05); *H04L 67/104* (2013.01); *H04L 67/1061* (2013.01); *H04L 67/1097* (2013.01); *H04L 67/535* (2022.05); *H04N 7/16* (2013.01); *H04N 21/00* (2013.01); *H04N 21/2541* (2013.01); *H04N 21/4334* (2013.01); *H04N 21/4405* (2013.01); *H04N 21/4627* (2013.01); *H04L 63/061* (2013.01)

(56) References Cited

U.S. PATENT DOCUMENTS

| | | |
|---|---|---|
| 5,204,897 A | 4/1993 | Wyman |
| 5,646,923 A | 7/1997 | Shea |
| 5,742,757 A | 4/1998 | Hamadani et al. |
| 5,828,843 A | 10/1998 | Grimm et al. |
| 5,870,543 A | 2/1999 | Ronning |
| 5,956,716 A | 9/1999 | Kenner et al. |
| 5,974,544 A * | 10/1999 | Jeffries ............. G11B 20/1883 714/E11.088 |
| 6,029,259 A | 2/2000 | Sollish et al. |
| 6,092,195 A | 7/2000 | Nguyen |
| 6,141,010 A | 10/2000 | Hoyle |
| 6,161,052 A | 12/2000 | Charlton et al. |
| 6,236,727 B1 * | 5/2001 | Ciacelli ............. G11B 20/0021 380/212 |
| 6,253,193 B1 | 6/2001 | Ginter et al. |
| 6,289,292 B1 | 9/2001 | Charlton et al. |
| 6,516,337 B1 | 2/2003 | Tripp et al. |
| 6,557,125 B1 | 4/2003 | Rochat et al. |
| 6,577,324 B1 | 6/2003 | Palmer et al. |
| 6,654,904 B1 | 11/2003 | Andoh et al. |
| 6,668,304 B1 | 12/2003 | Satran et al. |
| 6,701,528 B1 | 3/2004 | Arsenault et al. |
| 6,775,817 B2 | 8/2004 | Ono et al. |
| 6,782,458 B1 | 8/2004 | Noble |
| 6,850,379 B2 | 2/2005 | Andoh et al. |
| 6,862,704 B1 | 3/2005 | Miner |
| 6,904,059 B1 | 6/2005 | Newson et al. |
| 6,944,735 B2 | 9/2005 | Noble |
| 6,961,853 B2 * | 11/2005 | Marshall ............. H04N 1/32144 713/176 |
| 7,017,044 B1 | 3/2006 | Carpenter et al. |
| 7,027,460 B2 | 4/2006 | Iyer et al. |
| 7,032,000 B2 | 4/2006 | Tripp |
| 7,058,819 B2 * | 6/2006 | Okaue ............. G11B 20/00086 380/201 |
| 7,076,468 B2 | 7/2006 | Hillegass et al. |
| 7,089,420 B1 | 8/2006 | Durst et al. |
| 7,092,953 B1 * | 8/2006 | Haynes ............. G06F 16/93 707/999.102 |
| 7,103,574 B1 | 9/2006 | Peinado et al. |
| 7,155,415 B2 | 12/2006 | Russell et al. |
| 7,165,050 B2 | 1/2007 | Marking |
| 7,181,017 B1 | 2/2007 | Nagel et al. |
| 7,181,620 B1 | 2/2007 | Hur |
| 7,278,165 B2 | 10/2007 | Molaro |
| 7,290,057 B2 | 10/2007 | Saunders et al. |
| 7,299,328 B2 | 11/2007 | Noble |
| 7,330,980 B2 * | 2/2008 | Nasu ............. H04N 5/913 380/28 |
| 7,346,170 B2 * | 3/2008 | Asano ............. H04L 9/0822 380/278 |
| 7,463,739 B2 * | 12/2008 | Couillard ............. H04L 9/0822 380/284 |
| 7,493,494 B2 | 2/2009 | Bondurant |
| 7,496,540 B2 | 2/2009 | Irwin et al. |
| 7,562,270 B2 | 7/2009 | Andoh |
| 7,584,258 B2 | 9/2009 | Maresh |
| 7,584,285 B2 | 9/2009 | Hudson et al. |
| 7,594,275 B2 | 9/2009 | Zhu et al. |
| 7,639,849 B2 | 12/2009 | Kimpe et al. |
| 7,644,172 B2 | 1/2010 | Stewart et al. |
| 7,653,928 B2 | 1/2010 | Almstrand et al. |
| 7,664,109 B2 | 2/2010 | Li |
| 7,716,302 B2 | 5/2010 | Maze et al. |
| 7,725,557 B2 | 5/2010 | Klemets et al. |
| 7,809,219 B2 | 10/2010 | KiliC et al. |
| 7,949,913 B2 | 5/2011 | Norrod et al. |
| 8,037,202 B2 | 10/2011 | Yeager et al. |
| 8,095,988 B2 | 1/2012 | Un et al. |
| 8,321,584 B2 | 11/2012 | Dobbins |
| 8,724,408 B2 | 5/2014 | Ho et al. |
| 8,775,811 B2 | 7/2014 | Marking et al. |
| 9,213,846 B2 | 12/2015 | Asipov |
| 2001/0013099 A1 | 8/2001 | Haruki |
| 2001/0016836 A1 * | 8/2001 | Boccon-Gibod .. G06Q 20/3829 705/51 |
| 2002/0023248 A1 | 2/2002 | Suzuki et al. |
| 2002/0040436 A1 * | 4/2002 | Davis ............. G06F 21/10 713/189 |
| 2002/0049760 A1 | 4/2002 | Scott et al. |
| 2002/0052053 A1 | 5/2002 | Ono et al. |
| 2002/0056118 A1 | 5/2002 | Hunter et al. |
| 2002/0114456 A1 | 8/2002 | Sako |
| 2002/0122266 A1 | 9/2002 | Andoh et al. |
| 2002/0150251 A1 | 10/2002 | Asano et al. |
| 2002/0199099 A1 * | 12/2002 | Shirai ............. G11B 20/00086 713/160 |
| 2003/0018895 A1 | 1/2003 | Morrison |
| 2003/0023427 A1 | 1/2003 | Cassin et al. |
| 2003/0046587 A1 | 3/2003 | Bheemarasetti et al. |
| 2003/0056101 A1 | 3/2003 | Eptstein |
| 2003/0063405 A1 | 4/2003 | Jin et al. |

(56) References Cited

U.S. PATENT DOCUMENTS

| | | |
|---|---|---|
| 2003/0110503 A1 | 6/2003 | Perkes |
| 2003/0118014 A1 | 6/2003 | Iyer et al. |
| 2003/0118208 A1 | 6/2003 | Epstein |
| 2003/0121047 A1 | 6/2003 | Watson et al. |
| 2003/0131251 A1 | 7/2003 | Fetkovich |
| 2003/0140088 A1 | 7/2003 | Robinson et al. |
| 2003/0145093 A1 | 7/2003 | Oren et al. |
| 2003/0149670 A1 | 8/2003 | Cronce |
| 2003/0163372 A1 | 8/2003 | Kolsy |
| 2003/0187679 A1 | 10/2003 | Odgers et al. |
| 2003/0229789 A1 | 12/2003 | Morais et al. |
| 2003/0236906 A1 | 12/2003 | Klemets et al. |
| 2003/0236907 A1 | 12/2003 | Stewart et al. |
| 2004/0003398 A1 | 1/2004 | Donian et al. |
| 2004/0024688 A1 | 2/2004 | Bi et al. |
| 2004/0025025 A1 | 2/2004 | Venkatesan et al. |
| 2004/0039834 A1 | 2/2004 | Saunders et al. |
| 2004/0091114 A1 | 5/2004 | Carter et al. |
| 2004/0103305 A1 | 5/2004 | Ginter et al. |
| 2004/0139024 A1* | 7/2004 | So .................. G06Q 20/401 705/51 |
| 2004/0167857 A1 | 8/2004 | Baker et al. |
| 2004/0193900 A1 | 9/2004 | Nair |
| 2004/0196981 A1 | 10/2004 | Nakano et al. |
| 2004/0199604 A1 | 10/2004 | Dobbins et al. |
| 2004/0225894 A1 | 11/2004 | Colvin |
| 2004/0255079 A1 | 12/2004 | Noble |
| 2005/0010531 A1 | 1/2005 | Kushalnagar et al. |
| 2005/0013589 A1* | 1/2005 | Shah ................ G11B 20/00731 386/231 |
| 2005/0015466 A1 | 1/2005 | Tripp |
| 2005/0027871 A1 | 2/2005 | Bradley et al. |
| 2005/0027996 A1 | 2/2005 | Wittkoter |
| 2005/0050218 A1 | 3/2005 | Sheldon |
| 2005/0055214 A1 | 3/2005 | Kirovski et al. |
| 2005/0060745 A1 | 3/2005 | Riedl et al. |
| 2005/0078822 A1* | 4/2005 | Shavit ................... G06F 21/10 380/201 |
| 2005/0086480 A1 | 4/2005 | Kerr et al. |
| 2005/0108541 A1 | 5/2005 | Yacobi et al. |
| 2005/0149687 A1 | 7/2005 | Adelmann |
| 2005/0149759 A1 | 7/2005 | Vishwanath et al. |
| 2005/0177624 A1 | 8/2005 | Oswald et al. |
| 2005/0188214 A1 | 8/2005 | Worley et al. |
| 2005/0204038 A1 | 9/2005 | Medvinsky et al. |
| 2005/0216772 A1 | 9/2005 | Noble |
| 2006/0007947 A1 | 1/2006 | Li et al. |
| 2006/0059383 A1 | 3/2006 | Roohparvar |
| 2006/0064386 A1 | 3/2006 | Marking |
| 2006/0085343 A1 | 4/2006 | Lisanke et al. |
| 2006/0161776 A1 | 7/2006 | Van Der Veen et al. |
| 2006/0177096 A1 | 8/2006 | Malik et al. |
| 2006/0200414 A1 | 9/2006 | Roberts |
| 2006/0218620 A1 | 9/2006 | Nadarajah et al. |
| 2006/0262147 A1 | 11/2006 | Kimpe et al. |
| 2006/0282676 A1 | 12/2006 | Serret-Avila et al. |
| 2007/0025694 A1 | 2/2007 | Takashima et al. |
| 2007/0098156 A1 | 5/2007 | Blythe |
| 2007/0124602 A1 | 5/2007 | Wald et al. |
| 2007/0174564 A1 | 7/2007 | Andoh |
| 2007/0180153 A1 | 8/2007 | Cornwell et al. |
| 2007/0233933 A1 | 10/2007 | Wang et al. |
| 2007/0299845 A1 | 12/2007 | Tokunaga |
| 2008/0133938 A1 | 6/2008 | Kocher et al. |
| 2008/0279376 A1 | 11/2008 | Jin et al. |
| 2008/0289044 A1 | 11/2008 | Choi |
| 2008/0301456 A1 | 12/2008 | Staring et al. |
| 2009/0013195 A1 | 1/2009 | Ochi et al. |
| 2009/0022324 A1 | 1/2009 | Inokuchi et al. |
| 2009/0049257 A1 | 2/2009 | Khatri et al. |
| 2009/0049351 A1 | 2/2009 | Norrod et al. |
| 2009/0094453 A1 | 4/2009 | Bradley et al. |
| 2009/0158044 A1 | 6/2009 | Kirovski |
| 2009/0204778 A1 | 8/2009 | Marking et al. |
| 2009/0282432 A1 | 11/2009 | Hahnefeld et al. |
| 2009/0300413 A1 | 12/2009 | Chang et al. |
| 2010/0002876 A1 | 1/2010 | Sugie et al. |
| 2010/0088750 A1 | 4/2010 | Okamoto et al. |
| 2010/0142543 A1 | 6/2010 | Shaikh et al. |
| 2010/0218000 A1 | 8/2010 | Marking et al. |
| 2010/0228983 A1 | 9/2010 | Killian et al. |
| 2010/0246810 A1 | 9/2010 | Srinivasan et al. |
| 2010/0251044 A1 | 9/2010 | Khatri et al. |
| 2010/0299458 A1 | 11/2010 | Marking et al. |

FOREIGN PATENT DOCUMENTS

| | | |
|---|---|---|
| CN | 1639694 | 7/2005 |
| EP | 0610623 | 8/1994 |
| EP | 0644474 | 3/1995 |
| EP | 0917132 | 5/1999 |
| EP | 0930560 | 7/1999 |
| GB | 2342488 | 4/2000 |
| JP | 60-145501 | 8/1985 |
| JP | 07-325712 | 12/1995 |
| JP | 08-129828 | 5/1996 |
| JP | 11-265545 | 9/1999 |
| JP | 2001-101083 | 4/2001 |
| JP | 2002-009754 | 1/2002 |
| JP | 2002-518784 | 6/2002 |
| JP | 2003-151209 | 5/2003 |
| JP | 2003-263371 | 9/2003 |
| JP | 2007-43336 | 2/2007 |
| WO | 9962022 | 12/1999 |
| WO | 2000-56059 | 9/2000 |
| WO | 0219589 | 3/2002 |
| WO | 0229510 | 4/2002 |
| WO | 2003-075163 | 9/2003 |
| WO | 2006-077850 | 7/2006 |
| WO | 2007-072372 | 6/2007 |
| WO | 2008-034726 | 3/2008 |
| WO | 2010-099351 | 9/2010 |

OTHER PUBLICATIONS

PCT International Search Report and Written Opinion dated Jun. 3, 2009, PCT App. No. PCT/US2009/33841.
Chinese Office Action (with English translation) dated Dec. 4, 2012 for CN App. No. 200980113396.8.
Extended European Search Report dated Jan. 3, 2013 for EP App. No. 09710597.7.
Japanese Office Action (with English translation) dated Apr. 2, 2013 for JP App. No. 2011-552162.
Extended European Search Report dated Jul. 29, 2013 for EP App. No. 10800679.2.
Japanese Office Action (with English translation) dated Aug. 20, 2013 for JP App. No. 2010-546108.
Japanese Office Action (with English translation) dated Sep. 10, 2013 for JP App. No. 2012-520841.
Chinese Office Action (with English translation) dated Oct. 14, 2013 for CN App. No. 200980113396.8.
Extended European Search Report dated Oct. 16, 2013 for EP App. No. 10746857.1.
Chinese Office Action (with English translation) dated Nov. 29, 2013 for CN App. No. 2010-80018992.0.
Japanese Office Action dated Feb. 18, 2014 for JP App. No. 2012-520841.
Japanese Office Action (with English translation) dated Mar. 4, 2014 for JP App. No. 2011-552162.
European Examination Report dated Mar. 10, 2014 for EP App. No. 10800679.2.
Chinese Office Action dated Mar. 27, 2014 for CN App. No. 201080039520.3.
"Of." Webster's Third New International Dictionary, Unabridged, Merriam-Webster, Incorporated, 1993. [online] [retrieved on Apr. 9, 2011], Retrieved from: <http://lionreference.chadwyck.com/searchFulltext.do?id=23720595&idType=offset&divLevel=2&queryID=../session/1302503939_28935&area=mwd&forward=refshelf&trail=refshelf >.

(56) References Cited

OTHER PUBLICATIONS

Arnold, et al., "Real-time Concepts for Block-based Watermarking Schemes", 2002, IEEE.
PCT International Search Report and Written Opinion dated Dec. 22, 2011, PCT App. No. PCT/US2011/047459.
PCT International Search Report & Written Opinion dated Sep. 7, 2010 for PCT Patent Application No. PCT/US2010/042483.
CA Office Action dated Aug. 5, 2015 for Canadian App. No. 2,714,680.
Chinese Office Action dated Jun. 27, 2014 for CN App. No. 200980113396.8.
Notice of Allowance dated Apr. 3, 2020 for U.S. Appl. No. 12/839,105.
Non-Final Office Action dated Dec. 22, 2022 for U.S. Appl. No. 16/989,668.

\* cited by examiner

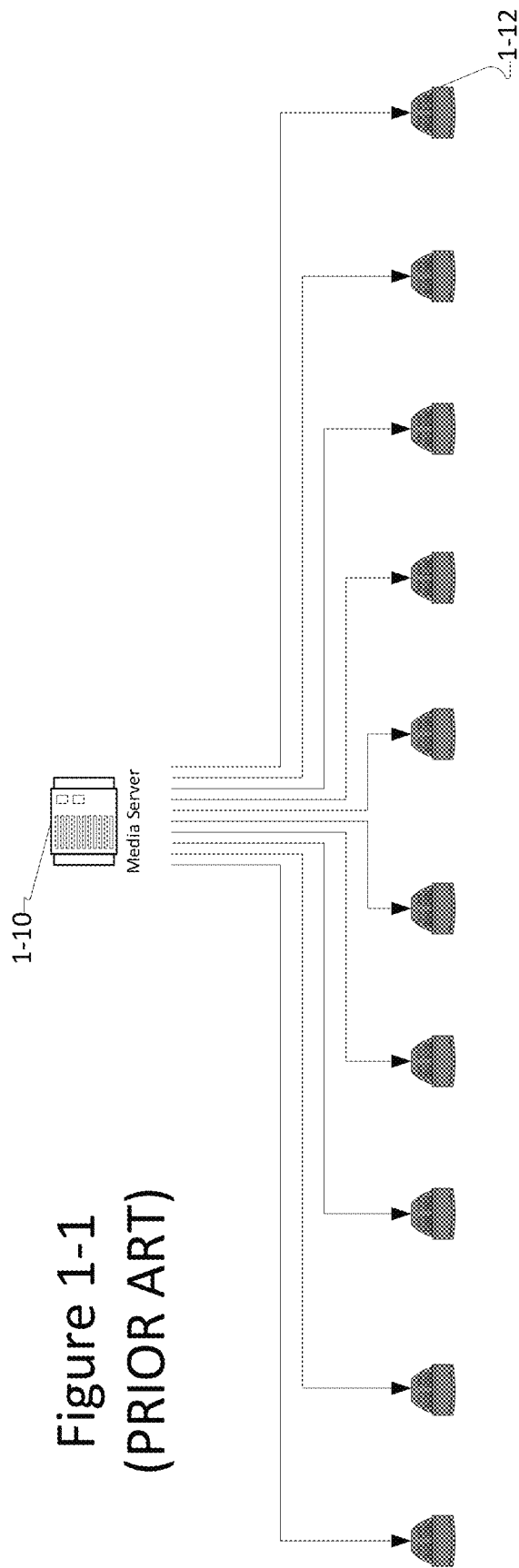

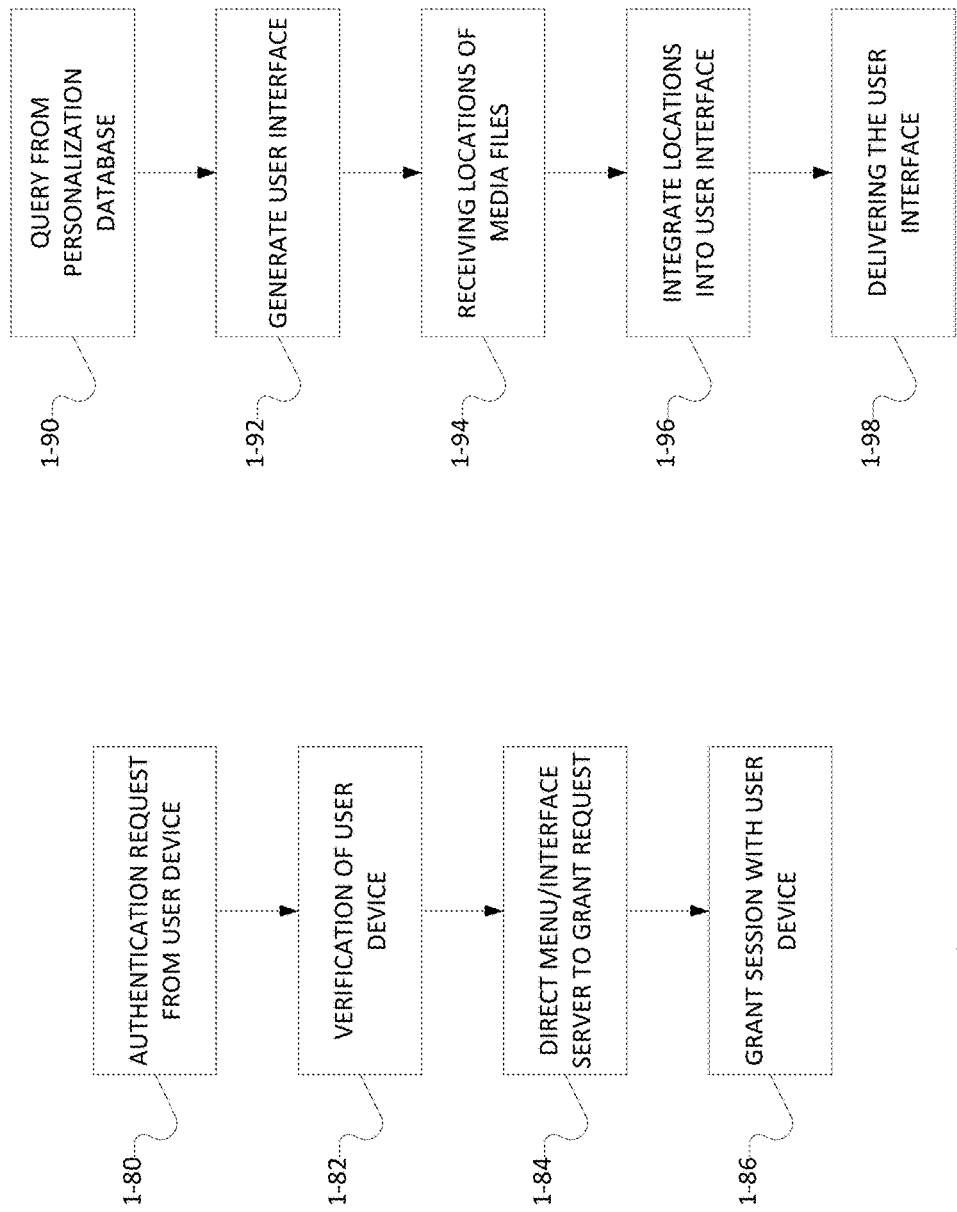

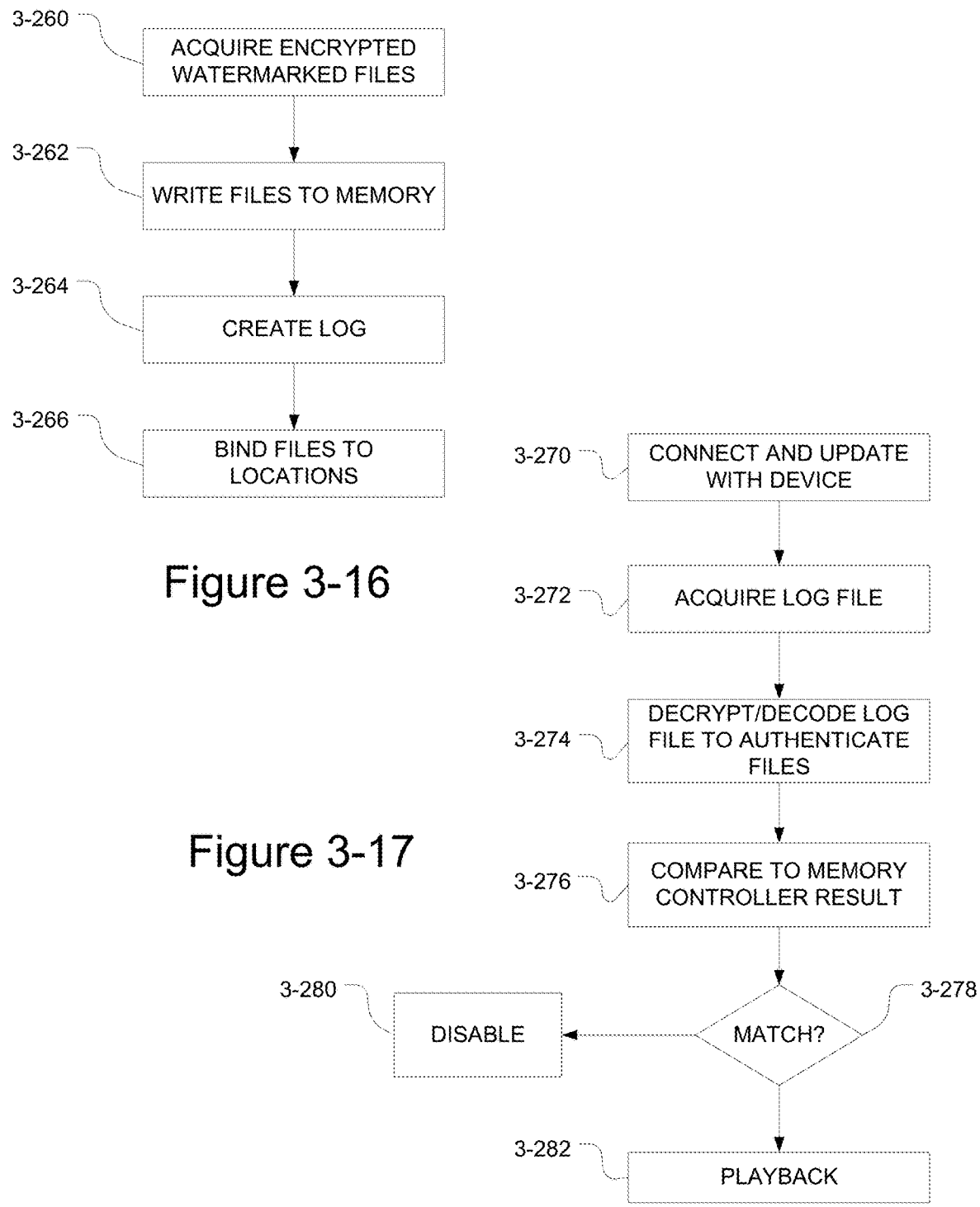

CONTENT DISTRIBUTION WITH RENEWABLE CONTENT PROTECTION

CROSS-REFERENCE TO RELATED APPLICATIONS

This application is a continuation-in-part of U.S. patent application Ser. No. 14/341,569, entitled "SIMPLE NON-AUTONOMOUS PEERING NETWORK MEDIA," by Aaron Marking et al., filed Jul. 25, 2014, which application is:

a continuation of U.S. patent application Ser. No. 13/207,914, entitled "SIMPLE NONAUTONOMOUS PEERING NETWORK MEDIA," by Aaron Marking et al., filed Aug. 11, 2011, now issued as U.S. Pat. No. 8,793,762, which application claims benefit of U.S. Provisional Patent Application No. 61/372,695, entitled "SIMPLE NONAUTONOMOUS PEERING NETWORK MEDIA," by Aaron Marking et al., filed Aug. 11, 2010, and which application is a continuation in part of the following U.S. patent applications:

- U.S. patent application Ser. No. 12/839,105, entitled "SIMPLE NONAUTONOMOUS PEERING MEDIA CLONE DETECTION," by Aaron Marking et al., filed Jul. 19, 2010, which application claims benefit of U.S. Provisional Patent Application No. 61/226,421, entitled "SNAP STRIPING AND BINDING," by Aaron Marking et al., filed Jul. 17, 2009;
- U.S. patent application Ser. No. 12/369,708, entitled "SIMPLE NON-AUTONOMOUS PEERING ENVIRONMENT, WATERMARKING AND AUTHENTICATION," by Aaron Marking et al., filed Feb. 11, 2009, now U.S. Pat. No. 8,775,811, which claims benefit of U.S. Provisional Patent Application Ser. No. 61/027,757, entitled "ENHANCED WATERMARK PATTERNS IN A SNAP ENVIRONMENT," by Aaron Marking, filed Feb. 11, 2008, U.S. Provisional Patent Application Ser. No. 61/082,404, entitled "SIMPLE NON-AUTONOMOUS PEERING," by Aaron Marking, filed Jul. 21, 2008, U.S. Provisional Patent Application Ser. No. 61/096,686, entitled "METHOD OF AUTHENTICATING NON-VOLATILE STORAGE MEDIA USING BAD BLOCKS IDENTIFIED DURING THE POST-MANUFACTURE TESTING PROCESS," by Aaron Marking, filed Sep. 12, 2008, and U.S. Provisional Patent Application Ser. No. 61/148,295, entitled "SIMPLE NON-AUTONOMOUS PEERING BINDING," by Aaron Marking, filed Jan. 29, 2009;
- U.S. patent application Ser. No. 12/713,111, entitled "CONTENT DISTRIBUTION WITH RENEWABLE CONTENT PROTECTION," by Aaron Marking et al., filed Feb. 25, 2010, which application claims benefit of U.S. Provisional Patent Application Ser. No. 61/155,489, entitled "SNAP STRIPING AND BINDING," by Aaron Marking et al., filed Feb. 25, 2009, U.S. Provisional Patent Application Ser. No. 61/159,054, entitled "SNAP STRIPING AND BINDING," by Aaron Marking et al., filed Mar. 10, 2009, and which application is a continuation-in-part of U.S. patent application Ser. No. 10/945,623, entitled "MEDIA ON DEMAND VIA PEERING," by Aaron Marking, filed Sep. 20, 2004, now abandoned.

This application is also a continuation-in-part of U.S. patent application Ser. No. 12/839,105, entitled "SIMPLE NONAUTONOMOUS PEERING MEDIA CLONE DETECTION," by Aaron Marking et al., filed Jul. 19, 2010, and which application claims benefit of U.S. Provisional Patent Application No. 61/226,421, entitled "SNAP STRIPING AND BINDING," by Aaron Marking et al., filed Jul. 17, 2009;

all of which applications and publications are incorporated by reference herein.

BACKGROUND

1. Technical Field

The present invention relates to systems and methods for providing digital content, and in particular to a system and method for securely providing digital content to consumers.

2. Description of the Related Art

Delivery of media, such as video, music, and pictures, across networks can raise many issues. For example, sharing of digital files, such as music files, led to the situation that arose with Napster™. Owners of the content objected to having their properties being freely distributed with no payments being made to the owners.

Video on demand, such as through cable and satellite providers, may result in issues at the distribution, or head, end. The head end hardware must be extremely robust and the connectivity must be very high, as the content is delivered from one central location. This results in high start up costs, and continued operational costs.

Other types of media distribution, such as rentals, present their own issues. Rental stores must track the outstanding rentals and charge fees for overdue rentals. This decreases consumer satisfaction. Other media distributors, such as NetFlix, may suffer from high costs due to low consumer turnover of the media. Every copy of a movie owned by NetFlix has a cost associated with it. As the users are flat fee users, when a user holds on to one copy of a title for a long time, the profit made from that copy decreases.

The packaging of media content, such as video or audio content, into digital media files has made the exchange of the content very easy and convenient for users. However, users freely exchanging content may violate the content owner's property rights. One area of ensuring that only authorized users are exchanging authorized content is to provide mechanisms to verify platforms, users and content. In one example, the hardware used to receive and playback the content is verified and the hardware may be referred to as being 'trusted.' However, gaps still exist in verification of trusted hardware, allowing pirates and other illegal users to receive and duplicate content files, violating copyrights and committing outright theft.

Content owners also want to restrict the copying of copyright protected content. There are many examples of technologies that make the transfer of copyright protected content very difficult. When physical media is used to store content, permanently or temporarily, for example in electronic purchase, rental and subscription movie service business models, content owners or their licensees use a variety of cryptographic binding methods. These methods typically use a unique media or device identifier or similar player attributes in a cryptographic function to protect the content from being copied or transferred such that it may be said to be bound to the device. Generally, this binding of the content is based upon a particular playback device, which is undesirable for users. Users may want to play their content on a different device than the device that received the content or they may want to transfer it among several personal devices.

As an example of the current art, Blu-ray optical movie discs are protected by a system called Advanced Access Content System (AACS). For some of the cryptographic functions needed in this system (e.g., "AES-H" and "AES-G3"), AACS has defined arbitrary constants. AACS has published the constants they chose. This has turned out to be a boon for attackers reverse-engineering players, because they merely look for the published constants and see where they are referenced to find sensitive cryptographic code, as a first step to finding secret keys.

Of course, it is possible to keep cryptographic constants as confidential information. This was practiced by 4C Entity and their system called Content Protection for Recordable Media (CPRM). However, hundreds of manufacturers and thousands of engineers need to learn the constants, so they do not stay secret for long.

It is recognized by anyone skilled in the art, that exact details of cryptographic calculations are often arbitrary and can be modified without changing the fundamental security of the operation. For example, exclusive-or operations can always be replaced by addition operations. Likewise, secret values can be transformed by constant operations without affecting their secrecy. Modifications such as these, if they remain confidential, offer a significant obstacle to attackers trying to reverse-engineer.

In the prior art, US Application Publication No. 2008/0133938, and U.S. patent Ser. No. 11/981,977, filed Oct. 31, 2007, "Self-protecting digital content," disclose an example of another way to provide renewability. Their approach operates at a much higher level in the system than firmware, and does not allow the changing of low-level cryptographic operations. It does not offer protection against reverse-engineering to find cryptographic keys. It also does not protect against dishonest employees from revealing confidential information.

One approach involves peering of content, where users transfer data amongst themselves. In order to preserve copyrights and to avoid pirating of the content, a 'non-autonomous' peering system may be employed. In contrast to a typically peering system, where users transfer content freely, the system is 'non-autonomous.' Non-autonomous' as used here means that the system includes mechanisms that only allow transfer of the content with the assistance of a centralized authority, while allowing users to transfer media content between their own compliant devices. A peer in this system consists of an end-user owned device acting as the source for a transfer, while in most other systems content resides on a server for downloading.

Examples of a non-autonomous peering system can be found in U.S. Pat. No. 7,165,050, and US Patent Publication No. 20060064386, both titled, "Media on Demand Via Peering." An example of methods of manufacturing and binding components usable in a non-autonomous peering system can be found in U.S. patent application Ser. No. 12/369,708, "Simple Non-Autonomous Environment, Watermarking And Authentication," filed Feb. 2, 2009. U.S. patent application Ser. Nos. 12/369,708, and 12/713,111 discuss the use of a peering system in conjunction with flash memory devices.

The use of peering networks to transfer media files from user to user has many attractive features including speed of access for a requesting user, balancing of bandwidth across the network, and reduction of bandwidth needed at a central content repository. However, users freely exchanging content may violate the content owner's property rights.

With the increasingly less expensive and wide proliferation of flash memory devices, a very real possibility arises of pirates using flash memory devices to clone valid devices originating from the content providers or legitimate users of a peering system. The pirates can reproduce a huge amount of content on cloned devices with very simple hardware and in a very short period of time.

A SNAP player, one that complies with the Simple Non-Autonomous Peering principles set out in the references above, can be used to create a centralized repository for bulk storage of their owned content. While in one regard, centralized bulk storage allows consumers to securely store their content library in one secure, centralized location, this could also be seen as limiting the portability provided by SNAP's media binding methods.

SUMMARY

To address the requirements described above, this document discloses a method and apparatus for playing back a media content instance from a storage device, wherein the media content instance comprises an assembly of media content segments, each segment comprising one of a plurality of versions of a temporal portion of a content title, and each segment decryptable with a different segment key. One embodiment is evidenced by a method comprising communicatively coupling the storage device to a license server, receiving processor instructions and an associated index from the license server, the index designating associated processor instructions for execution to enable playback of the media content instance, generating a segment key for each segment of the media content instance from a plurality of keys at least in part by executing at least a first portion of the processor instructions associated with the index, and decrypting the segments of the media content instance according to the generated segment key associated with each segment. Another embodiment is evidenced by an apparatus comprising a playback device having a processor communicatively coupled to a memory, the memory storing instructions for receiving microcode and an associated index from the license server, the index designating associated microcode for execution to enable playback of the media content instance; generating, using the processor, a segment key for each segment of the media content instance from a plurality of keys at least in part by executing at least a first portion of the microcode associated with the index; and decrypting, using the processor, the segments of the media content instance according to the generated segment key associated with each segment.

BRIEF DESCRIPTION OF THE DRAWINGS

Embodiments of the invention may be best understood by reading the disclosure with reference to the drawings, wherein:

FIG. 1-1 shows a prior art embodiment of a client/server network.

FIG. 1-2 shows a prior art embodiment of a peering network.

FIG. 1-3 shows an embodiment of a non-autonomous peer network.

FIG. 1-4 shows an alternative embodiment of a non-autonomous peer network.

FIG. 1-5 shows a method of propagating data throughout a peer network.

FIG. 1-6 shows an embodiment of a non-autonomous peer network having multiple components.

FIG. 1-7 shows an embodiment of a method to authenticate a user in a non-autonomous peer network.

FIG. 1-8 shows an embodiment of a method to personalize a user interface in a non-autonomous peer network.

FIG. 1-9 shows an embodiment of a method to perform personalization content delivery.

FIG. 1-10 shows an embodiment of a method to deliver licensed content to a user in a non-autonomous peer network.

FIG. 2-1 shows an example of a content distribution system.

FIG. 2-2 shows an embodiment of a renewal process of a content protection scheme.

FIG. 2-3 shows an embodiment of using renewable functions to access secured content on a media device.

FIG. 3-1 shows an example of a media file having multiple instances of globally watermarked versions.

FIG. 3-2 shows an example of a media file being parsed into segments.

FIG. 3-3 shows an example of a data structure for a title schema.

FIG. 3-4 shows an example of a first order expression of a unique instance pattern.

FIG. 3-5 shows an example of a first order expression for three unique instance patterns having different global watermarks.

FIG. 3-6 shows a detailed view of an example of a first order expression.

FIG. 3-7 shows an example result of an interleave attack.

FIG. 3-8 shows an overview of the second order expressions of a unique instance pattern.

FIG. 3-9 shows an example of a hash table hierarchy.

FIGS. 3-10 and 3-11 show a comparison of simple non-autonomous peering pattern expressions and decryption path-based forensic identification methods.

FIG. 3-12 shows an overview of a licensing and authentication system for manufacture and assembly of components of a simple non-autonomous peering compliance process.

FIG. 3-13 shows an example of a method of binding a unique chip identifier to the physical defects of that chip.

FIG. 3-14 shows an example of a method of creating a unique controller identifier for memory controllers.

FIG. 3-15 shows an example of a method to bind a unique controller with a unique set of memory chips.

FIG. 3-16 shows an example of a method of writing a media file to a memory device that complies with simple non-autonomous peering.

FIG. 3-17 shows an example of a method to validate a media file in a memory device.

FIG. 3-18 shows an example of a transaction between a host device requesting download of content under control of the SNAP licensing authority.

FIG. 3-19 shows an example of a host device requesting to decrypt downloaded content.

FIG. 3-20 shows an example of a host device authenticating content on a memory device.

FIG. 3-21 shows an example of a host device playing content from a memory device.

FIG. 4-1 shows an embodiment of a playback device capable of playing content from a memory device.

FIG. 4-2 shows an embodiment of a flash memory device having a predefined region.

FIG. 4-3 shows an embodiment of a method of validating a flash memory device.

FIG. 5-1 shows an embodiment of a network playback device capable of playing content from a memory device either locally or via a SNAP network.

FIG. 5-2 shows an embodiment of a SNAP device having an included display, as well as video outputs and a network connection.

FIG. 5-3 shows an embodiment of a SNAP secure network of two devices.

FIG. 5-4 shows an embodiment of a playback device detecting a local content memory device and presenting a user interface.

FIG. 5-5 shows an embodiment of a playback device locating and displaying content stored on a network content memory device connected to a different playback device in the SNAP secure network.

FIG. 5-6 shows a SNAP playback device initiating playback of content stored on a network content memory device.

FIG. 6-1 is a diagram illustrating firmware renewal.

FIG. 6-2 is a diagram illustrating a content preparation use case.

FIG. 6-3 is a diagram illustrating a download use case.

DETAILED DESCRIPTION OF THE EMBODIMENTS

In the following description, reference is made to the accompanying drawings which form a part hereof, and which is shown, by way of illustration, several embodiments. It is understood that other embodiments may be utilized and structural changes may be made without departing from the scope of the present disclosure.

I. Media on Demand Via Peering

Figures 1, 2:
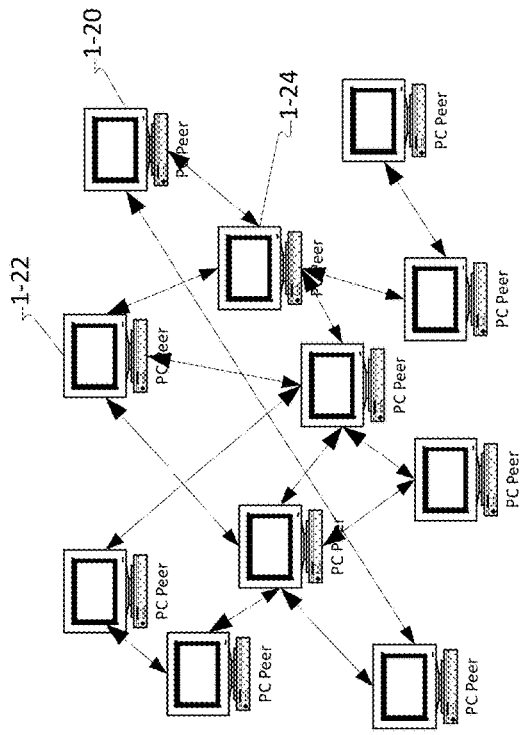

FIG. 1-1 shows a traditional client/server type of media-on-demand network. A central server 1-10, which may be a regional server or local hub as well, delivers the content to the requesting user such as 1-12. The distribution hardware must be very robust so as to not fail in the middle of media content delivery, and the connection between the requesting user device and the central server must remain stable. The distribution hardware must also be able to support multiple concurrent users. In order to ensure this reliability, the components are generally expensive. This results in high startup costs, scaling costs to expand the network, and high, continuing operational costs.

As an alternative, a peering network uses each user device as a miniature server. The term 'server' as used here does not necessarily mean a separate, dedicated device as is implied by the prior art. A server could be one device upon which multiple functions are running, and so will be referred to here as a module. A media module and a license module may both be processes running on the same device, although they may be referred to separately here, for ease of discussion. Each miniature module such as 1-20, 1-22 and 1-24, shares storage and bandwidth resources. This mitigates the head end bandwidth and scaling problems.

As seen by examples such as NAPSTER and KAZAA, the ability to abuse the rights of the content owners is also enabled. Media license owners have come to view these types of networks with suspicion. Indeed, the very distributed nature of peering PC-based networks that allows the fast delivery of content also may make it vulnerable to hacking. There is no centralized server to authenticate users and validate the media being exchanged. Piracy becomes commonplace and the quality of the media varies greatly.

Figures 1, 2, 3:
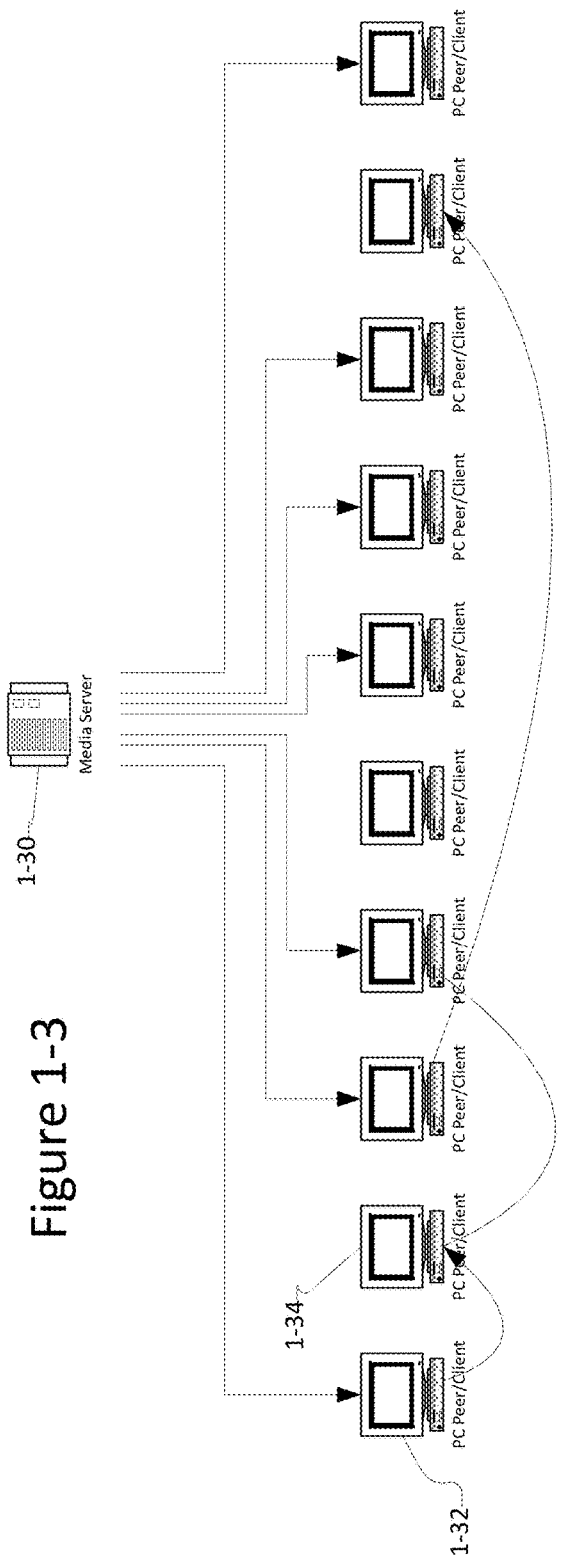

FIG. 1-3 shows an example of a non-autonomous network. Non-autonomous, as used here, indicates a network that cannot function in the manner of a true peer-to-peer network. Participation in the network as a peer server, as well as access to the content available from peers and centralized storage, is done through a centralized authentication process. However, once a user device is validated, it can become a peer server. In addition, each transaction can be validated to further ensure that only verified devices can receive downloads.

While transactions are centrally validated and initiated, it must be understood that there is also a large measure of anonymity. No user knows from where the content is coming, or to where it is being sent. Users will only know that they are receiving verified downloads and possibly sending content to other users.

For example, once device 1-32 requests a download of content, and the device has been validated by the media module 1-30, the content is downloaded to 1-32. Further on in the operation of the network, if device 1-34 requests a download and is verified, device 1-34 may receive the download from peer 1-32, at least in part. As the device 1-32 may be local to device 1-34, the peer download may occur more quickly than the download from the media module 1-30. As will be discussed in more detail further, there may be several peers similar to 1-32 that are transmitting data to peer 1-34.

The devices of FIG. 1-3 are shown as being personal computers. In an alternative embodiment, shown in FIG. 1-4, the peer devices 1-42 and 1-44 could be television set top boxes. The set top boxes (STBs) may also include digital video recorders (DVRs), such as TiVO®, or RePlayTV™ boxes. A network already connects these devices, which may be the Internet. Each device has its own network address, more than likely an Internet Protocol (IP) address and a connection to the Internet. This network also already has some centralized control, by the subscription management system within the media module system 1-40. In addition, the devices could be one of many media devices, such as music players, video games, etc.

As mentioned previously one embodiment of the invention uses 'shotgun' downloading, where each media file desired by a user is divided into predefined segments, such as by time, and the segments are received from several different peers. In this manner, the bandwidth needed to download content in such a system is vastly reduced when compared to a traditional client/server download. For example, consider 10 users each desiring the same 10 Megabyte (MEG) download. This results in a requirement of 100 MEGs of bandwidth. Add on top of that an overhead value for transactional instructions. For ease of discussion, 100 kilobytes (100 K) will be assumed. The overall requirement is 2*100K*10, which equals 2 MEG, plus the 100 MEGs of data to be downloaded. The bandwidth necessary is therefore 102 MEG. The need for concurrent download capability such that each user is requesting their data at the same time places a large bandwidth load on the system.

In contrast, a shotgun download from peers that have previously received the file reduces the amount of bandwidth required. As can be seen in FIG. 1-5, the first two peers to receive the file, 1-52 and 1-54, then act as servers to transmit it to other peers when requested, such as peers 1-56 and 1-58. The same file can be downloaded 10 times but only require 20 MEGs of download bandwidth, plus 3*100K*10, for transactional instructions. The same download therefore only requires 23 Megs of bandwidth. The ability to serve several different users concurrently with relatively low bandwidth is a large advantage of this approach.

The network diagrams of FIGS. 1-4 and 1-5 are simplified for ease of discussion. The network may have several different types of modules and databases distributed throughout it. Examples of other possible components of the network are shown in FIG. 1-6. As discussed previously, the user of the term 'server' does not necessarily imply a device running server software. The server may be a process running in parallel or series with other processes on the same device, as well as a logical layer in a database. Essentially, a server here is a functionality provided in whatever means the system designer desires and is used interchangeably with module.

Generally, the network has a media module 1-60 and a network of user media devices, such as set top box 1-62. The set top box would have storage for storing media content, a processor, a communications port to allow the processor to interact with the network, which may include exchange of data with other boxes on the network, and a media port to allow the processor to deliver the media content, such as a speaker port or a display port. The media module would then be operable to authenticate each device to allow it to receive content and control download of media to a requesting one of the devices, such as 1-62, wherein control includes an ability to direct other devices to transfer media content to the requesting device.

A license module 1-72 may exist in the network. It may maintain a database of decryption keys allowing the devices to decode the content delivered in encrypted form. The license module may track title usage in real-time to ensure that each license for each title stays within its limits. For example, there may be five available licenses for a particular title, and the license module would ensure that only five versions of the file were in use at any given time. It may also track the payouts to license holders.

A billing module 1-64 may administrate user accounts, track usage and ensure users are billed for their usage of the titles. The billing module may also allow electronic payment, etc., for the user accounts. The billing module may also take information from the license module and ensure that license holders are appropriately paid.

An advertisement module 1-70 works in conjunction with an advertisement propagation management database to propagate advertisements and other paid media files such as sponsored events and movies to the user devices. The advertisement module may also be referred to as an advertisement propagation management module. Similarly, the media module 1-60 may be referred to as a media propagation management module operating in conjunction with the media propagation management database 1-78.

The databases generally track locations, such as of the advertisement media or the content media, across the peered devices of the network. As mentioned above, the various modules may be layers within the databases.

The media module maintains encrypted copies of all of the titles Early in a title life cycle, when not many devices have downloaded it, the media module will provide the copies of the media files as needed. Later in the life cycle, when enough copies have been propagated among the peers to allow peer downloads, the media module may maintain an archival copy.

There may also be a menu/interface module 1-68, which produces the user interfaces provided at the user device to allow the user to navigate the available content. This may also allow other services, such as e-mail, account management, etc. The menu/interface module may receive personalization of the menus and selections from a personalization database 1-76.

The personalization database 1-76 maintains a database record of user interface personalization data, selected preferences and usage history information. It may also allow multiple user profiles per customer account, such as for multiple users in a household. The user profiles may also allow parental controls, demographic targeting for advertisers and other tailored services. The personalization database may also provide information for billing, such as credit card selections, advertisement information for the advertisement module, etc.

The elements of the network may provide a peering network with all of its advantages, but there must also be some sort of protection in place for the rights holders. An authentication module 1-66 stores client account data and ensures that only authenticated devices are available as peers for other devices as well as for downloads from the media module. One of the first processes that will take place upon a user query for a title delivery is user authentication. An embodiment of this process is shown in flowchart form in FIG. 1-7, which may be better understood in conjunction with FIG. 1-6.

At 1-80, the authentication module receives a request from a user device, such as a set top box. At 1-82 the user device is verified. Verification may take many forms, but as the user device is a dedicated piece of hardware, a hardware solution may be most desirable, such as a hardware key, a smart card or a SIM card resident in the device.

At 1-84, the authentication module directs the menu/interface module to grant the user request and the menu/interface module initiates a secure session with the user device at 1-86. Generally, this process will take place for all transactions, as will be discussed in more detail further.

In FIG. 1-8, an embodiment of a method of providing a personalized interface to a user is shown in flowchart form. At 1-90, the menu/interface module receives a request from the personalization database. The user interface is generated and populated with information derived from the personalization database at 1-92. Media files related to the user preferences, etc., are located at 1-94 from the media propagation management module and the advertisement propagation management module in response to a request from the menu/interface module. These locations are then integrated into the user interface at 1-96 and delivered to the user at 1-98. The integration of the locations may be performed by the propagation management modules, either advertisement or media modules, both advertisement and media modules, or by the menu/interface module. These functions may be distributed throughout various physical devices, databases, and applications, and any combinations thereof.

The personalization information for each user provides pinpoint demographic information. This may allow for a much higher level of content tailoring, both for media and advertising. This could be accomplished in the off hours, balancing the load on the network. An example of such a process is shown in flowchart form in FIG. 1-9.

At 1-100, the personalization database may query the propagation management modules to request content to be propagated to a user device. At 1-102, the propagation management modules determine if peer copies exist. If peer copies exist, the peer copies are located and peer transmission is directed and monitored by the propagation management modules at 1-104 and 1-106. In the meantime, authentication is sent to the user device at 1-108, to ensure that the user device will allow the peers access.

If no peer copies of the desired content exist at 1-102, a download from the appropriate media or advertisement propagation module is requested at 1-110. The user device is contacted at 1-112, and authentication sent at 1-114. In either case, the download, either from peers or the media module, occurs at 1-116. Once the data is downloaded, the user device may cache a local copy to have it available for other peers as needed.

Downloading media content, as opposed to advertising content that is assumed to be license free as its download is for the benefit of the license owners, may require a license verification. During a media download, shown in flowchart form in FIG. 1-10, no license may be required when the user attempts playback.

At 1-120, a user query for requested content is received. At that point, two processes occur. First, the existence of any peer copies that can be used for downloading is determined at 1-122 and the existence of an available license is determined at 1-140. Note that the term 'free license' does not imply free from costs, just that there is a license available to be put to use. If a license exists, a key is transmitted at 1-142 that allows the user device to decode the content when it is received, however it is received. If there is no license currently free to be given to the user device, the user request may be queued at 1-150 while the system waits for a license to become available, or other options may be presented to the user. Generally, the system will strive to ensure that enough licenses are available for multiple concurrent users. This may involve generation of licenses 'on-the-fly' by the license module, with the appropriate tracking for billing and accountability.

The license key may only be needed upon playback. It is possible, in this system, for the user device to begin playback during the download process. The playback device merely determines that it has enough content to begin playback that it will not 'run out' of content before more is downloaded. In this instance, the license transaction will occur for playback during download.

Alternatively, the license may not be required at a later time, when the user attempts playback. This is shown by the 'playback' path in FIG. 1-10. The user may store the content on the device for any period of time the user desires. The user device may be sending the content to other devices during this time. The license is only required when the content is to be played back.

Returning to the download process, the content may be downloaded from the media module if it is an initial download. If no peer copy exists at 1-122, the download is authenticated to the user device at 1-130 and the file downloaded at 1-132. Once the file is downloaded, the user device verifies it to the media propagation management module so the module is aware that the user device may become an available peer for future downloads.

If peer copies exist, the media propagation management module may then determine connection speeds between the various peers and the user device at 1-124. The segments of the file to be downloaded may then be prioritized to allow the highest priority segments to be downloaded across the fastest connection at 1-126. The segments are then downloaded at 1-128. The user device then verifies the download at 1-134. During the downloading process, the user device may perform an analysis of the properties of the downloaded data, such as the compression rate and download rate, to determine when the user can begin experiencing the content while the remaining portions of it are still to be downloaded.

In this manner, the advantages of a peer network are employed in a non-autonomous manner, allowing management of and accounting for license rights to media content. The network is scalable with the addition of a few additional modules and the easy addition of more peers, has relatively low start up costs and continued operation costs.

II. Content Distribution with Renewable Content Protection

The below discussion uses several terms that may become confusing. The discussion uses the term 'media' and 'media device' to refer to a non-volatile memory device that contains 'content.' 'Content' includes any type of experiential content and includes, but is not limited to, movies, television shows, recorded performances, video files, audio files, and games. The media may include removable media, such as flash memory drives, so-called 'thumb' drives, memory cards, embedded flash memory, and memory sticks, but no limitation is intended, nor should any be implied by these examples.

The media device may interface with a 'playback device,' where a playback device is any device having a controller, also referred to as a processor or a system on a chip (SoC), a memory and the ability to interface with the media, whether as embedded media or removable media. Examples include, but are not limited to, televisions, video projectors, digital video recorders, set-top boxes, kiosks, personal computers, and mobile computing devices including smart phones, media players, netbooks and tablet computers.

While the below discussion may include examples and principles generally associated with the Simple Non-Autonomous Peering (SNAP) system set out in the patent and applications above, those examples are merely to aid in the understanding of the embodiments here and to provide examples of possible implementations of the embodiments here.

The embodiments described here allow confidential variations to constants and other cryptographic calculations to be quickly and easily changed, even on a movie-by-movie basis. The embodiments hide these details even from manufacturers, until they are actually deployed in the field. One should note that the SPDC approach discussed in the Background and the approach discussed here could be used in the same system. The components of SPDC operate at a much higher level than firmware, and the embodiments here allow changing of low-level cryptographic functions.

FIG. 2-1 shows a content distribution system 2-10 having a renewable content protection. An issue that arises in downloadable content in widely distributed systems lies in the ability to refresh or renew the content protection used to ensure that the content does not become compromised. By providing a renewable protection scheme, the content distribution system allows for updating the protection scheme periodically and/or when the current protection scheme becomes compromised.

In FIG. 2-1, the content preparation and delivery module 2-20 prepares content for delivery to consumer devices across the network 2-22. Content preparation and delivery may include SNAP-related features, such as the SNAP striping and binding scheme discussed in the patent and applications mentioned above, or any other type of encryption, coding or protection scheme intended to prevent pirating of the content. The content preparation and delivery system may also provide such services as purchase, rental and subscription of the content, licensing accounting and payouts to content providers, updating content libraries, etc.

The playback device 2-30, as mentioned above, may be any type of playback or content access device. The playback device, as that term is used here, includes a player 2-31 and the media 2-40, which may be removable or embedded. The player 2-30 has a processor or system on a chip (SoC) 2-32 that performs many of the processes that will be the subject of further discussion. The player 2-30 has variant storage 2-36 for storing variations of cryptographic functions, discussed in more detail later.

The player 2-31 also interfaces to a media device 2-40, which may consist of removable media such as a memory stick, SD card or thumb drive, or may be an embedded device. The media device or media 2-40 has a variant store 2-42 and variant selector 2-44 employed in the renewable protection scheme as will be discussed in more detail further.

In the SNAP environment example, the player 2-31 will generally be a certified SNAP-compliant device that has a SoC that is identified by unique keys installed by device manufacturer 2-60. Likewise, the media device 2-40 has unique keys installed by media manufacturer 2-50. The purpose of these keys is to allow cryptographic authentication between the player 2-31 and the media device 2-40 to form the playback device 2-30. Also, it allows authentication between the content preparation and delivery 2-20 and the media device 2-40.

In one embodiment, the cryptographic authentication is based on media key blocks, such are used in AACS and CPRM. However, other cryptographic protocols, such as public/private key, are within the scope of this invention.

The variant storage 2-36 and 2-42 store a predetermined number of variants. A 'variant' as that term is used here is a particular version of a microcode that is used to derive the necessary keys and/or functions to access the content. A 'microcode function' as used here refers to a set of firmware instructions, algorithms and constants used by a player to perform cryptographic and other media-related functions. Upon manufacture, the playback device 2-30 may have stored in it some predetermined number of these variants. These variants are stored encrypted in the player device 2-30 and the media device 2-40.

In addition, there may be several different types of variants. In the SNAP system, for example, different types of variants may exist. A first variant may be used to derive a unique code related to the media device, and a second variant may use that in conjunction with another unique identifier for the media to verify the media. A third variant may be used to derive the keys to unlock or decrypt the content that is downloaded to the media. Other types of variants may be used, or the example variants given may not be used in any particular system depending upon the protection needs of the content.

Because the predetermined number of variants may be exhausted over time, the renewable protection scheme provides for a means to renew the variants as needed. The system generally accomplishes this by transmitting new variants with the downloaded content. The media device 2-40 of FIG. 2-1 stores the downloaded content for playback by the playback device.

The media has a variant store 2-42 in which more variants are stored. In addition, the media persistent stores some sort of variant selector 2-44. This allows the SoC of the playback device to determine what variant to use in deriving the various microcode function variants. A particular example of this variant selector is discussed in detail below. The variant selector may be stored in the variant storage 2-42 or may be anywhere on the media.

For example, imagine a system in which variant #1 was initially deployed for all content. Either due to the lapse of some predefined period or due to a concern that variant #1 had been compromised, variant #2 becomes active. The variant selector downloaded with new content identifies variant #2. If the playback device does not have variant #2, being originally only provisioned with variant #1, the playback device can access the persistent store of the media to access variant #2.

In the SNAP-specific embodiments mentioned above, the variant selector 2-44 consists of a selection file. The selection file specifies the variant file to be used to access the content files and the key used to decrypt the variant file. A variant file contains the microcode function variant to be used to access the content files.

Because the selection file contains a cryptographic key, it must be delivered only after a successful cryptographic authentication between the player device 2-30 and media device 2-40. For example, in CPRM, this could be achieved by storing the selection file in the CPRM media device's Protected Area. However, other methods of delivering secret information after authentication are well known and within the scope of this invention.

Note that because variants are unique to the instruction set of the SOC 2-32, if there is more than one type of SOC supported by the system, each variant must come in several flavors, one for each type of SOC. If a variant is being delivered in on the media device 2-40 in variant storage 2-42, it must be delivered in all the flavors of SOC supported by the system.

It is possible that variants will be deployed on existing media in variant storage 2-42, and a new SOC type may be defined in the system. In that case, the variants deployed on the media devices will not contain a flavor suitable for the new SOC type. In order for a playback device 2-30 with a new type SOC 2-32 to play content on old media devices 2-40, such a playback device 2-30 must have all variants in its own variant storage 2-36 that were previously delivered in media device variant storage 2-42.

FIG. 2-2 shows a flowchart of an embodiment of this process. Upon download of the content, or insertion of a media device to which content had been previously downloaded such as at a kiosk, the playback device accesses the persistent store of the media to determine the specified variant at 2-70. Note that this process may repeat for each type of variant needed in any given protection scheme, and a selector may be provided with each content file, such as one for each movie, where a particular movie uses a different variant from other movies stored on the same media.

Once the version or number of the specified variant is determined, the stored variants on the playback device are accessed at 2-72. This part of the process may become optional, as the device may become 'aware' that the specified variant version will not exist in the stored variants and it may go straight to the media to retrieve the correct variant. Alternatively, the player may not be provisioned with any variants.

At 2-74, the playback device, meaning the processor or SoC on the playback device, determines whether or not the playback device has the specified variant. As mentioned previously, this portion may become optional as time progresses and the stored variants become obsolete, or if the playback device did not have any variants provisioned at manufacture. If the playback device has the matching variant, that variant is used to access the content or perform other cryptographic or media-related operations at 2-84. As discussed previously, this may repeat as needed to access different types of variants.

Returning to 2-74, if the playback device does not find a matching variant, the playback device accesses the persistent store on the media at 2-80. This demonstrates the renewability of this content protection scheme, where new variants and new selectors can be deployed on the media either periodically or after a suspected compromise of the deployed variants occurs. The new variant is then used to access the content at 2-84.

It is possible that more than the predetermined number of variants will have been deployed and after that a new platform or playback device is authorized. The new player added later would be provisioned with all variants released to date.

In the particular example of a SNAP system, one can see how the variant would be used to access the content, shown at 2-84 in FIG. 2-2. FIG. 2-3 shows an example of a SNAP-specific embodiment. At 2-100, the variant is used to decrypt media verification microcode. In this example, the media verification is a two-step process. A first type of variant is used to decrypt a defect map of the media. As mentioned previously, the manufacturer of the media may provide some sort of unique ID code for the media. The defect map undergoes a form of 'obfuscation' and then encryption that can be decrypted and decoded by the appropriate variant and compared to the actual defect map of the media to ensure that they match. This function is derived at 2-102. The second step in the media verification process is to use the hardware defect map and some other characteristic of the media, such as its serial number, to derive a hardware authentication code (HAC) at 2-104. This is then compared to the existing HAC to further ensure that the media is valid at 2-106.

Another type of variant provides the function that recovers the keys to decrypt the actual content. In the SNAP example, the content has been segmented, encrypted and striped in each instance of the content file. The keys provided are specific to the particular instance having the particular encryption and segments of the content stored on the media. Once the appropriate variant is used, the keys are obtained at 2-108 and the stripes are decrypted at 2-110.

However, as mentioned above, the different types and numbers of variants used, as well as the different numbers of versions of the variants depend upon the content distribution system and the protection needs of that content. No limitation is intended, nor should any be implied, to the specific examples given above.

In this manner, the content protection scheme can be renewed indefinitely for the content distribution system. This allows the system to be scalable, robust and less likely to fall prey to pirates. While the above discussion focused on renewable microcode functions, one skilled in the art will understand that it applies to other cryptographic concepts such as media key bundles (MKBs) and public/private key pairs.

III. Simple Non-Autonomous Peering Environment Watermarking, Authentication and Binding Using a simple, non-autonomous peering system (SNAP) in accordance with the description here may provide the advantages of a peering network while preventing the abuse of rights. The SNAP environment or system creates unique instances of a particular media file and allows users to 'build' that instance from other peers according to a well-defined methodology with several layers of protection. This enables a wide variety of content monetization models, including rental, sell-through, pay per view, theater exhibition and electronic sell through to various media types including but not limited to NAND flash memory, optical media, solid state hard drives, spindle hard drives, etc. These functions may be provided to consumers via secure 'swarming' where a file is provided in segments from various peers in the network or in a closed network environment or provide secure electronic distribution for points-of-sale, such as kiosks, etc.

The SNAP system uses the physical defects inherent in NAND flash media to bind content to NAND flash. These defects in NAND Flash are called Bad Blocks. NAND Flash is a type of non-volatile solid-state memory containing 2 distinct physical storage areas: a Data area composed of pages physically grouped into Blocks, and a "Spare" area for the storage of logical and physical metadata pertaining to the Data area and the data stored therein. While the configuration of these two areas may vary from Fabricator to Fabricator, both areas are present in all NAND Flash chips. NAND Flash chips are programmed on a page-by-page basis and erased in a block-wise manner in an effort to enhance performance.

Due to the inherent manufacturing methods used to make NAND Flash memory, it is common for NAND Flash chips to contain up to 5.5% defects at the time of manufacture. This is necessitated in order for chip fabricators to maintain commercially viable production yields. Since NAND Flash memory is erased on a block-by-block basis, any defect detected either during a page program cycle, or a block erase cycle dictates that the entire block of memory be identified as "Bad" in order to avoid potential data corruption. Defective blocks are identified during rigorous post-manufacturing testing, by the chip fabricator, by programming a specific value (typically 000h) into the block's spare area. Runtime detected bad blocks are marked with a different value (typically FFFh for 16 bit blocks) to the spare area.

It must be noted that the discussion below uses NAND Flash terminology and examples. However, the scope of the claims is not restricted to NAND Flash devices. Other memory technologies may have similar characteristics to NAND Flash devices and no limitation to NAND Flash devices is intended, nor should any be implied.

The SNAP system binds the unique media instances to the specific block address where the content is stored. It also uses a digital signature of the location where the unique media instances are recorded, or 'programmed' in NAND flash terminology, to authenticate the Flash Media and the recorded content. It also uses a digital signature of the location of the bad blocks to authenticate the Flash Media and the recorded content. These signatures are also used to cryptographically modify the keys required to encrypt and decrypt the unique media instance.

These two digital signatures are the basis for determining the authenticity of the Flash Media and content and used in various players and consumer electronics to stop playback or to revoke or to renew said devices and content. Since it is extremely unlikely that any useful number of NAND flash devices have the same pattern of bad blocks, the SNAP system makes unauthorized transfer of the content from one NAND to device to another NAND device very difficult. The SNAP system does enable the content owner to permit the transfer of content from one NAND flash device to another NAND flash device. The transfer can be a move or a copy transaction or both. This can be done per the content owners' business rules and may or may not involve payment for such a transfer transaction. In any case, the SNAP system controls if content is transferred and does so in a secure manner.

SNAP may also offer secure forensically identifiable content for use in electronic theatrical distribution systems as described in the Digital Cinema Initiative. SNAP's high degree of flexibility, security and forensic accountability come at a relatively low cost in terms of player and distribution network resources.

SNAP Environment and Pre-Processing of Media Instances

FIG. 3-1 shows an overview of multiple instances of an authored and encoded master media file. The system applies a different global watermark to multiple copies of the master 3-10. The Global watermarks may contain zero or more bits of payload data. This discussion uses colors to differentiate between the different watermarked versions, referred to here as instances. The instances 3-12, 3-14 and 3-16 are each encoded with a different watermark, green red and blue, respectively. Each different global watermark is identified internally by a unique global mark identifier. It must be noted that SNAP may employ many different global watermarks. Each global mark is applied to different copies of the master such that no two different global marks are applied to analogous data ranges within the master, as will be explained later.

In addition to the three different instances of the master, each of the watermarking techniques may differ from each other. Instead of having three different variations of the same watermarking technique, for example, one could use three different watermarking techniques, or vary the payload within a single watermark carrier.

As an overview, each of these instances of the master are parsed into some predetermined number of second order segments, as shown in FIG. 3-2. In an alternative embodiment, it may also be possible to parse the movie data into segments prior to the application of watermarks. This method may be desirable to ensure that the watermark carrier and/or payload may be successfully encoded/detected within the data of a single segment. The number of second order segments follows a title scheme, discussed in more detail in FIG. 3. SNAP uses a bottoms-up methodology, using the second order segments to build first order segments, and using the first order segments to build expressions that will form unique instance pattern (UIP).

The second order segments of FIG. 3-2 will generally correspond amongst each other according to a data range. For example, the data ranges from the different instances that correspond to any particular second order segment will correspond among the colors. For example, the second order segments at the left side of the figure such as 3-20, 3-22 and 3-24 will correspond to the same data ranges in the red, green and blue instances 3-12, 3-14 and 3-16. Similarly, the ending second order segments at the right side of the figure such as 3-26, 3-28 and 3-30 will correspond to similar or the same data ranges among the instances. It should be noted that if watermarks are applied in the baseband of movie data prior to data compression, the inclusion of watermarking data will cause analogous segments to have different file sizes due to the presence of different watermark carrier and/or payload bits.

Because the different instances may all have different watermarks, some accommodation must be made to allow single key encryption systems that use data "chaining" such as AES-E CBC or CTR modes to transition between the segments with different watermarks. This may be accomplished with an initialization vector table 3-32. The initialization vector table 3-32 may record the last 128 bit cipher block of each second order segment. This would allow the single key encryption systems to identify the starting point for the transitions.

In CBC mode, for example, each block of cipher text is chained forward to be used in the decryption of the next block. Since SNAP segments containing different watermarks are concatenated or otherwise joined together to form a media instance, normal CBC mode would fail as the watermarking process itself would change chained blocks by injecting the appropriate 128 bit watermarked cipher text block in a manner similar to initialization vectors used to start a CBC chain.

As mentioned above, the second order segments are concatenated or otherwise joined together to form the first order segments. The first order segments are then concatenated to form Global segments, each expressing one element of the Unique Instance Pattern. The Global segments are then combined together to form a media instance. When a user requests a media file to be transferred, the system accesses the segments according to a title schema mentioned before. The segments may come from many different sources, including a central file server, other users on the same network, such as on a DVR network, a cable set top box network, or via direct transfer from a kiosk, etc.

An example of such a title schema is shown in FIG. 3-3. As mentioned above, the title schema uses a bottoms up methodology. In the example title schema used here, the instances 3-12, 3-14 and 3-16 are segmented into 2000 second order segments such as 3-40. In order to form a first order segment such as 3-42, 20 second order segments are concatenated together from the appropriate second order segments, in this case 100 first order segments are formed. The title schema determines which combination of which second order segments are taken from which instance. In the example given here, the first order segment S1 is formed of second order segments S1-S20, and the first order segment S100 is formed of second order segments S1981-S2000.

The formation of the global segments such as 3-44 results from the concatenation of the first order segments. In the example schema provided, the concatenation of 20 first order segments results in one global segment. The global segment GS1 3-44 in this example is formed by a concatenation of first order segments S1-S20. The term segment refers to the data range of the first or second order segment, while the term 'expression' refers to the ordering and substance of the segment as to the type and watermark of the segments that make up the first order and global segments.

It must be noted that the particular numbers given here for the number of second order segments, first order segments, global segments, etc., are merely examples and specifics are provided only as a means for easing understanding of the invention. Similarly, while the segments are joined here using concatenation, other types of joining the lower order segments together to form high order segments may also apply.

Returning to FIG. 3-3, one of the global segments such as 3-44 will correspond to one of the elements used in the unique instance pattern (UIP). It is the UIP 3-48 made up of elements such as 3-46 that the user will see as the media file desired to be downloaded or transferred. This may be better understood with reference to FIG. 3-4.

Figures 1, 2, 3, 4:
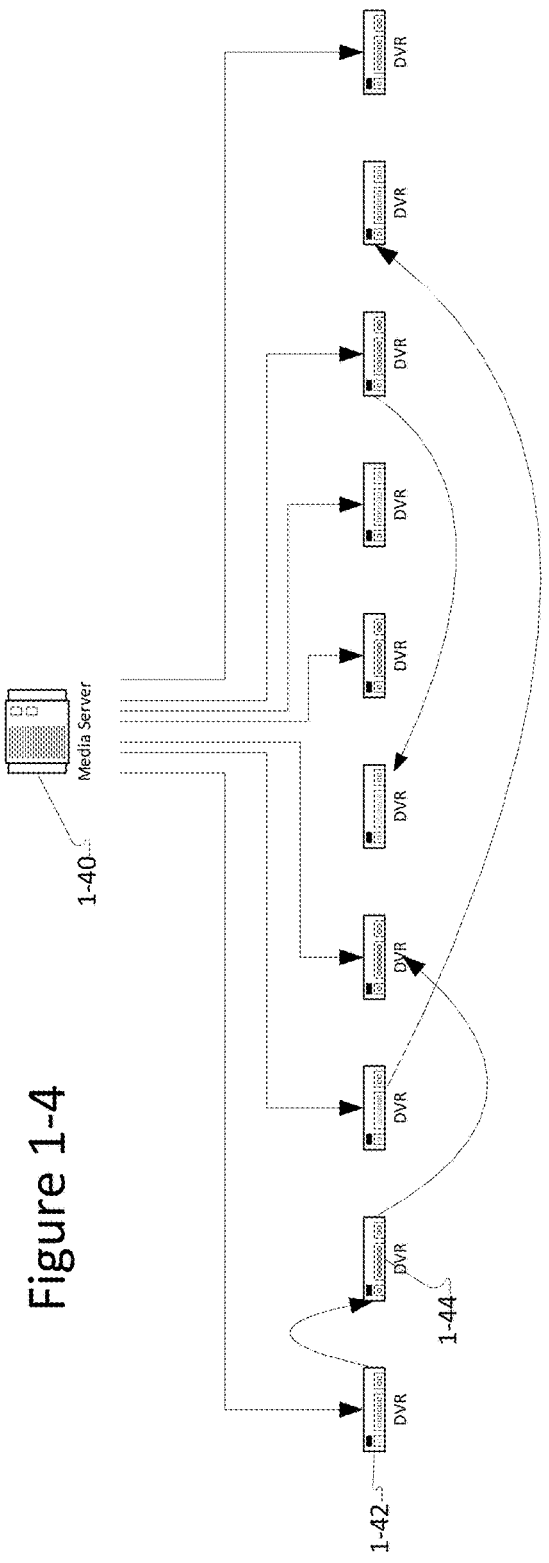

Within each element of the UIP, is a first order expression of the UIP. This creates a hierarchical watermarking framework. As can be seen in FIG. 3-4, the UIP in this example may be referred to a green-blue-red-blue-green UIP. This pattern is repeated at the first order segments. The first order segments S1-S20 that make up the element 3-46 have repeated inside the same pattern at segments 3-50, 3-52, 3-54, 3-56 and 3-58.

In the particular example given here, the UIP is Green-Blue-Red-Blue-Green. The pattern then repeats within the green first order expression E1, such that the element 3-50 is green, element 3-52 is blue, element 3-54 is red, element 3-56 is blue and element 3-58 is green. This pattern would then repeat in each of the first order expressions.

Figures 1, 2, 3, 4, 5:
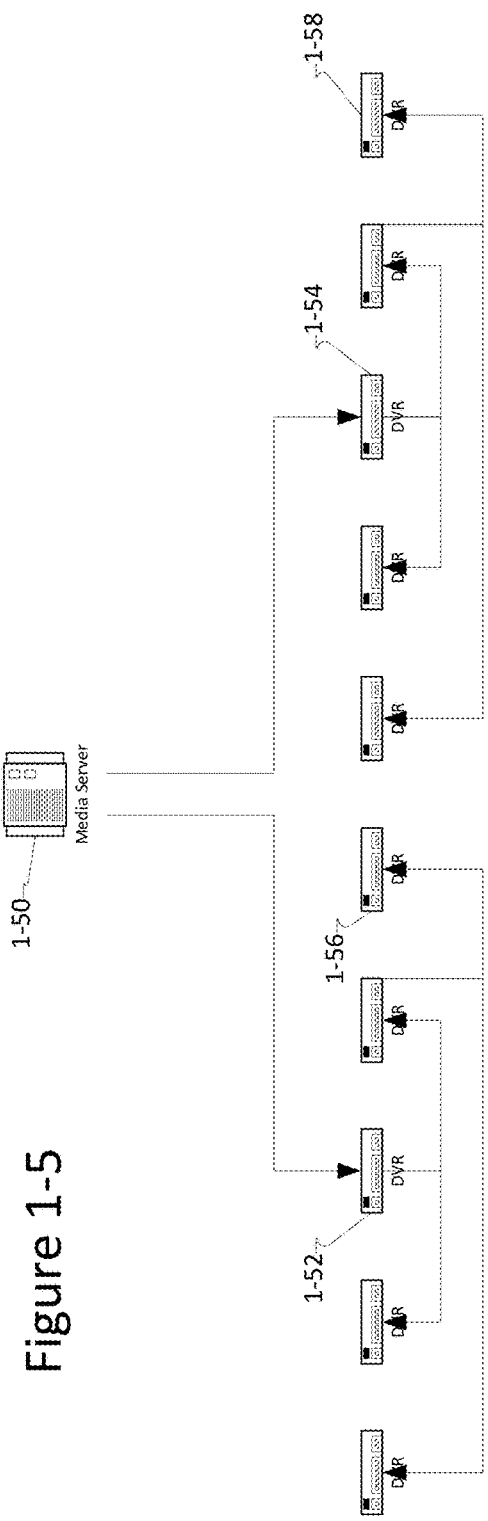

FIG. 3-5 shows first order expressions within the global expression range of the first element 3-46 for three different UIPs having different global segments for the first element and identical elements for the remaining 4 elements. This highlights the unique elements mappings for each different element within the expression ranges of the first element.

The element 3-60, when expanded, repeats the green-blue-red-blue-green pattern within its first order segments shown by 3-62. The element 3-64, when expanded, repeats the red-blue-red-blue-green UIP shown by 3-66. Further, the element 3-68, repeats the blue-blue-red-blue-green pattern shown by 3-70.

FIG. 3-6 shows a more detailed view of the first order expressions. The first part of the expression, A, is a first order offset. The first order offset is the number of first order segments from the start of the global expression data range before the expression groups D at the end of the expression. In this example, the offset is 3.

The part of the expression B is the first order expression groups 1-5. As used here, the term 'expression group' is a set of a number of segments, such as first order segments. In this example, there are three instances, and the UIP contains 5 elements, so there will be 5 expression groups each containing 3 first order segments.

After the first order offset, there is a region C of the expression that comprises the first order expression group offset. SNAP uses a mapping to the global watermarks of the parent UIP element within which the first order expression takes place to determine the first order expression group offset. For example, these offsets may be set by convention in which if the parent element contains the green watermark, the first order expression group offset would be 0. If the parent element contains the red watermark the offset would be one, and if the element contains the blue watermark the offset would be two. This mapping may vary among the five elements, although it may also be the same for all five elements.

The region D of the first order expression is referred to as the first order tail. This tail provides forensic reinforcement of the UIP in the event of splicing attacks. The element of FIG. 3-6 is a green watermarked element, so the tail D is green. As will be discussed in more detail later, this acts a check on the native watermark of the expression in the case of a splicing attack where different portions of the expression are in the clear and spliced together.

For example, assume that two media instances are sampled and then spliced together at a fine granularity. The first media instance would consist of first order segments 1-20 from a media instance having a green-blue-red-blue-green instance. The second instance would consist of segments 1-20 from a media instance with a UIP of red-green-green-green-blue. When these instances are spliced together, the tail would show both red and green watermarks, indicating that they were spliced and not legitimate expression groups.

This first order level of marking shown in FIG. 3-6 provides one means of identifying the global patterns of colluding files in the case of interleaving carried out across an entire global segment. It could potentially be vulnerable to splicing at the first order segment level. SNAP uses a second order expression of the UIP within selected first order segments. That is, when the second order segments are combined together to form the first order segment, second order segments of the other global instances are combined in the pattern of the UIP, at least in part.

For example, using the green-blue-red-blue-green UIP discussed above, the first order segments would be combined into expressions that mimic this UIP. In addition, inside the first order segments, the second order segments would also mimic representing this pattern. In order to mount a collusion attack such as the splicing mentioned above, the pirate would need the ability to identify the granularity of the watermarked patterns. However, SNAP does not rely upon a player's ability to detect or read forensic watermarks, instead using encrypted composite hash tables to identify differently marked data, an attacker's ability to detect and read all marks is highly unlikely.

FIG. 3-7 shows an example of a portion of a media instance where alternating data was sampled from two source files then recombined in an effort to obliterate watermark patterns and gain access to the media instance. The first order segment 3-80 is the first element consisting of a data range of first order segments 3-20 from a media instance having the UIP green-blue-red-blue-green as discussed above. The first order segment 3-82 is the first element consisting of a data range of first order segments 3-20 from a media instance having the UIP of red-green-green-green-blue.

The first order segment 3-84 is a 'colluded' version of the above first orders segments 3-20 interleaved frame by frame in an attempt to obliterate the watermarks. If it were in color it would be of alternating red and green 'stripes' of data. The segments are jumbled and would be unworkable as an actual first element of a UIP. One of the powerful aspects of SNAP, however, is not only its ability to cause such an attack to ultimately fail because the segments will be unusable within the title schema to decrypt the media instance, but also can allow identification of the source of the two spliced files in the event that movie data had been "ripped to the clear".

An analysis of the offset region O of the element 3-84 shows that the red and green watermarks are present, meaning that the colluding files are 1 element E1 from a red watermarked file and 1 element E1 from a green watermarked file. Further analysis of the offsets will show that there are only two colluding files in this instance, a file with a UIP that begins with red and another that begins with green. Analysis of the portions 2-5 results in identifying the UIP that begins with red to be a UIP of red-green-green-green-blue and the UIP that begins with green is a green-blue-red-blue-green UIP. The tail section T confirms this analysis.

As can be seen from above, the SNAP environment and schema allows not only disabling of the use of the file, but identification of the source of colluded files for forensic tracking of the media instances in the system. This was accomplished using first order expressions of the elements of the UIP. The methodology employed to determine the expressions of second order segments within the first order segments allows for even more granularity.

FIG. 3-8 shows an overview of the second order expressions of the UIP. These offer protection for intermediate granularity attacks where complete first order segments from multiple media instances would be spliced together in an attempt to obliterate a first order watermarking pattern. Second order expressions are normally bounded by individual first order segments to maintain network efficiency for swarming distribution. This is not intended as a limitation, and it is possible for the second order expressions to span first order segment boundaries in the manner of global expressions. Typically, there will be one first order segment containing a second order expression of the UIP within a first order expression group. As mentioned above, it is desirable to randomize the pattern offset from expression group to expression group.

In the example of FIG. 3-8, first order segments will be selected for the second order expression group using an incrementing form of the expression group offset such that they may occur at multiple offsets throughout the first order expression groups. Internally, the first order expression groups use a second order expression group offset. The second order expression group offset is mapped to the different global watermarks of each element on an element by element basis throughout the UIP.

FIG. 3-8 shows the first order segments 3-20 from the example file having the global UIP 3-48 of green-blue-red-blue-green. Each second order segment expression, which is a concatenation of 20 second order segments, mimics the UIP of green-blue-red-blue-green within it in the element values E1-E5, after the initial offset portion and the trailing tail portion. Second order expression group 3-90 corresponds to the first segment 3-92 of the first order expression group, and second order expression group 3-94 corresponds to the ninth segment 3-96 of the first order expression group. The determination of the first order expression groups consisting of which second order expression groups is driven by the title schema and the offsets that are set by convention.

1. SNAP Hash Tables

One of the elements that allows the SNAP environment to create and maintain the watermarks is the hash tables. The hash tables are used to manipulate the behavior of swarming applications such that they select appropriate data from peers, driven by the title schema, without the application being able to detect or interpret SNAP's forensic watermarks or the media instance patterns.

In addition, SNAP generally employs CMAC (cipher-based message authentication code) tags. These tags, when received, are compared to a generated tag from the message using a key that is cryptographically bound to the physical attributes of the storage media it is delivered to in order to ensure they match. These tags are renewable. When the watermarked and encrypted data is hashed with a new CMAC key a complete renewal of descriptor metadata occurs. This does not invalidate movies previously delivered, but disallows the exchange of keys and/or descriptor metadata among users as in the case of a key sharing attack. CMAC tags also provide authentication of the data and error correction.

The CMAC tags of every segment within a unique media instance are contained in the composite hash table for the media instance. It is referred to as a composite hash table because, like the watermarking, the hash table generation employs a bottoms up methodology as shown in FIG. 3-9.

FIG. 3-9 shows an overview of a hash table hierarchy for one media instance corresponding to one watermarking method. In this example, the media instance is the blue watermarked instance. The process begins with the second order segments. The second order keys are batch calculated by first hashing plaintext second order segments using the renewable title crypto CMAC keys. Each segment's CMAC tag is then combined with an analogous tag from a master key second order hash table (HT2) such as 3-100 using a non-reversible combine function. Master key second order hash tables are analogous to first order key hash tables in structure, but populated with unique random values. One set of master key second order hash tables may be used for all media instances.

As mentioned above, one advantage of using CMAC rather than the more common SHA-1 or MD5 plain hashing is that CMAC allows SNAP to quickly renew a title's keyset by changing the title crypto CMAC key and repeating the key generation process. The process may even occur after a title has been released into the network without requiring re-mastering.

The CMAC tags for each group of second order segments that comprise a first order segment are written into a first order key hash table such as 3-102. Each CMAC tag is then combined with its corresponding random hash analog from the first order segment master key hash table such that the resultant value may be used as a unique segment key. SNAP then encrypts each second order segment to its corresponding key.

It is desirable that all hashes and random values are verified as unique after each state of pre-processing to ensure that no data exhibiting a hash collision is published. A hash collision occurs when two different segments have matching hashes. If this occurs, one of the instances must have its data modified in a non-user perceptible manner such that it returns a unique hash. This ensures that the tags can serve as unique identifiers for the segments they describe and to protect against attackers being able to use hashing collisions to reverse engineer hashing algorithm behavior and subsequently discover encryption key generation methods.

As an added protection, the first order key hash tables such as 3-102 are cross mapped. Cross mapping involves using a CMAC tag for an analogous second order segment from another watermarked media instance to generate the second order segment. For example, a key for a blue second order segment would be generated using the hash of the analogous red second order segment. Red second order segment keys would be generated with hashes of the green second order segments, and green second order segments would derive their keys from the blue second order segments. In this manner, keys are derived in a manner using information that any individual media player will not possess.

After encryption of the second order segments, they are concatenated together to create first order segments. The resulting first order segments are hashed using the same CMAC used to write the second order hash tables. The CMAC tags are then written to the first order hash tables. The second order hash tables previously created may be nested under their respective first order segments CMAC tag in the first order hash table (HT1) 3-104.

The first order hash tables such as 3-104 are then combined to create the blue global hash table 3-106. The blue global hash table then contains all of the necessary information to describe any blue first and second order segments in order to reconstitute a media instance using blue watermarked segments. When used in conjunction with the red and green global hash tables, a media instance using multiple global watermarks may be decrypted.

FIGS. 3-10 and 3-11 show a comparison of SNAP's pattern expressions and decryption path and patterns generated by a sequence key based (SKB) system. FIG. 3-10 shows a forensic pattern based upon the SKB system. Using a device key at a device such as a media player 3-110, a media key bundle 3-112 and the sequence key bundle 3-114, the variants of enhanced video objects (EVOBs) are placed into a patterned resulting audio video stream 3-116.

While the resultant complexity would appear on its face to protect the media instance, far more critical is the pattern leakage. EVOBs are discrete files that directly represent the boundaries of the forensic watermarking pattern. This provides hackers with pattern information that could allow them to spoof the forensic patterns. This in turn comprises the ability to forensically detect the decryption player.

In contrast, the media instance 3-120 shown in FIG. 3-11 is represented only in part by the encrypted composite hash table 3-122. The actual resulting media stream 3-126 is a result of further encryption at two further levels as discussed in detail above, requiring the unique encrypted composite key bundle 3-124. In this manner, the multi-level watermarking and use of the UIP throughout the levels of the media instance, as well as the hash table generation and compositing, the SNAP environment provides a secure authentication environment for media instances that are not only have higher levels of hacker protection, but also have forensic capabilities to detect decrypting players.

One aspect of the SNAP environment that has been mentioned above is the separation of the decryption and the keys from any particular media player. In a typical secure environment, the requesting player receives the key and/or hash tables that then allow the player to decrypt the desired media stream. In the SNAP environment, the decryption capability is player independent and thereby makes it both more robust and more resistant to having keys reside at any particular device.

However as mentioned previously, when content is stored on physical media it is important to bind the content and keys to the media such that it cannot be transferred without authorization. Both the SNAP encrypted unique media instances and the separate keys need to be cryptographically bound to the media to prevent unauthorized transfer from one NAND flash device to another NAND flash device. This is discussed in more detail below in the SNAP Secure Host Environment.

2. SNAP Secure Host Environment

The SNAP secure host environment has a SNAP Renewable Logic, code that resides in a secure processor on the player host or in the NAND flash card controller or in both. The SNAP Renewable Logic contains data and templates for generating specific cryptographic data. A SNAP Renewable Logic is an intermediary that provides a known cryptographic environment for communication and cryptographic calculations between its host application and SNAP enabled NAND Flash devices.

SNAP Renewable Logic transforms cryptographic data differently for each NAND flash device. The inputs to the SNAP Renewable Logic include: 1) device bad blocks, chip ids, SNAP chain logs, SNAP segment chains and 2) a SNAP renewal string. The outputs of the SNAP Renewable Logic are a SNAP HAK (hardware authentication key), which is used to authenticate and cryptographically protect the SNAP HAN (hardware authentication number). The SNAP Renewable Logic performs differently on each NAND flash device because the input variables listed in 1) above vary from NAND flash device to NAND flash device.

This provides a greater level of complexity for an attacker because it is unlikely that any two NAND flash devices use the same authentication and cryptography in an identical manner. The SNAP renewal string changes the logic, both the algorithm and the variables used in SNAP processing.

This SNAP renewal string can be updated on a periodic basis to enable a Studio to change the manner in which unique media instances and the respective keys are cryptographically bound to the defects of a NAND flash device.

3. Authenticating Non-Volatile Storage Media

In one embodiment, the trust transaction may be performed using the random nature of bad blocks on the non-volatile storage media. Generally, manufacturers of flash and other storage media use a method of bad block identification that allows the device to identify bad blocks of physical memory following manufacture. By doing so, the manufacturer can still sell the device and it will operate as intended, as the bad blocks are marked and identified for any processing device that accesses the remaining 'good' blocks of memory.

During post manufacture testing, each block of physical memory undergoes multiple 'program,' 'read' and 'erase' operations. When any or all of the pages that make up a memory block fails, the entire block is marked bad by writing a specific value (e.g. 'ooh') in pages of the bad block, as well as within the Spare Area related to the block. These bad blocks detected at manufacture are differentiated from the bad blocks detected during subsequent consumer operation of the device. Bad blocks identified during consumer operation are identified by writing a different value (e.g. 'Foh') in the pages and spare area of the block.

Since the pattern of bad blocks identified at the time of manufacturing is random, this information provides a unique value usable to provide a unique authentication and cryptography mechanism. The pattern of bad blocks may be combined with the unique media ID of the device to create a unique authentication value. It may also be possible to identify a specific page which has failed within a block of memory, the value of which may also be usable to enhance the robustness of this authentication. This would allow for a unique authentication value at manufacture, but some sort of infrastructure may be helpful to ensure that this unique value is monitored and tracked to prevent it from being forged or otherwise copied.

The manufacture of these devices may be performed under a central licensing authority, where the licensing authority ensures that devices are 'SNAP compliant.' An overview of such a system is shown in FIG. 3-12. In FIG. 3-12, the SNAP Licensing Authority, or SLA, 3-150 has secure connections through portals available at the various points in the manufacturing chain. These portals such as 3-160, 3-170 and 3-180, provide a secure and authenticated link to the SLA. This increases the difficulty that a rogue fabricator/pirate would have in trying to hack or otherwise subvert the information exchanged between these two entities.

Typically, the manufacturing chain would have at least three portions. The SNAP portal 3-160 resides at a chip manufacturer that produces NAND Flash memory chips. The use of the term chip with respect to NAND Flash memory shall be considered to broadly cover any NAND Flash memory array (die) whether it is in the form of a discreet IC packaged commodity memory chip, or integrated into another device, as in the case of a Multi Chip Package (MCP), or Solution on a Chip (SoC). Multi-planar devices containing multiple planes of either SLC or MLC NAND Flash shall have their planes treated in a manner that is consistent with their memory addressing behavior (single or multi-device addressing).

The SNAP portal 3-170 resides at a memory controller manufacturing facility. Most non-volatile memory products have an on-board controller to manage the movement of data into and out of the various memory structures on the product. In the discussion here, this controller will be manufactured according to the SNAP protocols and may be referred to as SNAP compliant.

The SNAP portal 3-180 resides at an assembler that combines a controller with a set of memory devices into a consumer product, such as a memory product (SD card, Flash thumb drive, etc., a digital media content player, such as a MP3 player, a video game player with movie or music capabilities, or any other product that uses non-volatile memory to store digital content. For purposes of this discussion, each entity will be discussed as though they were separate entities, with the understanding that they may occur in any combination of entities or all at one place. Compartmentalization may be preferable, as it adds an additional layer of security. Each entity requires a license. Memory fabricators will have a chip binding license, controller fabricators will have a controller binding license and assemblers will have a chipset binding license. If one entity were performing all three functions, that entity would have all three licenses, increasing the risk of breach.

FIG. 3-13 shows an example of a method to generate and imprint a unique chip identifier (ID) onto the memory chips. The term 'chip' as used here and in the claims refers to any individualized portion of memory.

In the diagram, the blocks to the left side of the figure are performed at the fabricator and the blocks to the right side are performed at the SLA. The process begins at 3-190 when the fabricator tests a completed memory chip and determines its bad blocks, as discussed above. The bad block data is received at 3-192 at the SLA. The SLA then assigns a unique chip ID to the chip at 3-194 and decrypts the bad block data at 3-196. If the memory is being programmed one chip at a time, the Fabricator may be a memory manufacturer. Alternatively, when memory chips are being grouped together, the Fabricator may be an assembler as well, as is discussed in more detail below with regard to the controller and chip set programming.

The SLA then performs at least one operation on the bad block data, either alone or in combination with the chip ID, to produce a unique identifier for the chip. The chip ID is then signed by the SLA using a vendor-specific CMAC key for that fabricator at 3-200. The signing process may employ a public key such that it may be authenticated by devices other than the SLA, or it may employ a secret key only such that only the SLA may authenticate it. The resulting CMAC digest is referred to herein as a Chip CMAC.

Using the chip's private key, the SLA then encrypts the chip ID and is signature tag to create a Hardware Authentication Number (HAN) at 3-204. The SLA then signs the chip ID and HAN at 3-206 and encrypts them. The encrypted HAN and ID are then sent to the SNAP portal at the fabricator at 3-208.

Back at the fabricator, the SNAP portal decrypts and validates the HAN at 3-210. Either under control of the SNAP portal, or possibly within the SNAP portal itself, the chip is them programmed with the HAN and chip ID. The programming may involve a 'write once' strategy, in which a set of gates within the memory (such as NAND gates in a NAND flash memory) are physically damaged so as to be read-only. This adds another layer of security, as it prevents changing of the chip ID or HAN.

Unlike the SLA-centric chip identifying process, the process for controllers is somewhat more involved for the fabricator. An example of this process is shown in FIGS. 3-3-3-14. At 3-220, a SNAP controller is connected to the SNAP portal at the controller fabricator. The SLA or the SNAP portal, or both, establish as session as 3-222. The SLA then sends the controller ID and the firmware to the fabricator at 3-224. The SLA may record the controller ID into a database or other type of storage, associated with the fabricator, for later monitoring and tracking, at 3-232.

Meanwhile, the fabricator has received the controller ID and the firmware through the SNAP portal at 3-226. The SNAP portal, either by itself, or by controlling the fabricator's machinery uploads the firmware into the controller, making the controller a SNAP controller, at 3-228. The SNAP controller is then programmed with the controller ID at 3-230.

Having seen how one could assign unique IDs to the memory chips and the memory controllers, the discussion now turns to binding a unique controller with a set of memory chips, referred to as chipset binding. An example of this process is shown in FIG. 3-15.

At 3-240 the device that contains both memory chips and a controller is connected to the SNAP portal for programming. The chips are verified, typically by performing program/verify and erase/verify testing on each chip to detect counterfeit SNAP compliant chips. This may be accomplished by having the bad blocks tags erased. If this is detected, the device is rejected as counterfeit. Further testing may include parsing a chip's spare area to detect the presence of any runtime bad blocks. The SNAP portal may also authenticate the chip's HAN according to a field parsing of the HAN.

Upon verification of the chips, the SNAP portal reads the controller ID at 3-244 and sends the controller ID and all HANs to the SLA at 3-246. The SLA then computes a different Hardware Authentication Code (HAN) and returns it to the SNAP portal at 3-248. The portal then programs the HAN to the SNAP controller and each chip using, for example, the write once strategy discussed above. As an added measure of security, the SNAP controller and the SNAP portal jointly compute an encrypted block failure log that contains all bad block addresses for all chips in the chipset, and may write those to each constituent chip's system area for future reference. Any use of the device containing this controller and chips in compliance with SNAP will ensure that the chips and the controller all have matching HANs to ensure that the device is valid.

Once the SNAP compliant devices manufactured from the above processes become available, they can be used to provide media content to users. An example of this process is shown in FIG. 3-16. In FIG. 3-16, the media files are acquired. The media files may desirably be those using the watermarking hierarchy discussed above with regard to FIGS. 3-1-3-11. The watermarked instance or instances are then written into the memory at 3-262.

The manufacture of the finished products that include the media files may be recorded in a database. The database will allow tracking of copies of the content and provide the basis for the content providers to receive license royalties.

Once the files are written to memory, a log may be created, binding the logical and physical locations of the files in the memory at 3-266. This log can then be used to verify and confirm the authenticity of the memory content upon access. An example of this process is shown in FIG. 3-17.

In FIG. 3-17, a SNAP compliant device, having watermarked content contained in memory chips under the control of a SNAP controller is connected to a host device. This may be a computer, a set-top box, kiosk, television, media player, portable device, etc. This process may involve an update of either the device or the host device, depending upon the dates of the update files on either device.

Upon manufacture, the host devices is provided with the most up to date information on watermarking algorithms, as discussed above, as well as the media key bundles, revocations of licenses, either for users, media or devices, etc. Similarly, upon receiving a media instance, a device receives the most up to date information at that time. When the device and the host device connect, a determination is made as to which has the most up to date information and whichever one does, it provides that information to the other device. In this manner, the most up to date information with regard to licenses, revocations and algorithms propagates throughout SNAP compliant devices. Host devices may be updated every time they connect with a new piece of media, either by external connection to a device or when a media instance is downloaded through a network.

Once the update has completed at 3-270, the host device acquires the log file of the files and locations generated upon writing of the media instance into the memory at 3-272. This log file is then decrypted/decoded to authenticate the media file based upon its locations in the memory at 3-274.

Meanwhile the memory controller will perform the same operations on the log file and the two results are compared at 3-276. If the two results match at 3-278, the playback of the media instance is allowed at 3-282. If the two results do not match, the device is disabled, or the media instance is disabled at 3-280.

Having established the various components and methods of the SNAP infrastructure, it is useful to discuss the events occurring as a host device requests and then plays some piece of content, such as a movie, an audio file, etc. These will be discussed in terms of a movie in FIGS. 3-18-3-21, with the understanding that the content is any type of protected content that is in downloadable form.

In FIG. 3-18, a host controller requests to download content from the SNAP licensing authority (SLA) server. This download, as discussed in much detail previously, may actually be from peer devices, but under control of the SLA server. At 3-290, the controller in the playback device contacts the SLA server and requests the content, in this example, a movie.

The server generates a unique instance pattern (UIP) such as those discussed in detail above, at 3-292, and generates the hash table associated with the UIP at 3-296. At 3-300, the server sends the hash table to the host controller, and then stores the controller ID of the host controller with the UIP at the server side. This allows for identification of any instances of the UIP that appear, such as in the colluded attacks discussed above, and allows tracking of the source of the segments being pirated.

At 3-298, the host controller receives the hash table. At 3-302, the host controller locates the various segments of the movie, wherever located, to fulfill the requirements of the hash table. Some segments may be obtained from peers, others may be obtained from a content provider, etc. At 3-306, the host controller generates a segment chain log. A segment chain log is a log of the locations of all segments of a movie instance. The segment chain log may be generated by the host controller upon storage of the movie into an attached flash device, or even in its own non-volatile memory. A chain log is a sequential log of the physical (chip/block/page) addresses where a specific segment of a movie instance is stored in a NAND flash chip. Chain log may be associated with a device, a segment or a complete piece of content, such as a movie.

Having fulfilled the hash table and acquired all the necessary segments, the host controller now will acquire all of the necessary keys to allow access to the encrypted segments. This is shown in FIG. 3-19.

At 3-310, the host controller contacts the SLA server and requests a key bundle for the UIP that it downloaded. The server looks up the UIP at 3-312 and generates its key bundle at 3-316. Meanwhile, the host controller sends the chain log generated upon reception of all of the segments at 3-318. The SLA server receives the chain log at 3-320.

The SLA server instantiates the SNAP Renewable Logic, discussed above, at 3-324, and initializes it using a renewal string at 3-326. This ensures that the SNAP Renewable Logic 'refreshes' the processes used to generate keys, making them harder to break. At 3-328, the SLA server uses the chain log that identifies the locations in the device where the segments are stored to bind the keys to these device attributes. This entire bundle is then encrypted at 3-330 and returned with the renewal string to the host device at 3-334.

The host controller receives the bound key bundle and renewal string at 3-332. As mentioned with regard to FIG. 3-16, the renewal string may be passed from one device to another upon connection as part of the most updated information with regard to renewals and revocations. At 3-335, the host device programs the key bundle, the renewal string and the program segments to the flash device.

The content now resides on the flash device, ready for access by an appropriate host device. An example of this process is shown in FIG. 3-20. At 3-336, the host device establishes a secure session with the flash device. The host device instantiates the SNAP Renewable Logic at 3-338, and requests playback of the movie stored on the flash drive at 3-340. The flash device provides the movie's hash table and encrypted key bundle to the host device at 3-344. The host controller authenticates the movie's segment chain log at 3-346 to ensure that the copy of the content is valid. Upon authentication, the host can play the movie.

Playing the movie or other content launches a final process in the authentication and security structure. An example of this is shown in FIG. 3-21. The host controller plays the movie by requesting the movie segments previously downloaded into the flash device at 3-346. The segments are received at 3-348. These segments may be second order segments as discussed in detail above with regard to watermarking.

The hash of the segment is authenticated against the previously provided value in the encrypted hash table at 3-350. The chain log for that segment is provided at 3-352 from the flash device, which the controller uses to compute the key for that segment at 3-354. Once the key is computed, the host controller can decrypt the segment at 3-356 and render the content to a user.

In this manner, multiple levels of security, from the watermarking of the content to the generation of a unique identifier for the memory chips, the controller and the chipset upon which the content will be stored, protect the content providers from pirating of their content. The transactions discussed here, from the watermarking and loading of media files to the manufacture and binding of product components to the media files are tracked and recorded, allowing distribution of content while ensuring both protection of rights and the revenues that flow from those rights.

Thus, there has been described to this point a particular embodiment for a method and apparatus for a SNAP environment, watermarking of digital data at multiple levels, and authentication of carrying devices.

IV. Simple Nonautonomous Peering Media Clone Detection

The below discussion uses several terms that may become confusing. The discussion uses the term 'memory' and 'memory device' to refer to a non-volatile memory device that contains 'content.' 'Content' includes any type of experiential content and includes, but is not limited to, movies, television shows, recorded performances, video files, audio files, and games. The memory device may include removable memory, such as flash memory drives, so-called 'thumb' drives, memory cards, embedded flash memory including spinning and solid state hard drives, and memory sticks, but no limitation is intended, nor should any be implied by these examples. The memory device will be referred to here as 'content' memory, because it resides separately from on-board memory of a playback device, although it may be internal to the playback device.

The memory device may interface with a 'playback device,' where a playback device is any device having a controller, also referred to as a processor or a system on a chip (SoC), a memory and the ability to interface with the media, whether as embedded media or removable media. Examples include, but are not limited to, televisions, video projectors, digital video recorders, set-top boxes, kiosks, personal computers, and mobile computing devices including smart phones, media players, in-car players, netbooks and tablet computers.

FIG. 4-1 shows an embodiment of a playback device capable of playing content from a memory device. The playback device 4-10 has a controller 4-12 that performs the validation of the memory as described below. During this validation process, the controller may access a device memory, 4-14. The device memory 4-14 is the 'on-board' memory that exists in the playback device separate from the content memory containing the content. The playback device also has a port 4-16 to accept the memory device. In the case of embedded memory, the port may take the form of a connector to connect between the processor and the embedded memory. The embedded memory will still be referred to here as the 'content memory' to separate it from the device memory used for device operation.

As stated above, the memory device may take one of many different forms, including CompactFlash; MultiMedia Cards (MMC), including Reduced Size-MMC; Secure Digital (SD) cards, including mini-SD and micro-SD; and Memory Sticks. These of course are merely examples of the different memory formats and form factors, which may also be embodied in memory devices such as 4-20 that connect to the playback device by an external connector 4-22, such as Universal Serial Bus (USB) connectors, and those that comply with IEEE standard 1394, also referred to as 'firewire.' In the embodiment of embedded memory including hard disks, the content memory device may communicate with the controller using IDE (Integrated Drive Electronics), SATA (Serial Advanced Technology Attachment), SCSI (Serial Computer System Interface), SAS (Serial Attached SCSI) or USB interfaces.

The memory device will typically be a 'flash' memory device, meaning an electrically programmable/erasable non-volatile memory device. These types of devices may be manufactured according to many different metal and semiconductor technologies. Generally, they fall within two different types of operational technologies, those NOR (not OR) flash memory and NAND (not AND) memory devices. Currently, the prevalent type of flash memory is NAND flash memory, but NOR flash memory devices are well within the scope of the embodiments discussed here.

Any type of flash memory device, whether based upon complementary metal-oxide semiconductor technologies, or other types of memory technologies, is within the scope of the embodiments here, as many of them have similar characteristics as to their organization and some of their operations. This includes single level cell (SLC) or multilevel cell (MLC) technologies.

For example, in NAND flash memory, programming the memory changes bits from a logic one to a logic zero. Erasure resets all bits back to one. The memory is organized into pages and blocks. Erasure happens a block at a time, with block sizes typically being 64, 128 or 256 KB. NAND flash devices may also include bad block management, a process by which bad blocks are identified and mapped either at runtime or at manufacture. Many devices also now include wear leveling, where the writing of data is rotated among blocks to prolong the life of the memory cells that will eventually degrade over repeated write/read cycles.

In NAND flash devices, each block consists of a number of pages, each page may have a typical size of 512, 2,048, or 4,096 bytes in size plus a few bytes to store an error correcting code (ECC) checksum and other metadata necessary for the operation of the memory array. Reading and programming of these devices is typically done on a page basis. Erasure is done on a block basis. NAND devices typically also have bad block management by the device driver software, or by a separate controller chip. SD cards, for example, include controller circuitry to perform bad block management and wear leveling. When a logical block is accessed by high-level software, it is mapped to a physical block by the device driver or controller. A number of blocks on the flash chip may be set aside for storing mapping tables to deal with bad blocks, or the system may simply check each block at power-up to create a bad block map. The overall memory capacity gradually shrinks as more blocks are marked as bad. These set aside blocks for mapping tables or the memory region in which the power-up (runtime) maps are stored constitute the defined region.

Most NAND devices are shipped from the factory with some bad blocks which are typically identified and marked according to a specified bad block marking strategy. By allowing some bad blocks, the manufacturers achieve far higher yields than would be possible if all blocks had to be verified good. This significantly reduces NAND flash costs and only slightly decreases the storage capacity of the parts.

While the embodiments herein may be applied to either NAND or NOR flash memories, no such limitation is intended nor should it be implied. The embodiments here could be applied to any type of memory device that has bad block management and the ability to use bad block maps and known data patterns to determine an expected data pattern when validating the memory device. Memory devices include hard disk drives, both 'traditional' spinning disks with readers and solid state hard drives.

FIG. 4-2 shows an example of a memory device 4-20. As described above, the memory device 4-20 may be organized as pages and blocks, where a block is made up of a number of pages. Alternatively, the memory may be organized in sectors. In either case, the memory has 'regions,' meaning some predetermined subset of memory cells that is smaller than the overall size of the memory device.

Within the memory array, the manufacturer or content provider that has provided the content stored by the memory device has defined a region 4-24. The region may consist of some set of blocks, pages, or sectors. The region has a known defect map, either generated by a SNAP server before content is delivered to the media, or determined at manufacture of the memory device. If the defect map has been determined at manufacture of the memory device, the memory device may store the defect map in a second region 4-26 of the memory device.

By using the defect maps of the individual memory devices, the content provider will have a characteristic of the memory array usable to validate the memory device and therefore unlock the content. Validation of the memory device allows the content providers to ensure that only authorized memory devices carry their content, as opposed to devices to which their content has been copied in violation of their copyrights. This discussion may refer to these devices as 'cloned' devices.

In order to replicate the content and still allow the memory device to appear valid, the pirates would have to determine the exact location of the defined region, have access to a known data pattern used in validation and the defect map of the memory device. The computing power to determine this will typically prohibit a pirate from having the capability of producing memory devices that validate in the playback devices and allow playing of the content.

FIG. 4-3 shows one embodiment of a method to validate a memory device in a playback device. As mentioned above, the process uses known random data patterns to validate the memory device. The playback device may generate the known data pattern each time for validation, or generate it once and store it in the playback device memory, at 4-32. Alternatively, the content providers or memory device manufacturers may provide the known data pattern and/or the defect map, in which case the playback device receives it at 4-30, either one time and then stored or while connected to a content or validation server.

In the case where the known data pattern or defect map is provided by the manufacturer or content provider, the defect map will typically be signed to allow authentication/validation. For example, the manufacturer may provide the defect map in the metadata that accompanies the memory device and may have already written the known data pattern to the defined region in the memory.

The playback device would then access the known data pattern at 4-34, where accessing the known data pattern may involve retrieving it from the playback device memory, generating the known data pattern or receiving it in real-time. As mentioned above the known data pattern may be stored at 4-36, but this is optional.

Once the device has the known data pattern, it writes the known data pattern to the defined region in the memory device at 4-40. The playback device then reads data from the defined region at 4-42. The data read from the defined region should correlate to the known data pattern altered in a manner determined by the defect map. For example, in the known data pattern, the playback device writes a 1 to the memory cell corresponding to bit 3. However, because of the defect map, the playback device 'knows' that the cell storing bit 3 has a defect. Therefore, the expected data pattern will return the known data pattern, except that bit 3 will be a 0 instead of a 1. This simplified example demonstrates how the defect map produces a unique data pattern upon reading from the defined region. The discussion will refer to the read data pattern altered by the defect map as the 'expected data pattern', generated by the playback device at 4-50.

In the embodiment where the known data pattern and/or defect map have been provided by the manufacturer, the process may skip from the receiving of the known data pattern and defect map to the reading of the data from the defined region at 4-42. This process may occur in several ways. For example, the playback device may read the data from the defined region using the error correction code to determine the known data pattern. Then the playback device may read the data from the defined region without using the error correction code. These patterns would then be used in the following comparison.

One should note that the expected data pattern may not actually reside in the playback device as a stored entity. The playback device may read the data back from the defined region and compare it to the known data pattern, then check the read data pattern against the defect map. A multitude of ways exists to make the comparison between the read data pattern and the expected data pattern at 4-44, all of which are within the scope of the embodiments here.

At 4-46, the playback device determines if the comparison result of the two patterns meets some correlation criteria, as they may not match exactly. For example, the defect in bit 3 may result in the data bit having the correct value when read back or having the opposite value. Note that the memory cells can be modeled by independent random variables, each with a certain probability of being defective (different cells having different probabilities). This is a well-studied problem in statistical analysis, and a standard correlation function used in this case is the Chi Square test. However, other correlation functions, including ad hoc functions, are within the scope of this invention. The process accounts for these kinds of unknown results by providing some correlation measure that has a high enough value that the memory device validates even though the patterns do not match exactly.

Indeed, in some cases, the patterns would actually be expected to not match exactly. In NAND flash devices, some devices may have intermittent defects, meaning that from read to read, a bit with an intermittent error may change state. This would result in the read data pattern to vary slightly from the expected data pattern. For example, a defect map may identify bit 3 of a particular portion of the memory to have an intermittent data error. In the known data pattern, bit 3 may be written as a data 1. The expected data pattern may expect a 0 at bit 3 because it has a defect. However, because it is an intermittent defect, bit 3 may return a 0 the first read and a 1 the second read.

This anomaly can be accounted for using a correlation measure such that the read data pattern correlation would vary from read to read. If it did not vary from read to read, where the read data pattern is the exact same each read, it may actually indicate that it is a cloned device. It would take considerably more logic circuitry and computing power to mimic the intermittent data errors.

Returning to FIG. 4-3, if the two patterns do not match within the correlation criteria, the process ends at 4-52. Ending the process may include application of some sort of anti-piracy measure such as memory device erasure, generation of a piracy report sent back to an on-line reporting house, etc. If the two patterns match within the correlation measure at 4-46, the playback device validates the memory device. Once validated, the playback device then allows access to the content on the memory device to allow the user to experience the content.

In this manner, content providers use an inherent characteristic of the memory device to validate the memory devices. Pirates would have to find memory devices that have the same defect maps or divine some way of spoofing a memory device defect map, get access to the known data pattern, and know the exact location of the defined region to replicate pirated content across cloned devices. The computing power this requires would prohibit the vast majority of pirating efforts.

V. Simple Nonautonomous Peering Network Media

The below discussion uses several terms that may become confusing. The discussion uses the term 'local memory device' to refer to a non-volatile memory device that contains 'content,' which is physically connected to the playback device. Local Memory Devices may be either removable or embedded. 'Content' includes any type of experiential content and includes, but is not limited to, movies, television shows, recorded performances, video files, audio files, and games. The memory device may include removable memory, such as flash memory drives, so-called 'thumb' drives, memory cards, embedded flash memory, spinning and solid state hard drives, and memory sticks, but no limitation is intended, nor should any be implied by these examples. The memory device will be referred to here as 'content' memory, because it resides separately from on-board memory of a playback device, although it may be internal to the playback device. The below discussion also uses the term 'network memory device' to refer to any content memory device accessible to a player via a 'SNAP private network.' A SNAP private network is a secure private network, wired or wireless that allows users to experience and/or manage content stored on memory devices connected to other devices within the network. This network may be established only for the brief periods of time when the users are actively downloading content, not as a pre-exiting network. A particular device may only join the network when downloading content.

FIG. 5-1 shows an embodiment of a playback device capable of playing content from a local or network memory device. The playback device 5-10 has a controller 5-14 that performs device authentication and media validation as described in the referenced co-pending applications. During this validation process, the controller may access a device memory, 5-24. The device memory 5-24 is the 'on-board' memory that exists in the playback device separate from the content memory containing the content. The playback device also has ports 5-12 and 5-22 to accept memory devices. In the case of embedded memory, the port may take the form of a connector to connect between the processor and the embedded memory. The embedded memory will still be referred to here as the 'content memory' to separate it from the device memory used for device operation.

As stated above, memory devices may take one of many different forms, or include different forms in different ports, including CompactFlash; MultiMedia Cards (MMC), including Reduced Size-MMC; Secure Digital (SD) cards, including mini-SD and micro-SD; and Memory Sticks. These of course are merely examples of the different memory formats and form factors, which may also be embodied in memory devices such as 5-20 that connect to the playback device by an external connector 5-22, such as Universal Serial Bus (USB) connectors, and those that comply with IEEE standard 1394, also referred to as 'firewire.' These are just examples and many different protocols may be used such as VESA (Video Electronics Standards Association) DisplayPort, protected by Digital Transmission Content Protection (DTCP), as well as many others. In the embodiment of embedded memory including hard disks, the content memory device may communicate with the controller using IDE (Integrated Drive Electronics), SATA (Serial Advanced Technology Attachment), SCSI (Serial Computer System Interface), SAS (Serial Attached SCSI) or USB interfaces.

The Playback Device 5-10 of FIG. 5-1 has a video port 5-16 which may be a High Definition Multimedia Interface, (HDMI), either wireless or wired that is protected by High-bandwidth Digital Content Protection (HDCP). In addition to the video port 5-16 for outputting video for playback, a Playback Device may also have an integrated video display, such that a user may experience their content directly from the playback device without needing to connect it to a television or other display device.

The Playback Device 5-10 of FIG. 5-1 further has a network port 5-26 which may be wired or wireless. In the case of a wireless port such as an IEEE 802.11 compliant wireless connection, security measures such as WPA2 or comparable encryption would be advisable in order to allow the device to communicate with a SNAP secure network, or other network resources such as a high speed internet connection. The secure network allows users to manage content across all devices within the network, as well as enabling a network playback mode as described later.

FIG. 5-2 shows one embodiment of a playback device containing an integrated display 5-35. The playback device of FIG. 5-2 also has a video output that may be wireless or wired HDMI protected by the DTCP protocol. SNAP Media 5-36 is connected to the playback device 5-34. Following successful NNL authentication and SNAP media validation as described in the referenced art, the user may experience the content directly from the integrated display 5-35, or may choose to output the playback via the video port 5-32 to a display 5-30. In this configuration, all NNL and SNAP cryptographic functions and processing functionalities are performed by the controller of playback device 5-34. The NNL (Naor-Naor-Lotspiech) key management is a key management technique. While it is used here, other types of security key protocols may also be used. SNAP cryptographic functions include striping, where content files are divided into segments, each encoded differently, and binding, where the content files downloaded to a particular device or memory device are bound to the device using unique identifiers for the device.

FIG. 5-3 shows two SNAP playback devices (5-42 and 5-58) connected by a SNAP secure network 5-52. In this configuration, a user operating playback device 5-42 may choose to play content A (50) locally from content memory device 5-46 as described in FIG. 5-2. Additionally, a user may request "Network Media", whereby playback device 5-42 can communicate with the playback device 5-58 via the secure network 5-52 to gain access to content B (66) stored on content memory device 5-64.

In order to gain access to content memory device 5-62, playback device 5-42 first completes NNL MKB Update (media key bundle) protocol and AKE (Authenticated Key Exchange) with playback device 5-58 to verify that both devices share the most current NNL data available to them and that neither playback device's device keys have been revoked. Following successful AKE, playback device 5-58 grants playback device 5-42 access to its local content memory device 5-62 which it has already validated either at insertion, power on, or reset.

Playback device 5-42 may now continue with the playback routine as described in the referenced art, performing all NNL and SNAP cryptographic functions as if content memory device 5-62 were local to it with playback device 5-58 serving as a proxy only. The processed content could then be output from the video port of playback device 5-42 for playback on display 5-40. Similarly, if playback device 5-42 has an integrated display as described in FIG. 5-2, the content may be displayed directly on the integrated display.

Under certain circumstances, it may be necessary to perform certain aspects of media validation that would be adversely affected by network latency. In this scenario, playback device 5-42 can direct playback device 5-58 to perform the necessary validation functions locally and respond with the results.

FIG. 5-4 shows a playback device at 5-50 discovering a content memory device at insertion, power on, or reboot. At 5-56 the playback device attempts to read media descriptive metadata which may include, but is not limited to box art, titles, cast, genera, etc., which the playback device uses to present a user interface and related functions. It should be noted that none of the descriptive metadata read at 5-56 is considered "security sensitive." At 5-58, the playback stores descriptive metadata in its system memory for use in presenting a user interface. At 5-60, the playback device presents a graphic user interface, allowing users to browse, manage, or play content stored on content storage devices attached to the playback device.

FIG. 5-5 shows a user selecting "network media" at 5-70. At 5-72 the playback device polls other devices in the secure network. Peers found at 5-74 are checked against the playback device's latency log to determine if they have been tested for sufficiently low latency to support network playback. If peers have a valid entry in the latency log, the player requests and receives content descriptive metadata from peers at 5-78. The metadata is stored in the playback device's system memory at 5-82, and used to populate a user interface at 5-84. The purpose of the latency test is to make sure the player and the device that has the content are both on the user's local network. In other words, the media device is not providing the content across the Internet, which would defeat the content owner's copyright. Latency testing is well known in the art, for example, it is practiced in the Digital Transmission Content Protection protocol.

Figures 1, 2, 3, 4, 5, 6:
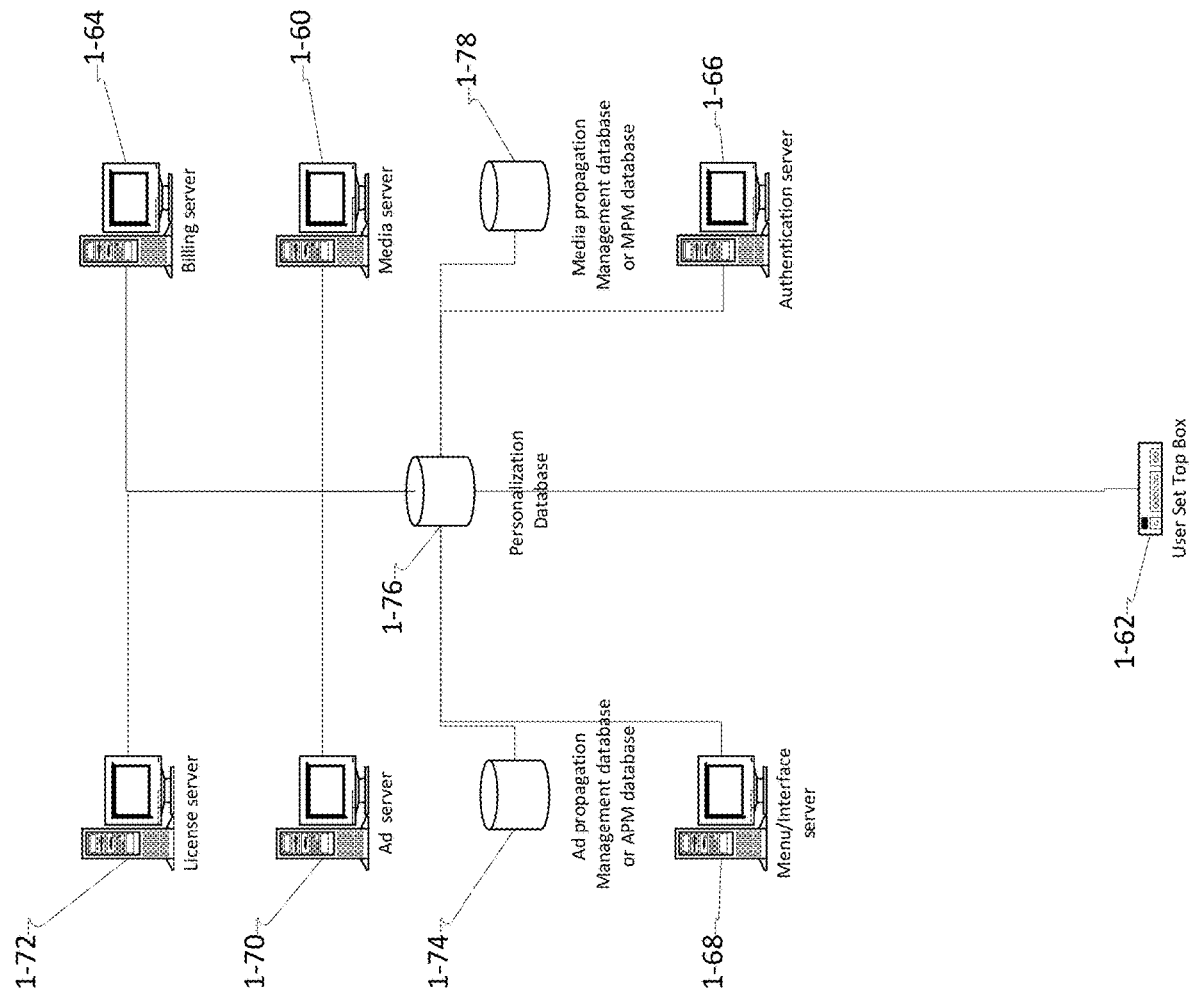
Figures 1, 2, 3, 4, 5, 6, 7, 8, 9:
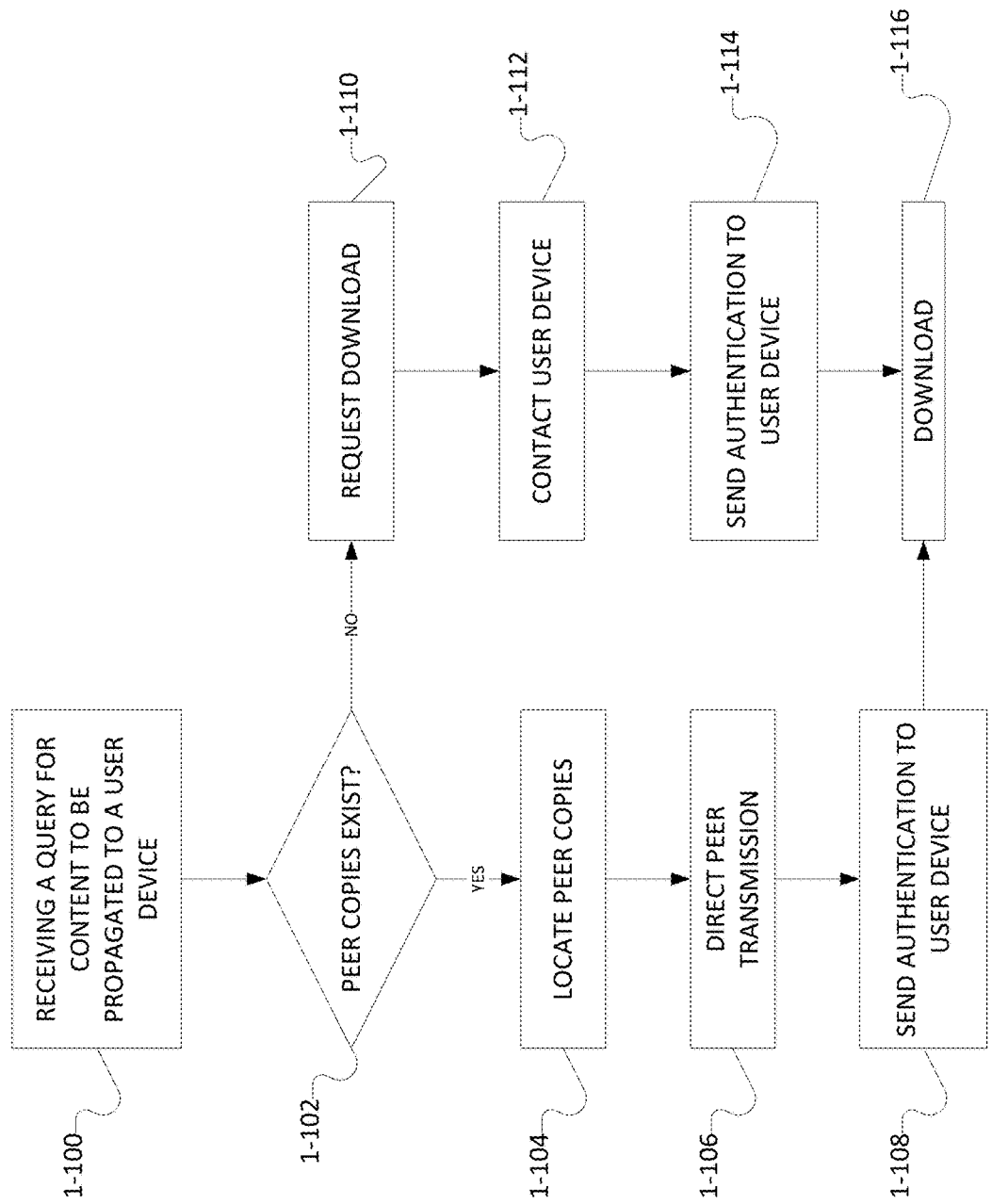
Figures 1, 2, 3, 4, 5, 6, 7, 8, 9, 10:
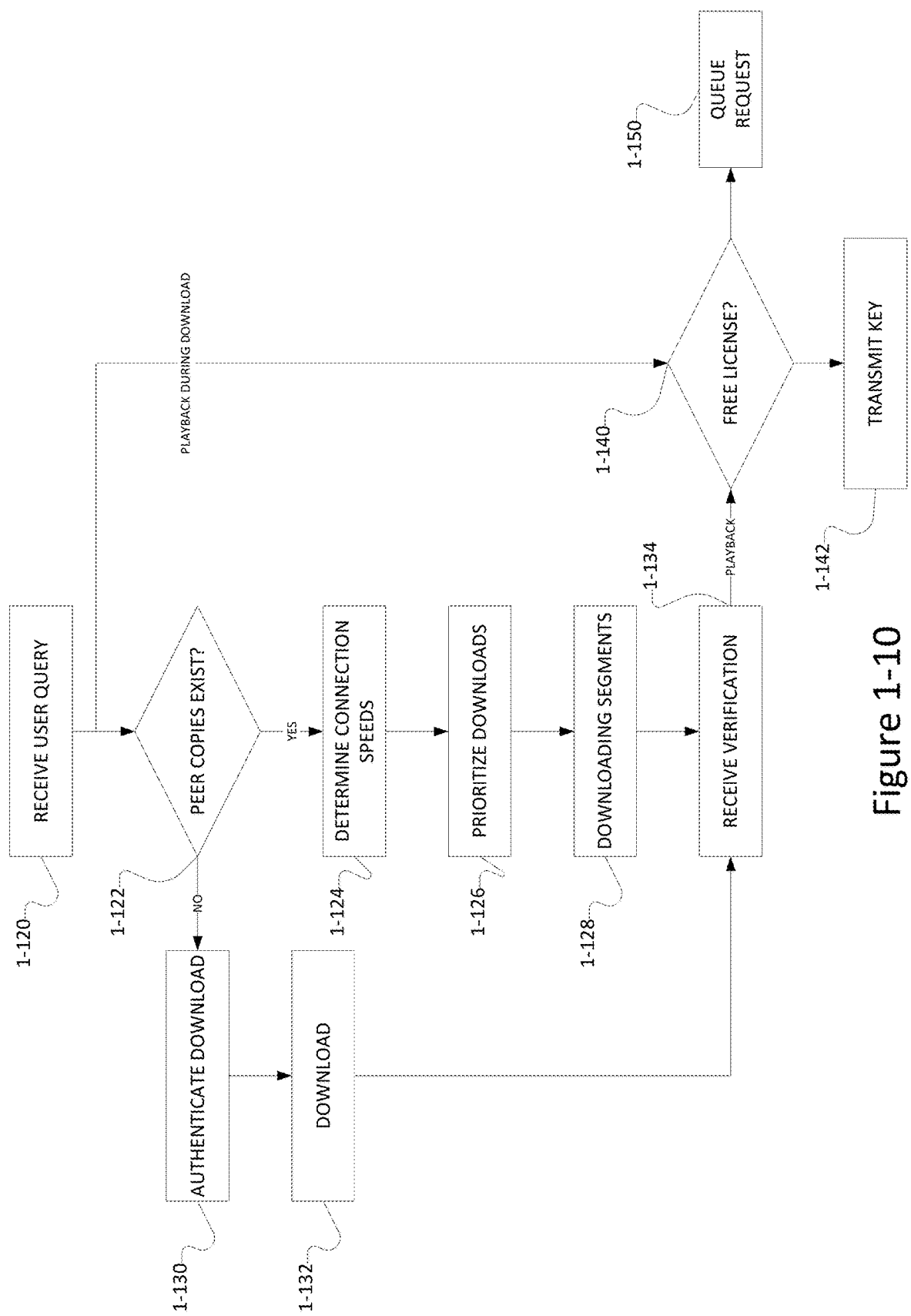
Figures 1, 2:
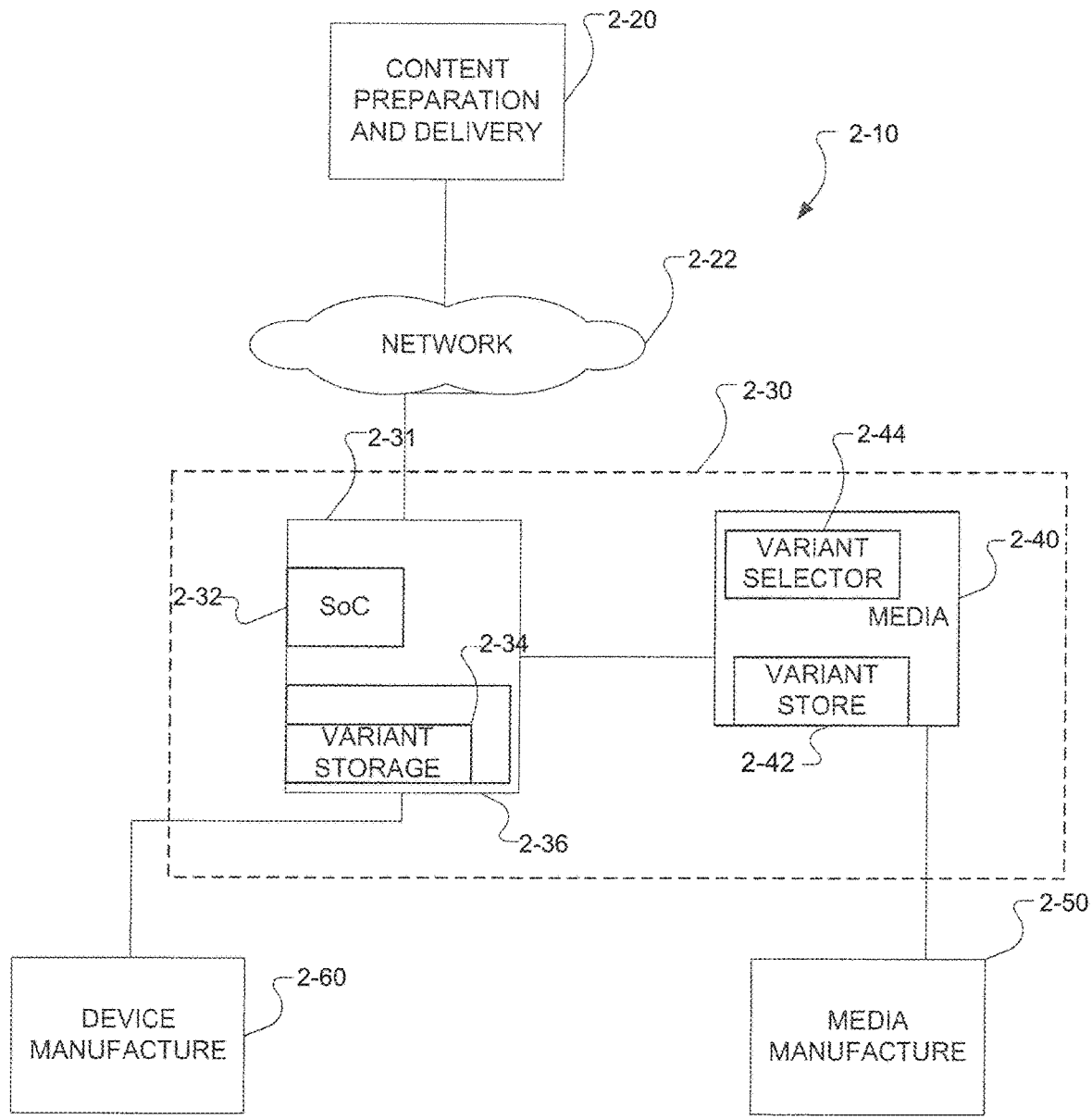
Figure 2:
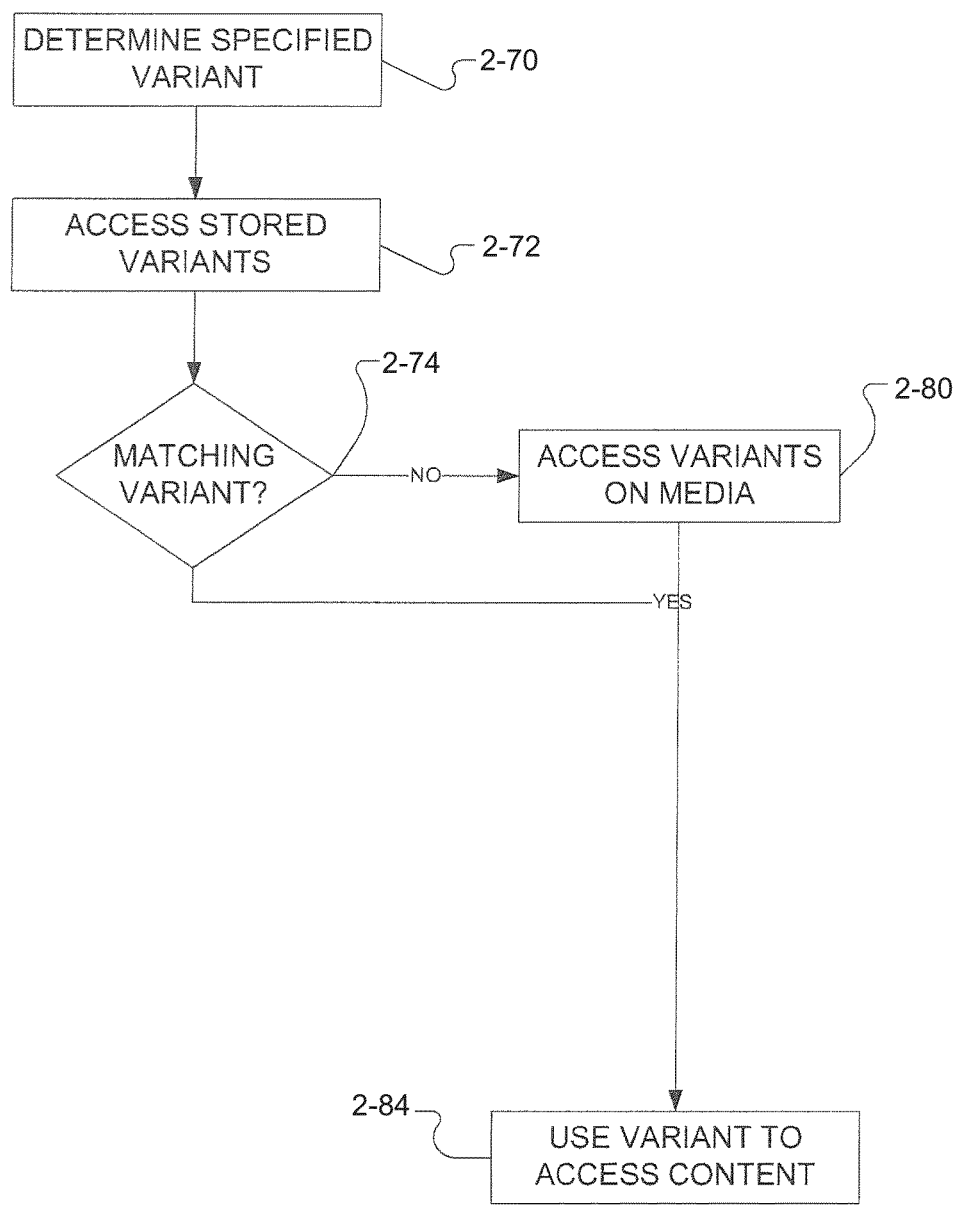
Figures 2, 3:
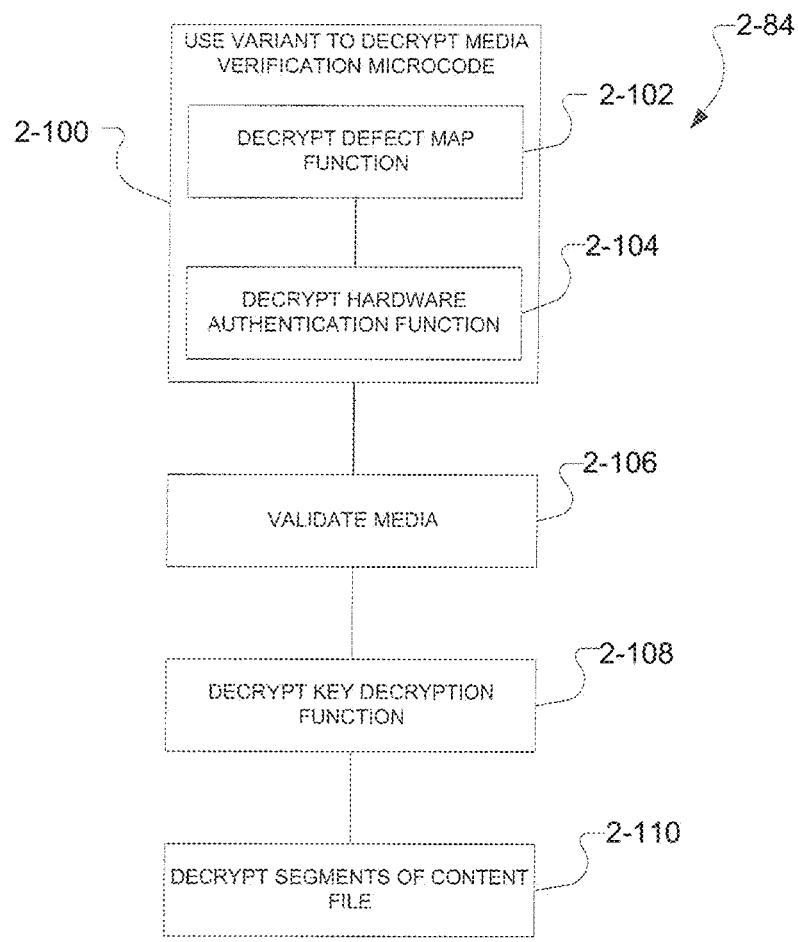
Figures 1, 3:
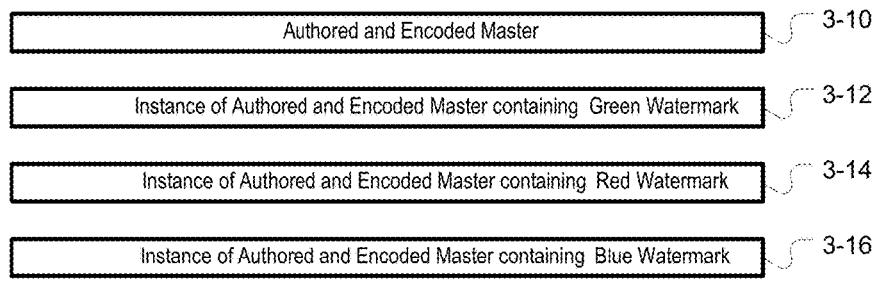
Figures 2, 3:
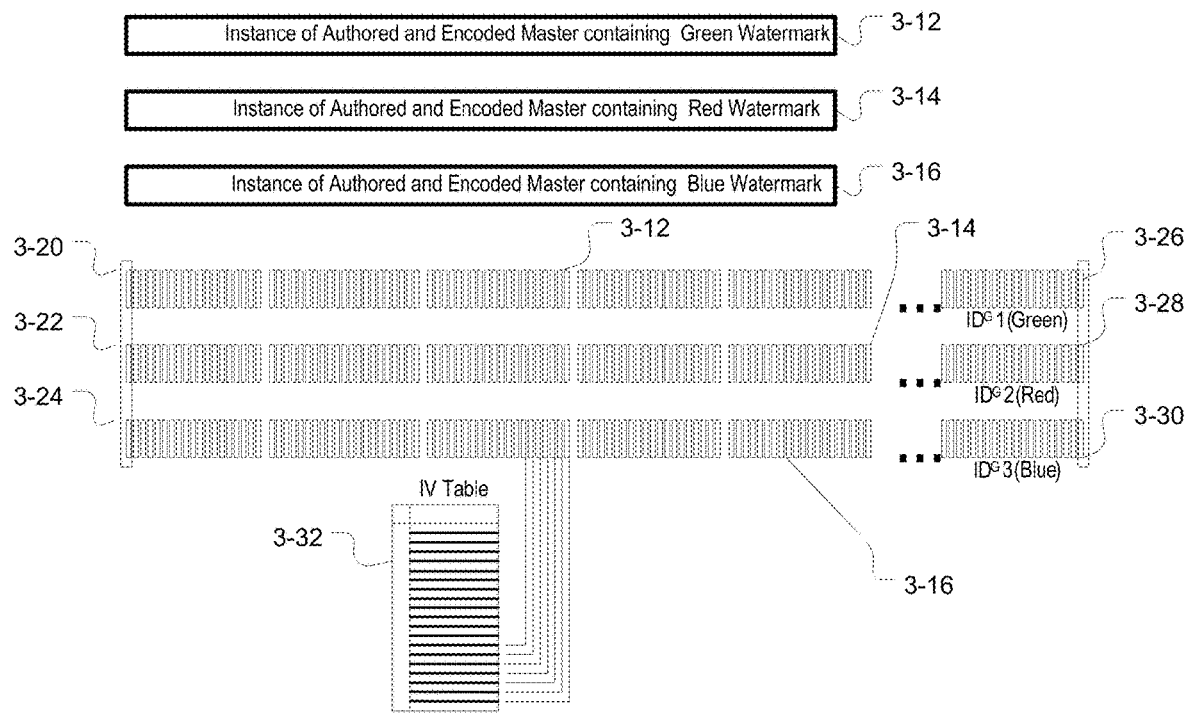
Figure 3:
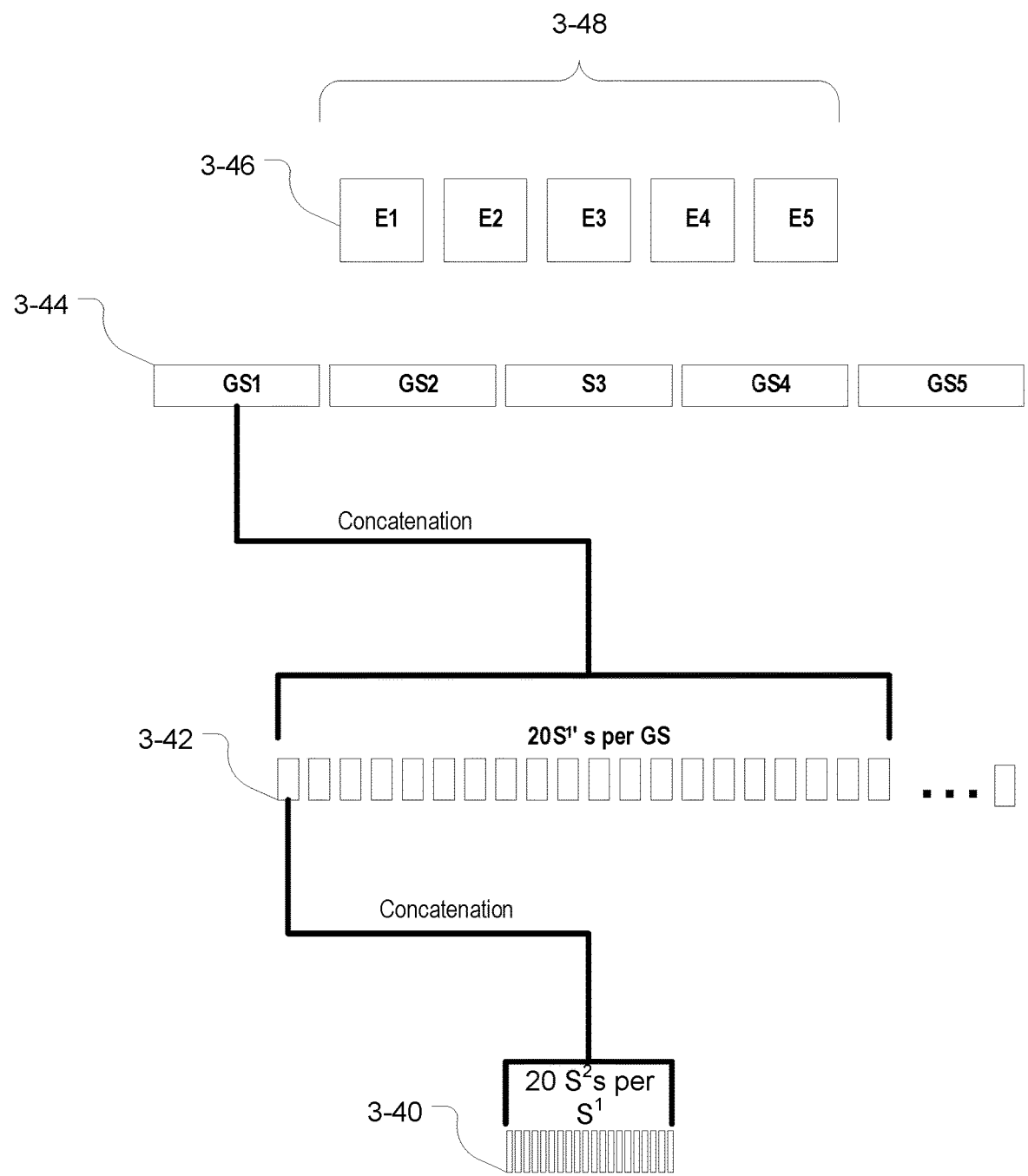
Figures 3, 4:
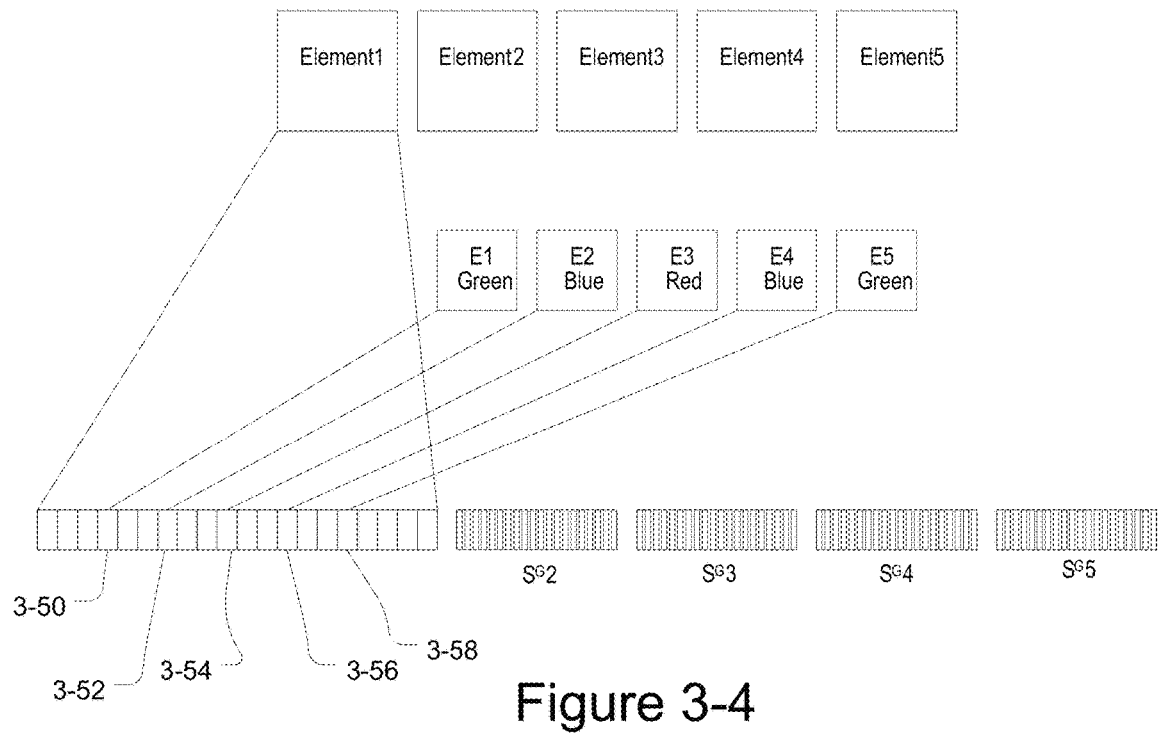
Figures 3, 4, 5:
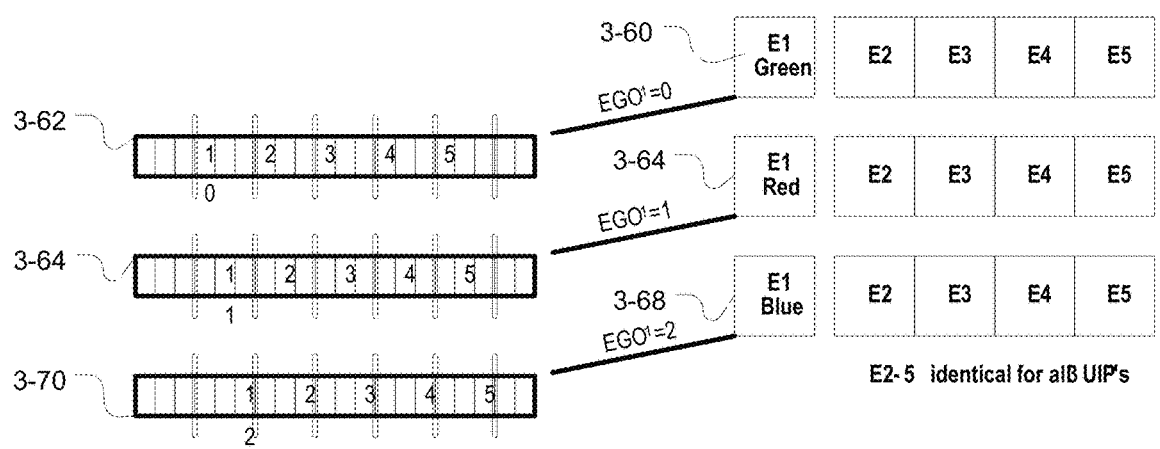
Figures 3, 4, 5, 6:
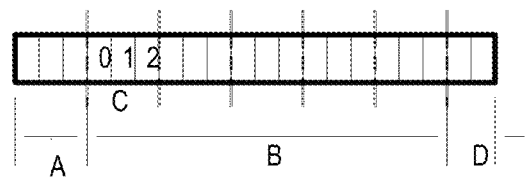
Figures 3, 4, 5, 6, 7:
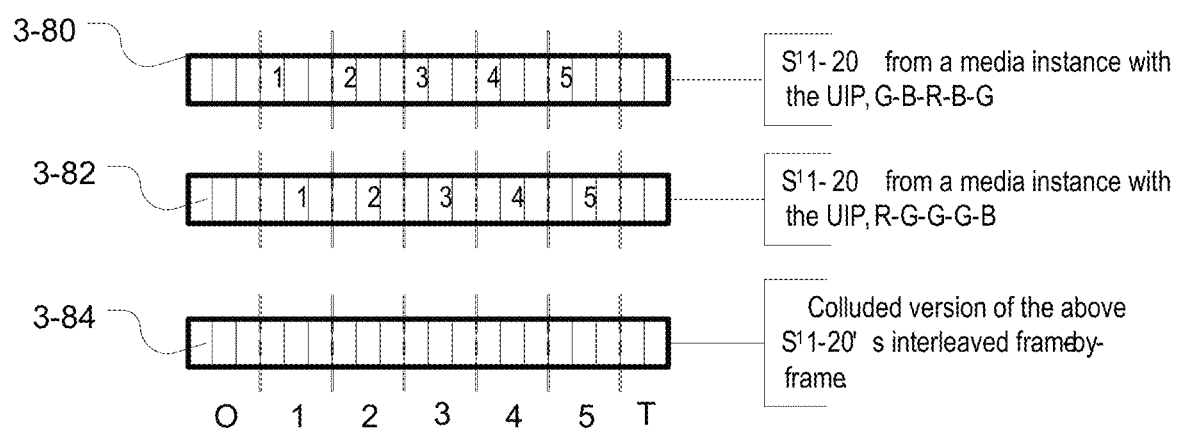
Figures 3, 4, 5, 6, 7, 8:
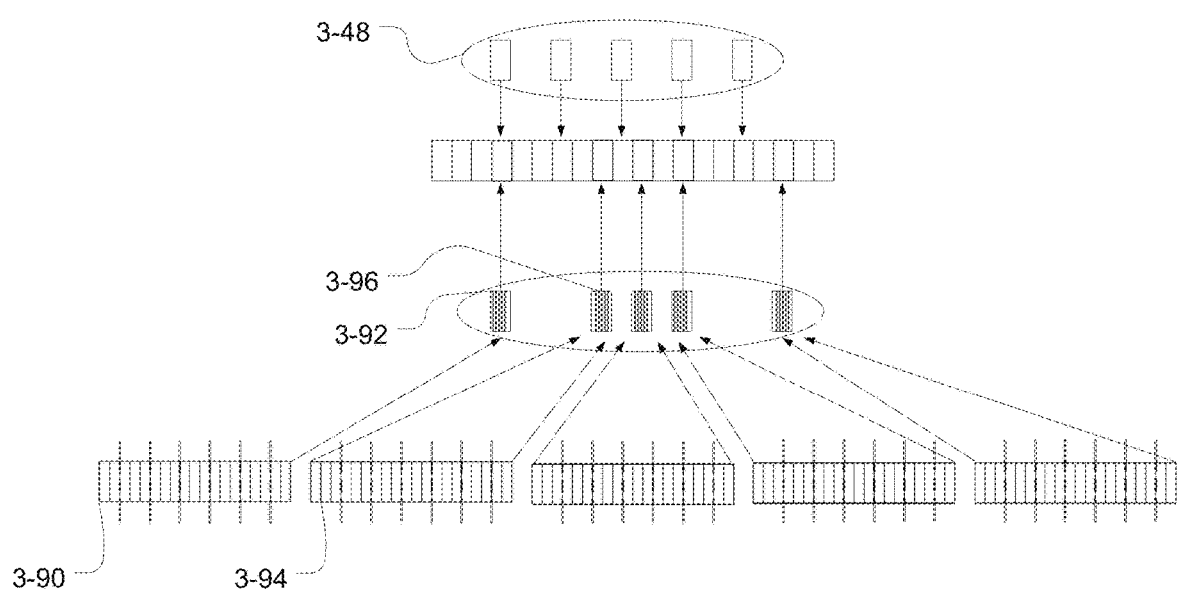
Figures 3, 4, 5, 6, 7, 8, 9:
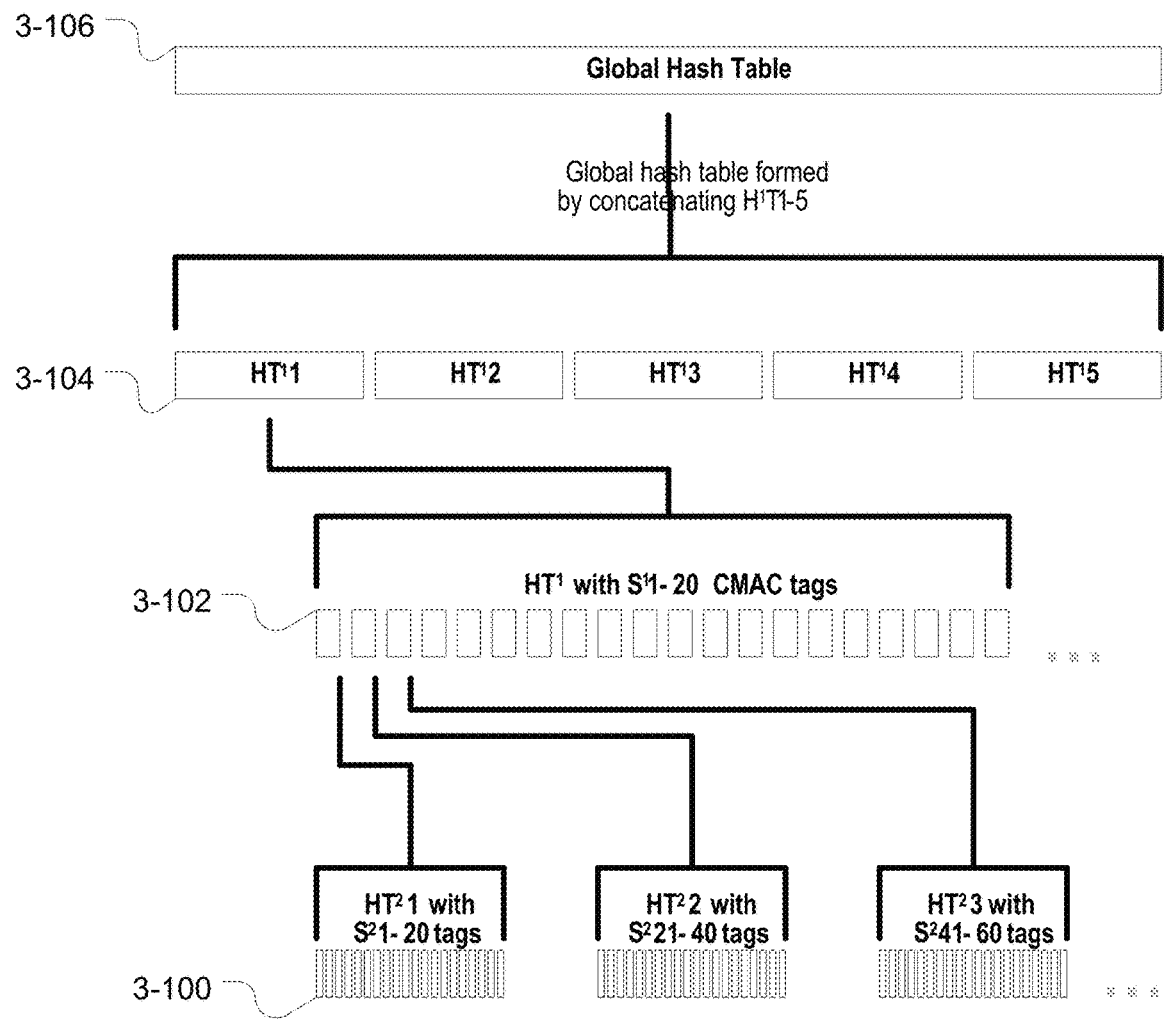
Figures 3, 4, 5, 6, 7, 8, 9, 10:
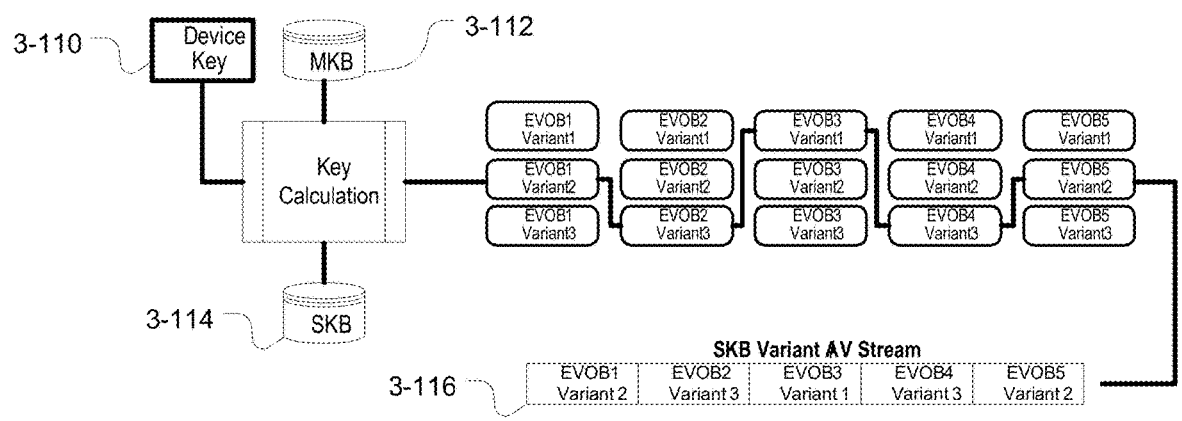
Figures 3, 4, 5, 6, 7, 8, 9, 10, 11:
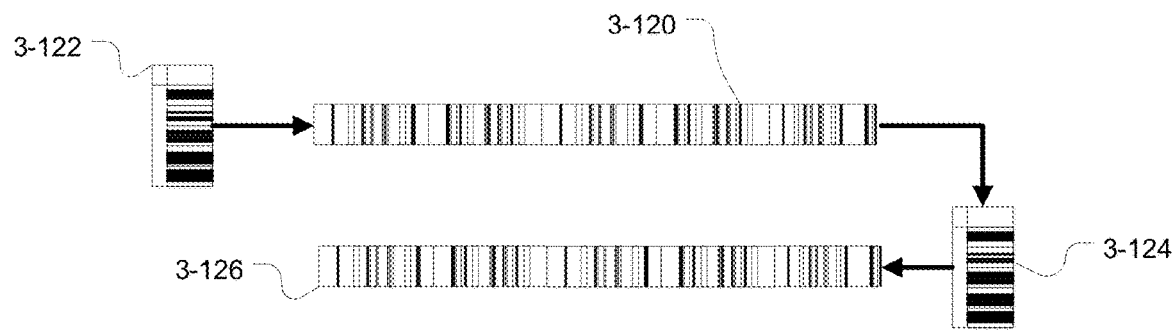
Figures 3, 4, 5, 6, 7, 8, 9, 10, 11, 12:
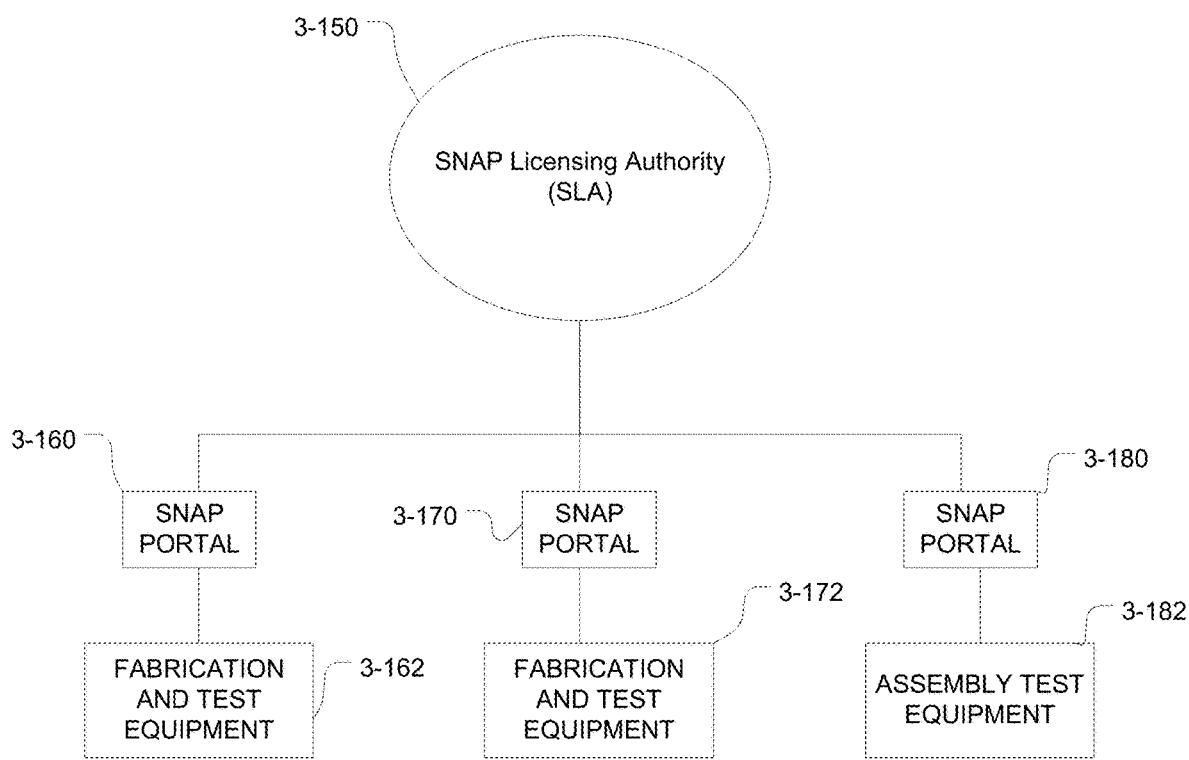
Figures 3, 4, 5, 6, 7, 8, 9, 10, 11, 12, 13:
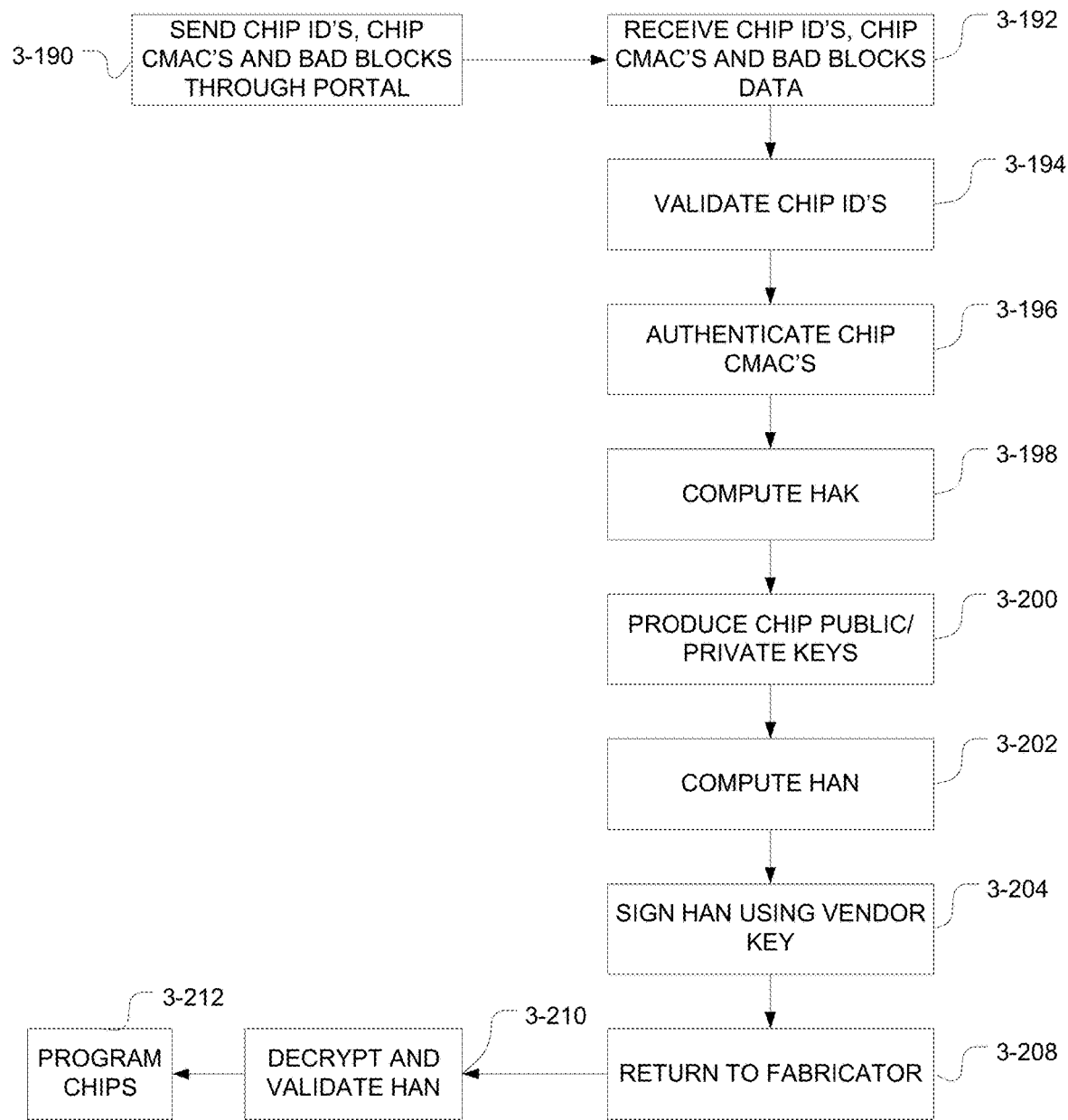
Figures 3, 4, 5, 6, 7, 8, 9, 10, 11, 12, 13, 14:
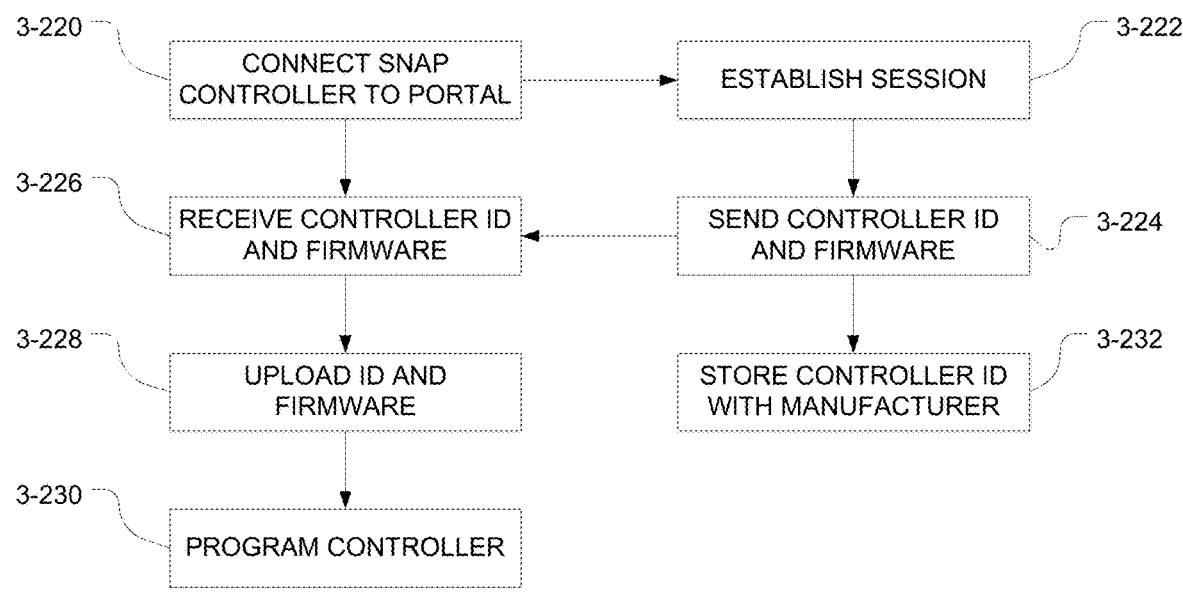
Figures 3, 4, 5, 6, 7, 8, 9, 10, 11, 12, 13, 14, 15:
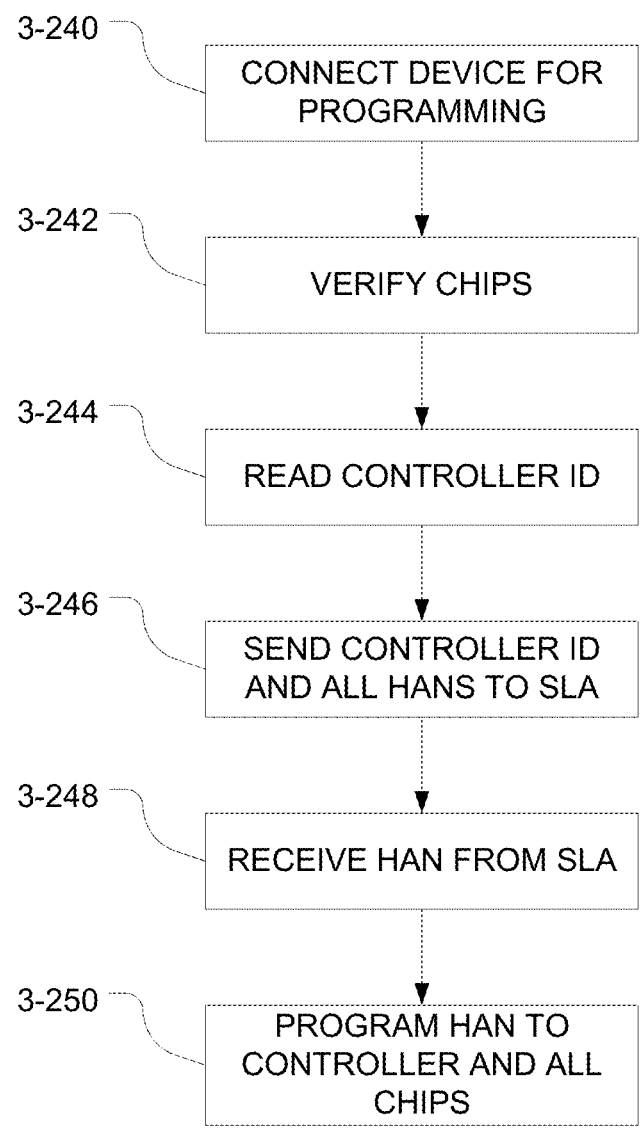
Figures 3, 4, 5, 6, 7, 8, 9, 10, 11, 12, 13, 14, 15, 16, 17, 18:
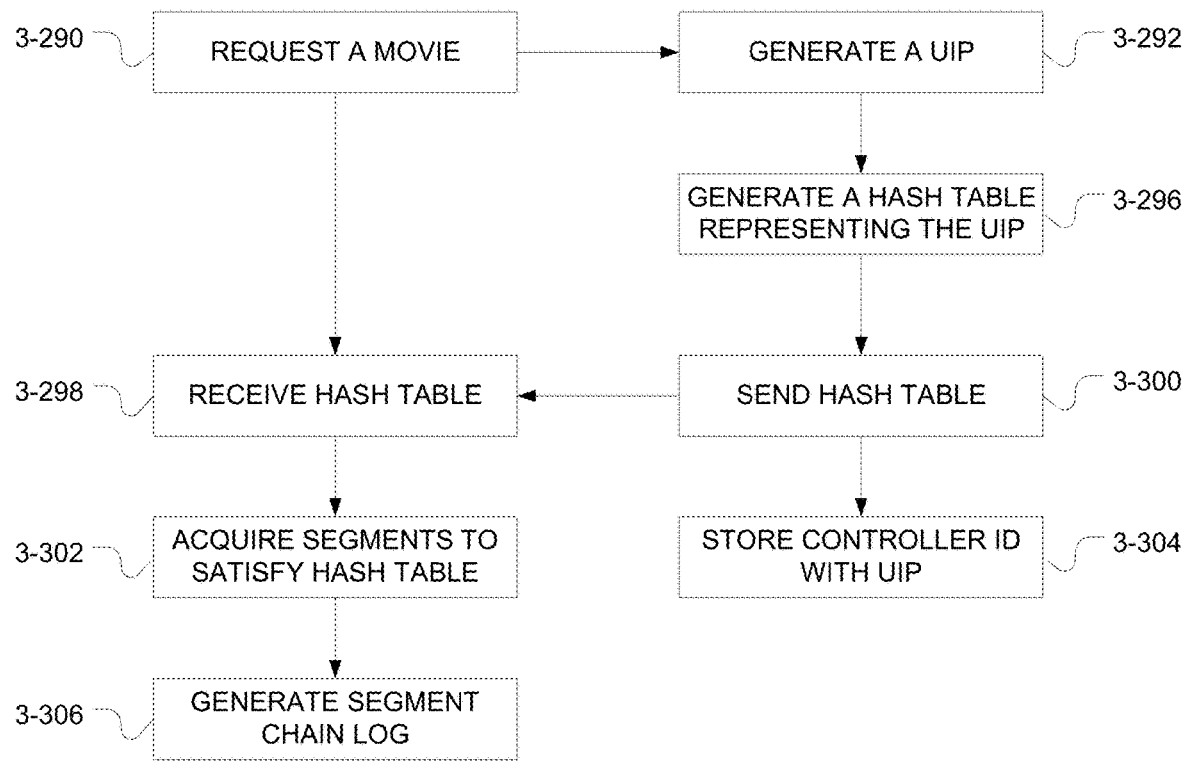
Figures 3, 4, 5, 6, 7, 8, 9, 10, 11, 12, 13, 14, 15, 16, 17, 18, 19:
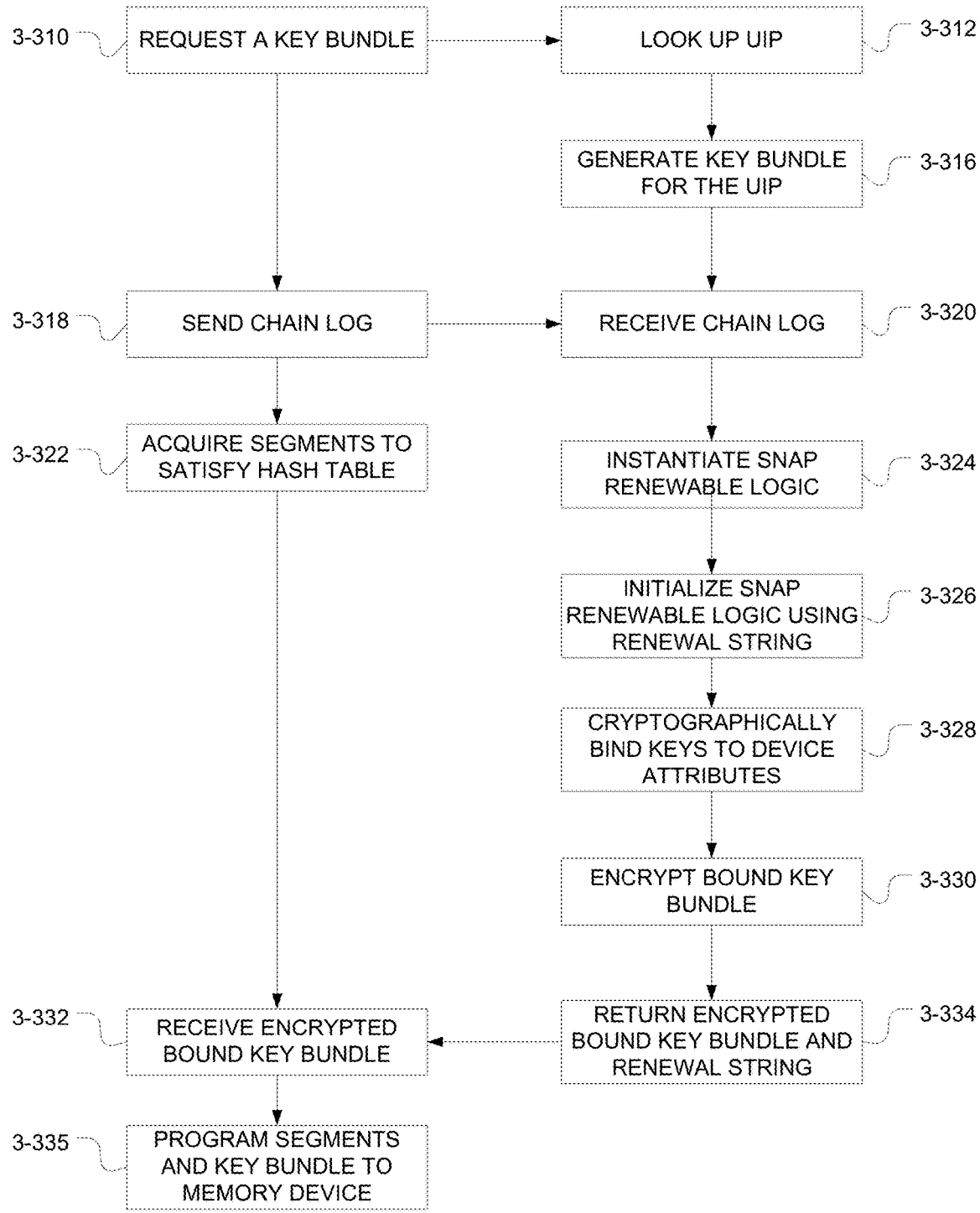
Figures 3, 4, 5, 6, 7, 8, 9, 10, 11, 12, 13, 14, 15, 16, 17, 18, 19, 20:
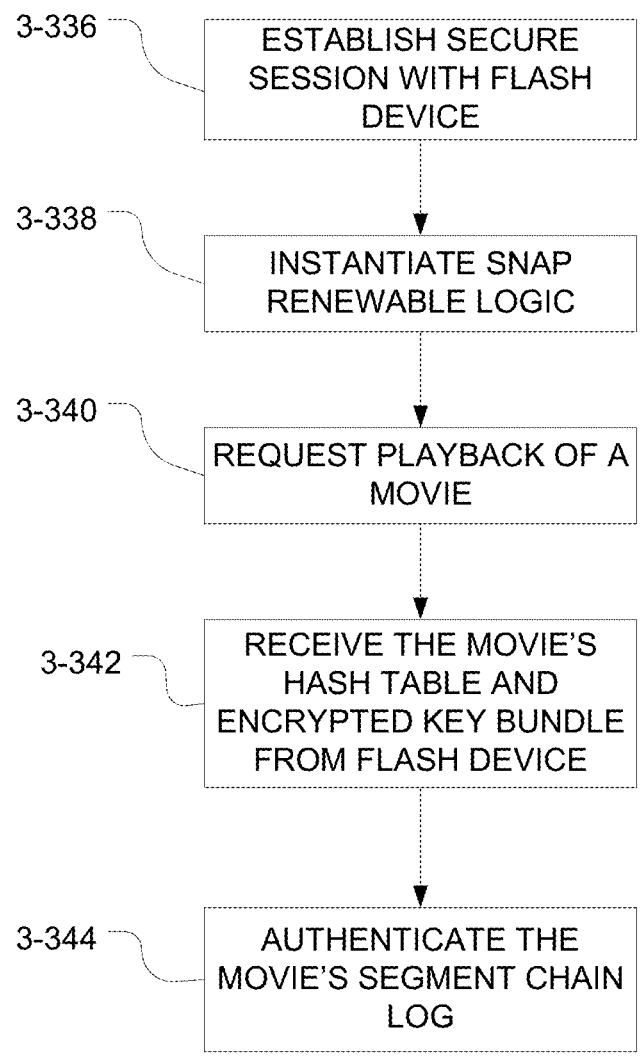
Figures 3, 4, 5, 6, 7, 8, 9, 10, 11, 12, 13, 14, 15, 16, 17, 18, 19, 20, 21:
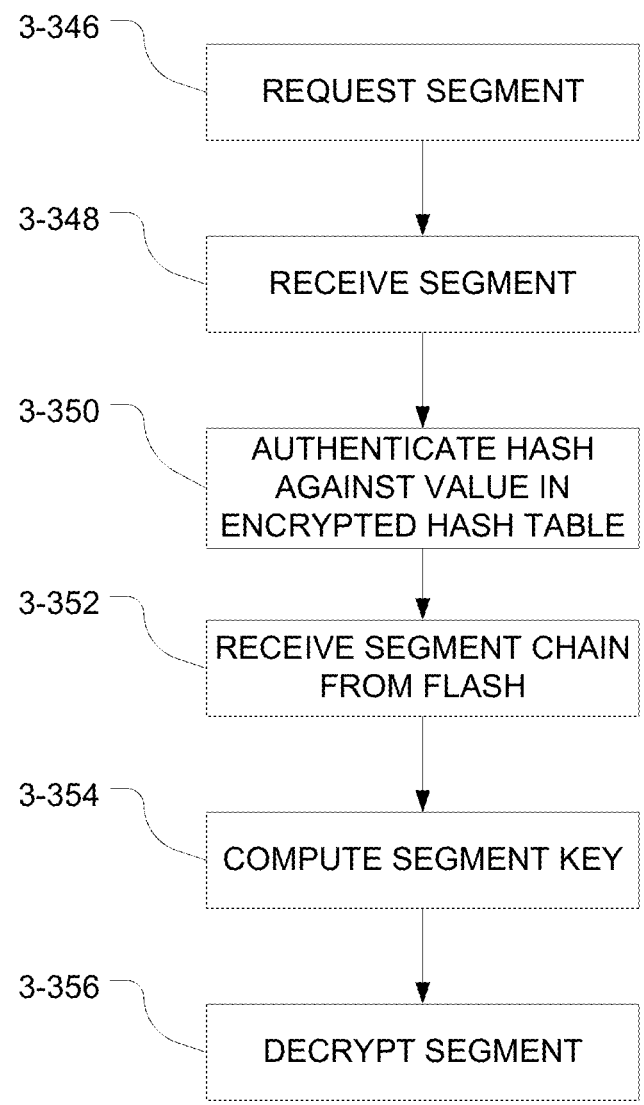
Figures 1, 4:
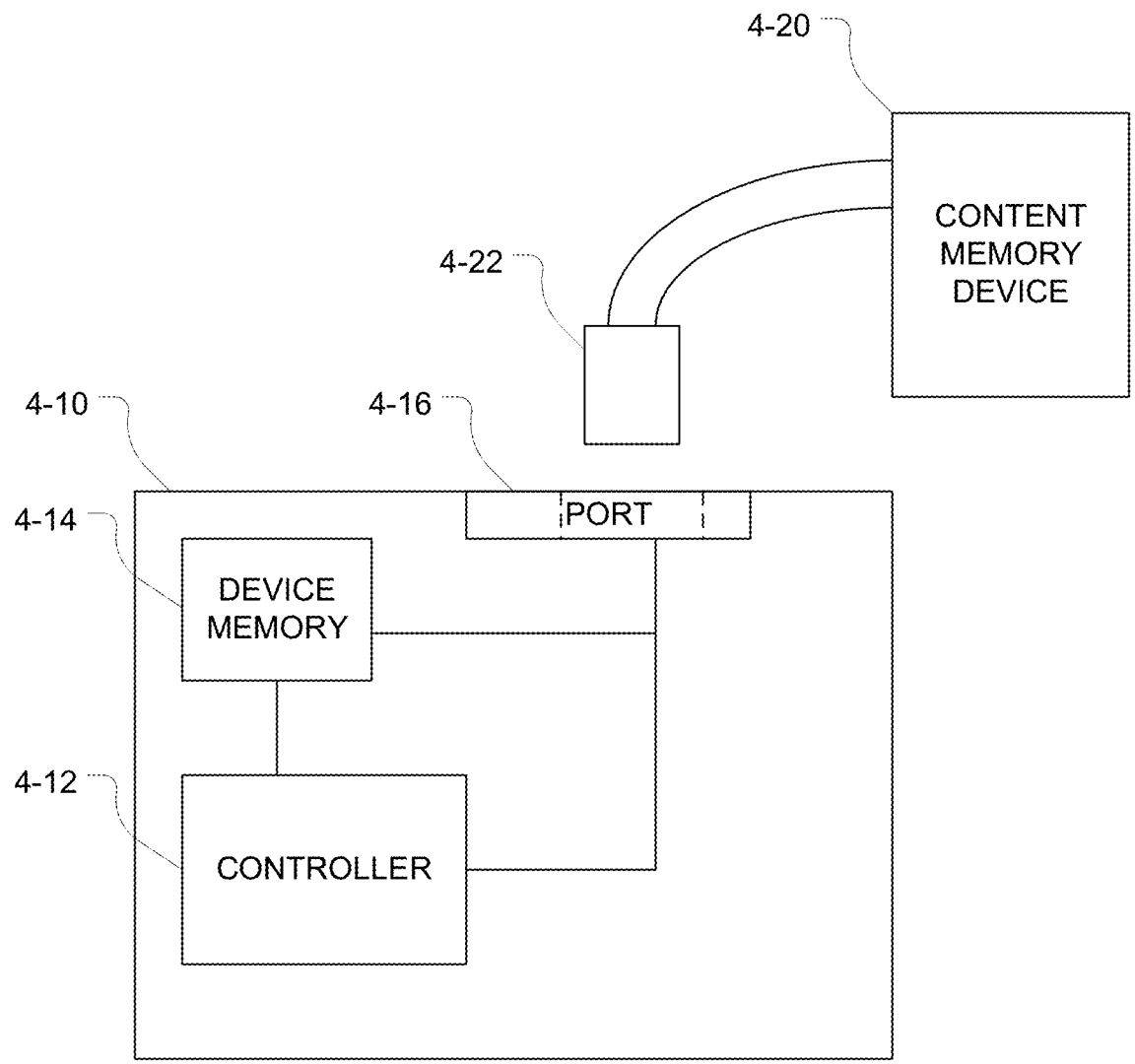
Figures 2, 4:
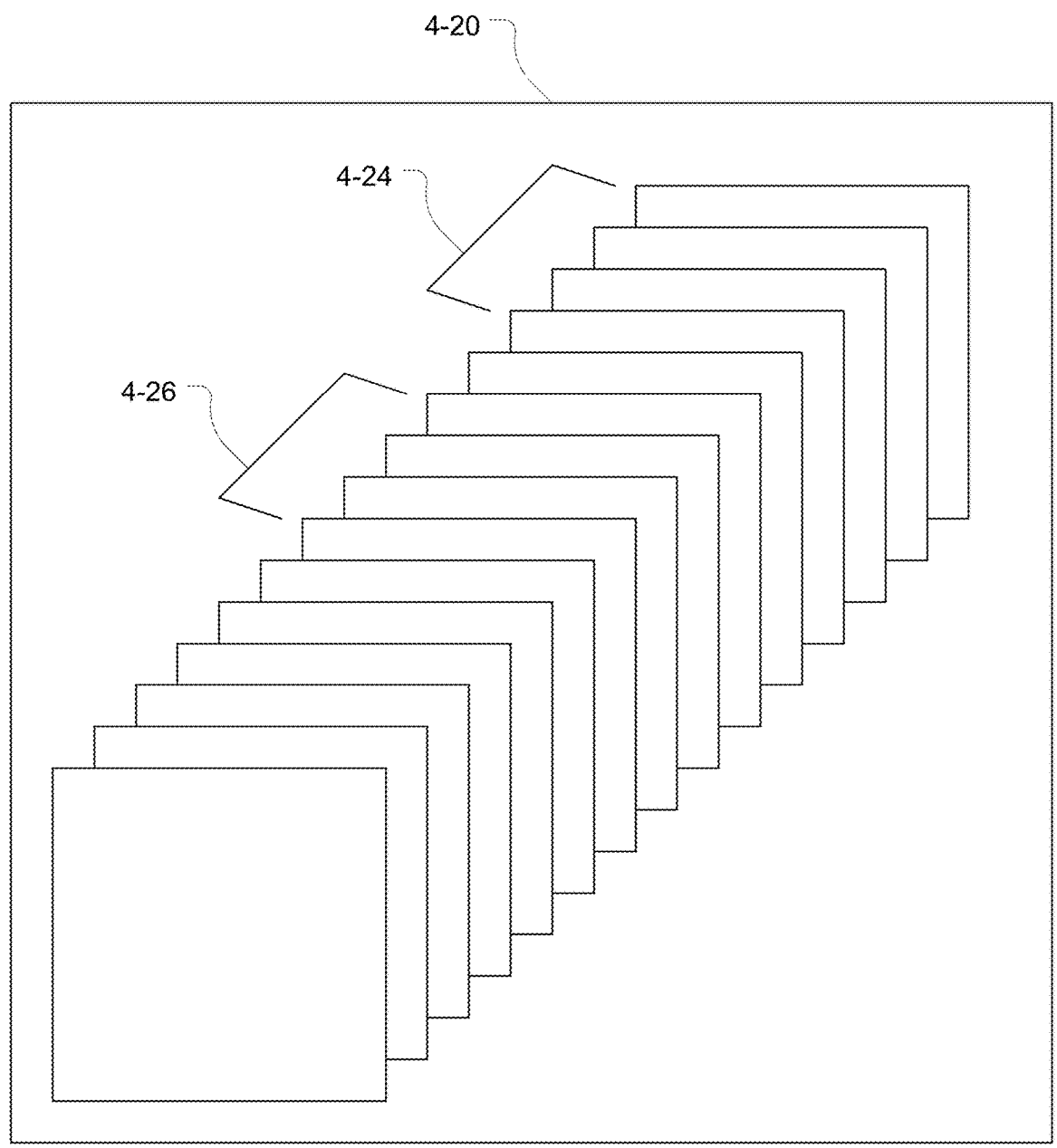
Figures 3, 4:
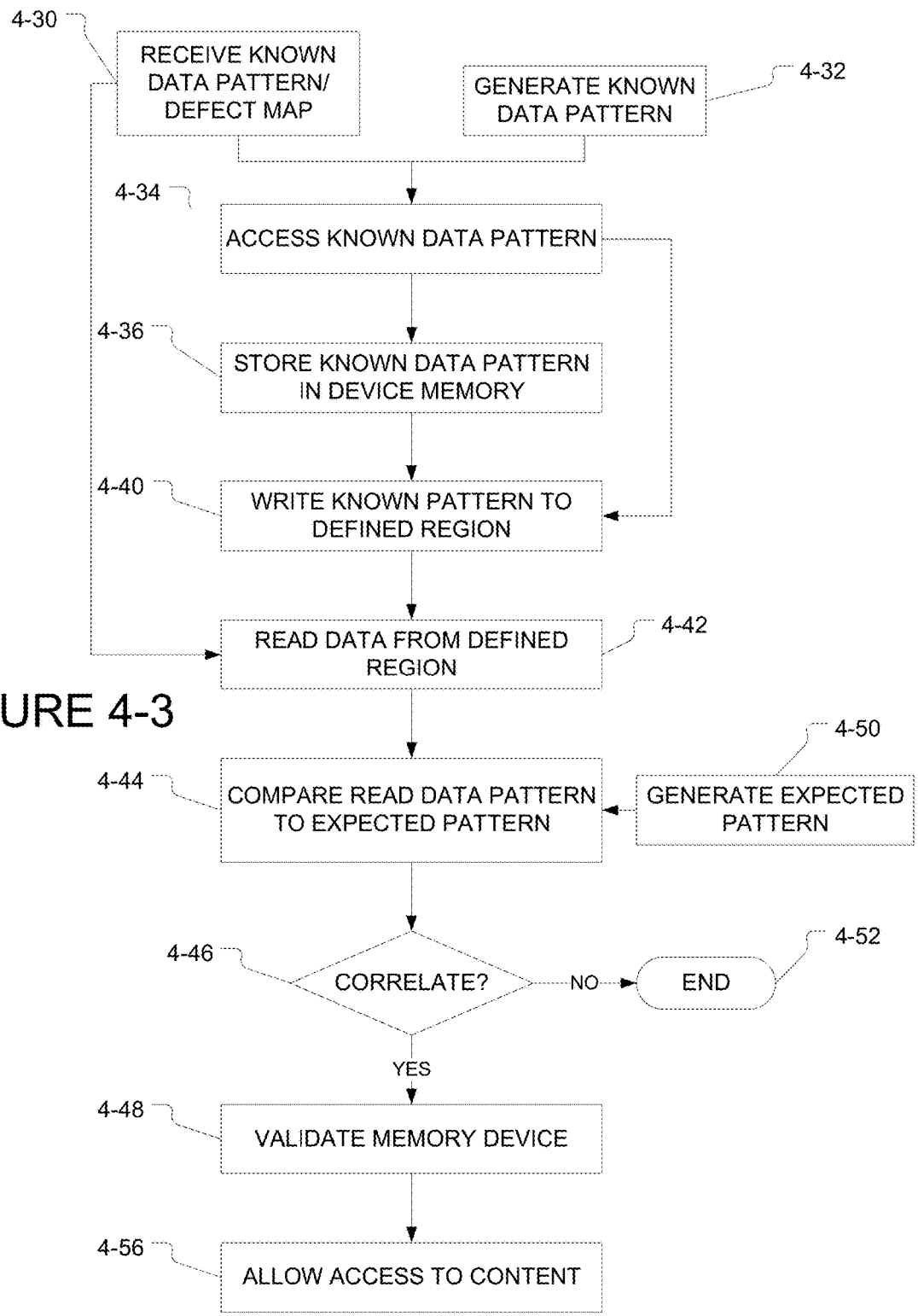
Figures 1, 5:
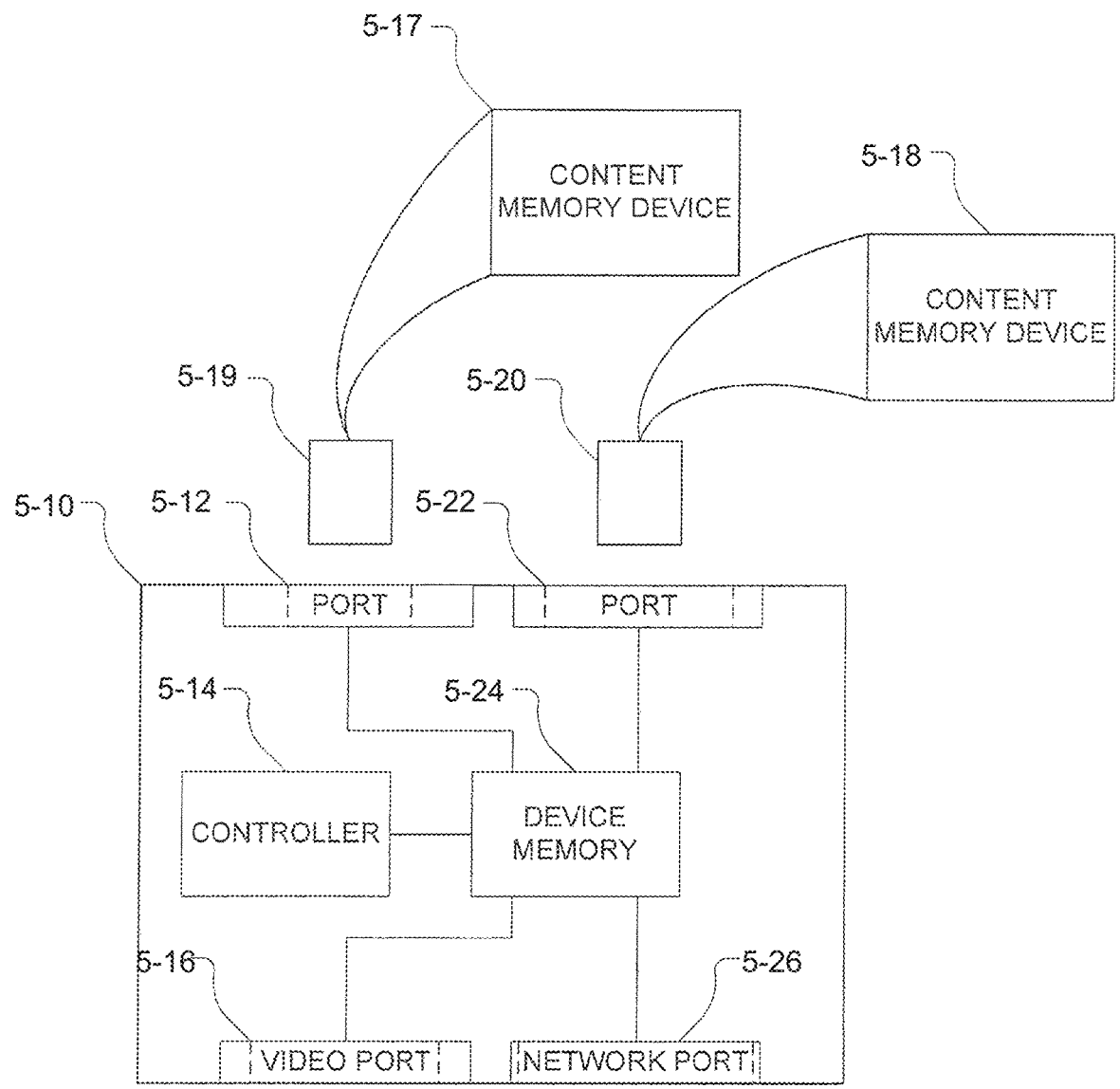
Figures 2, 5:
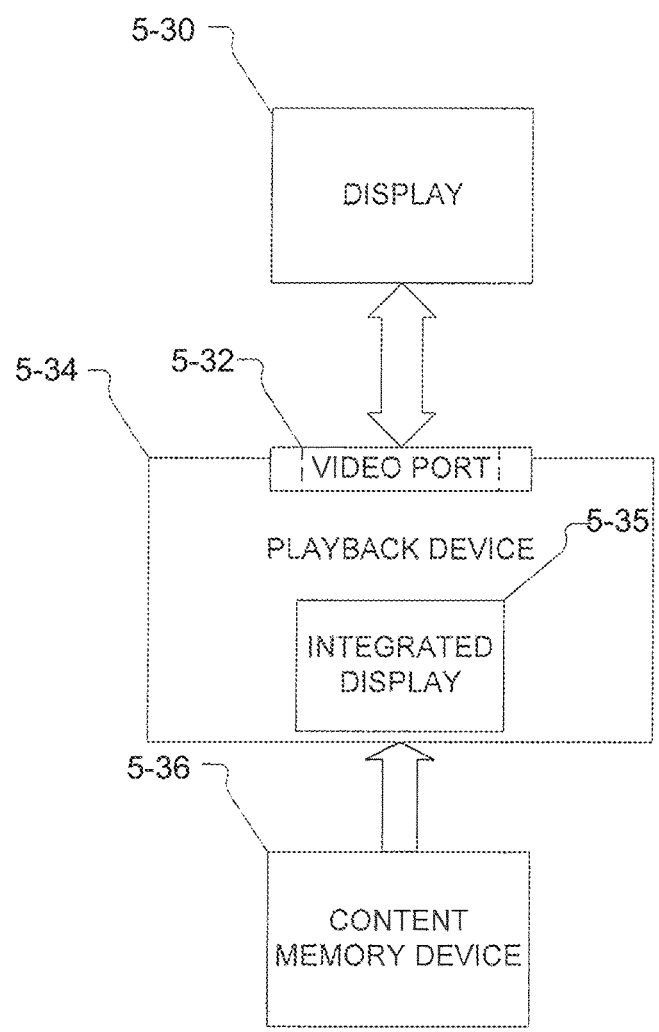
Figures 3, 5:
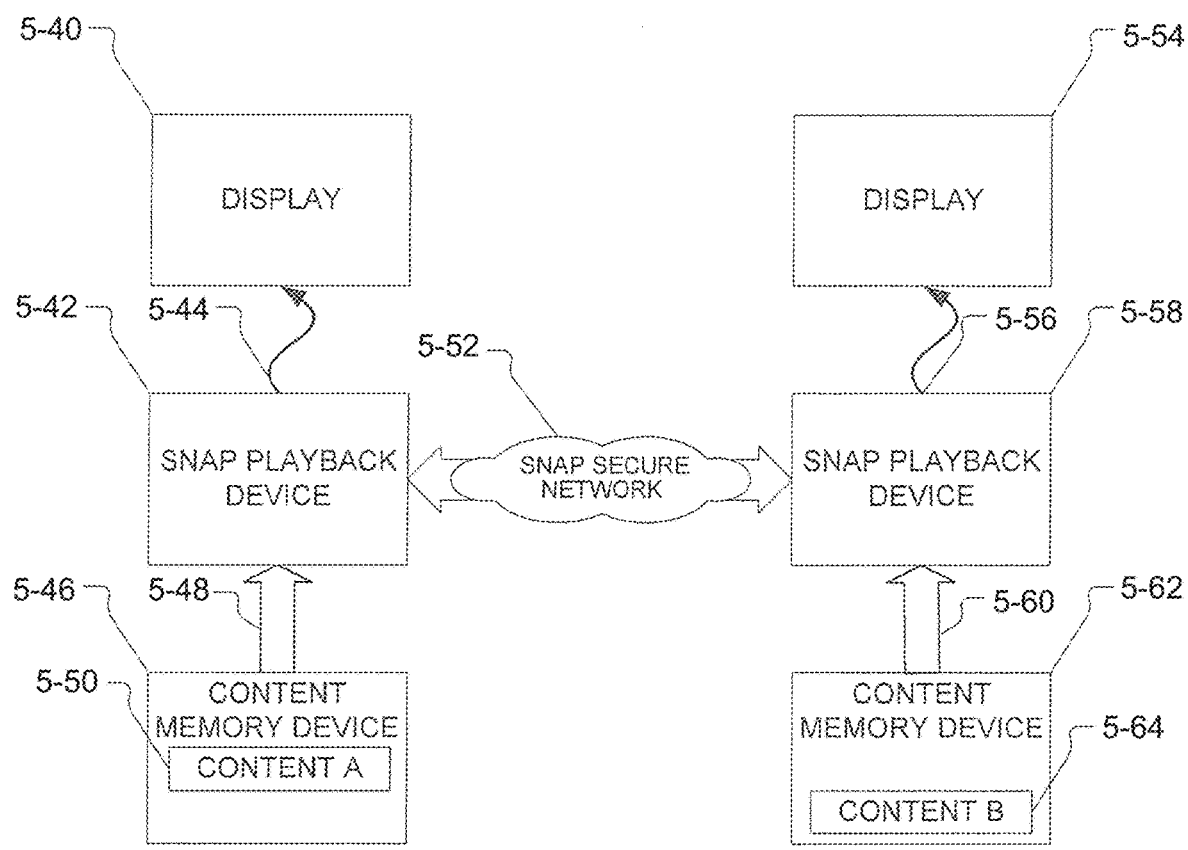
Figures 4, 5:
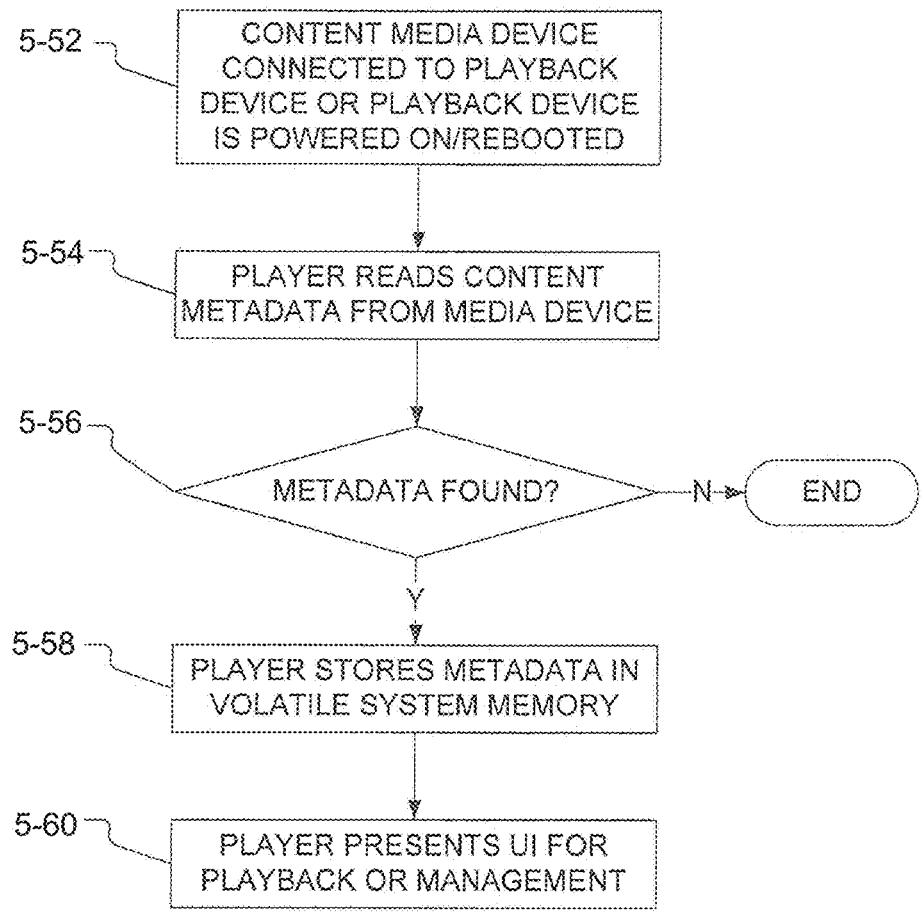
Figure 5:
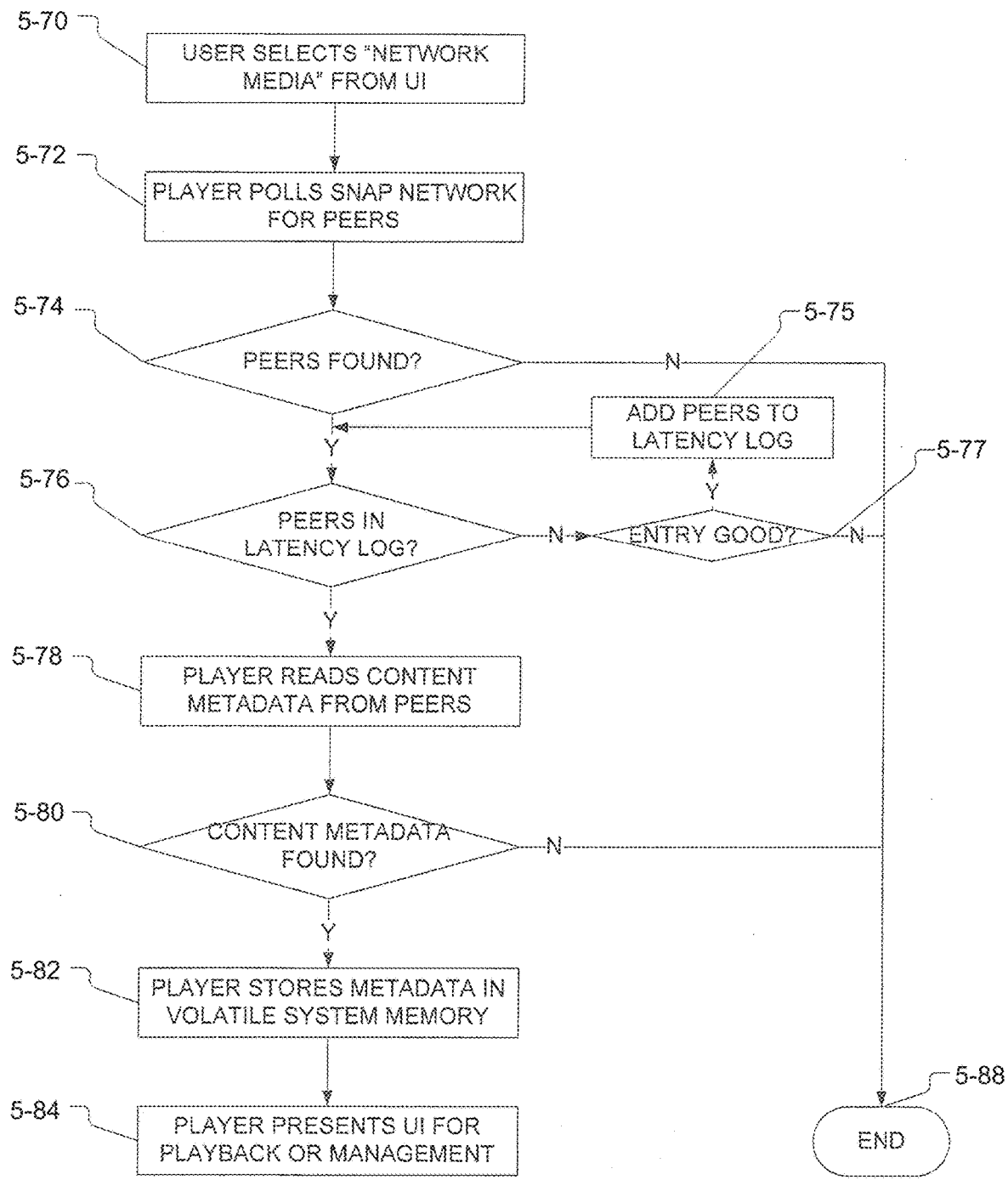
Figures 5, 6:
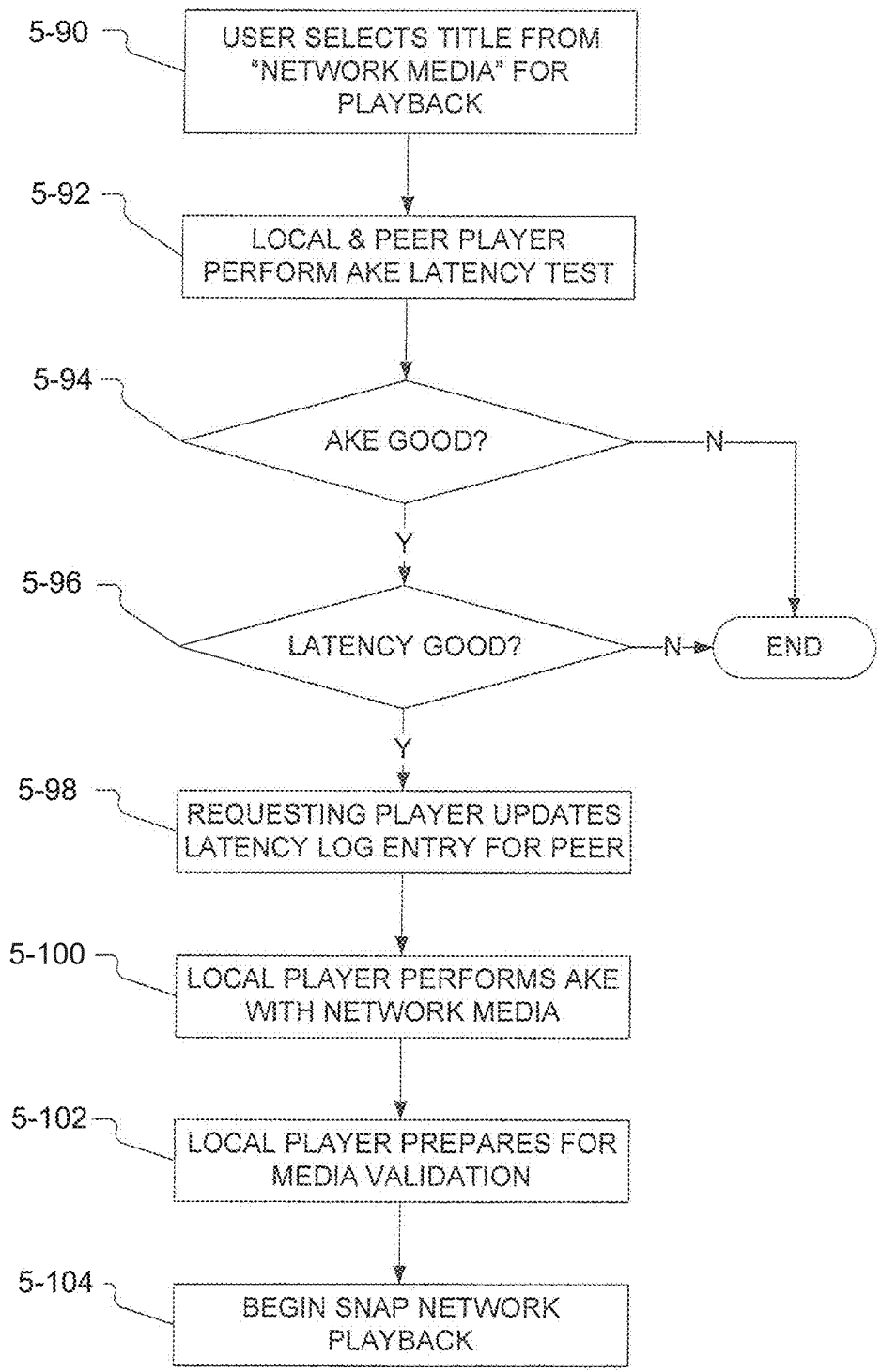
Figures 1, 6:
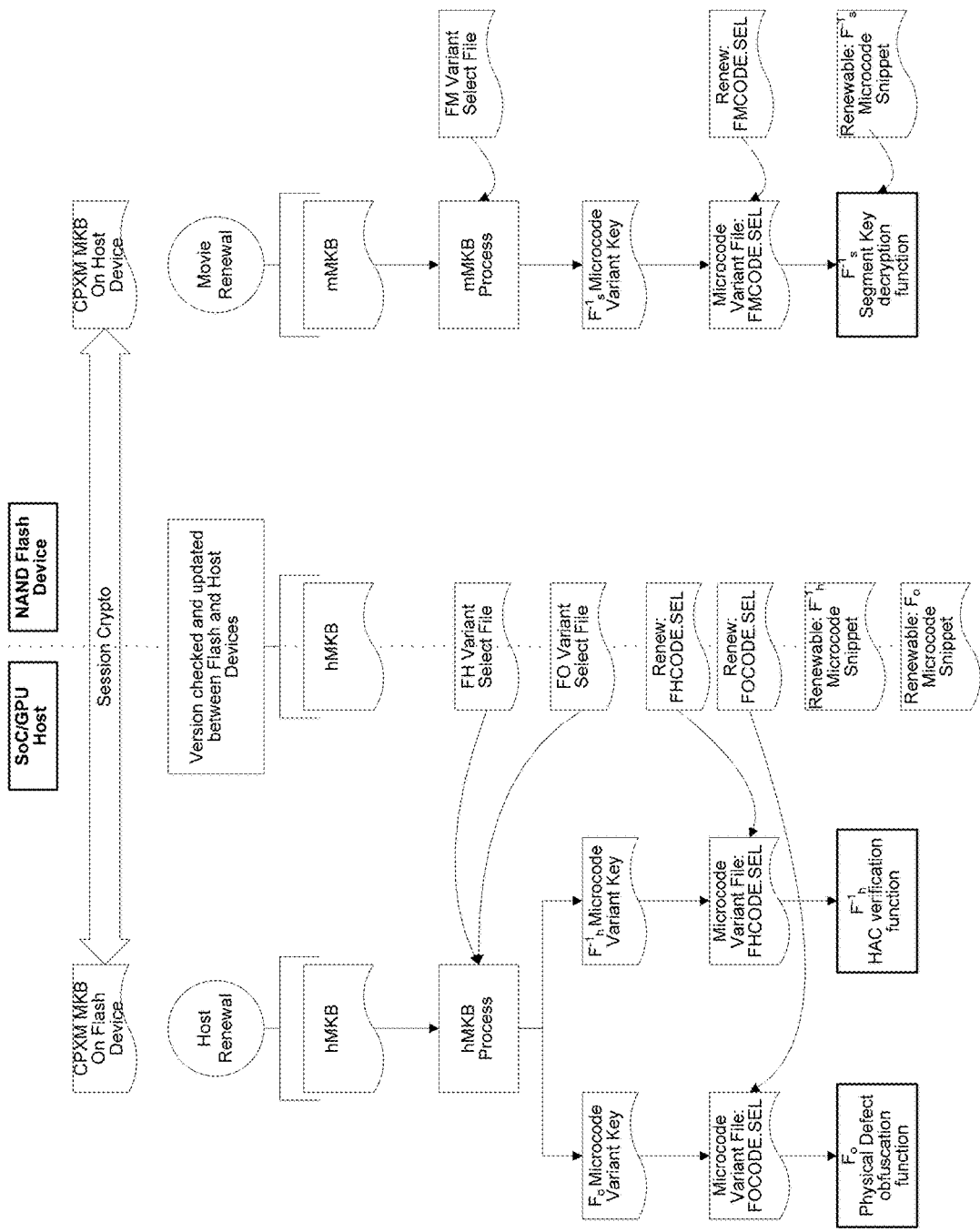
Figures 2, 6:
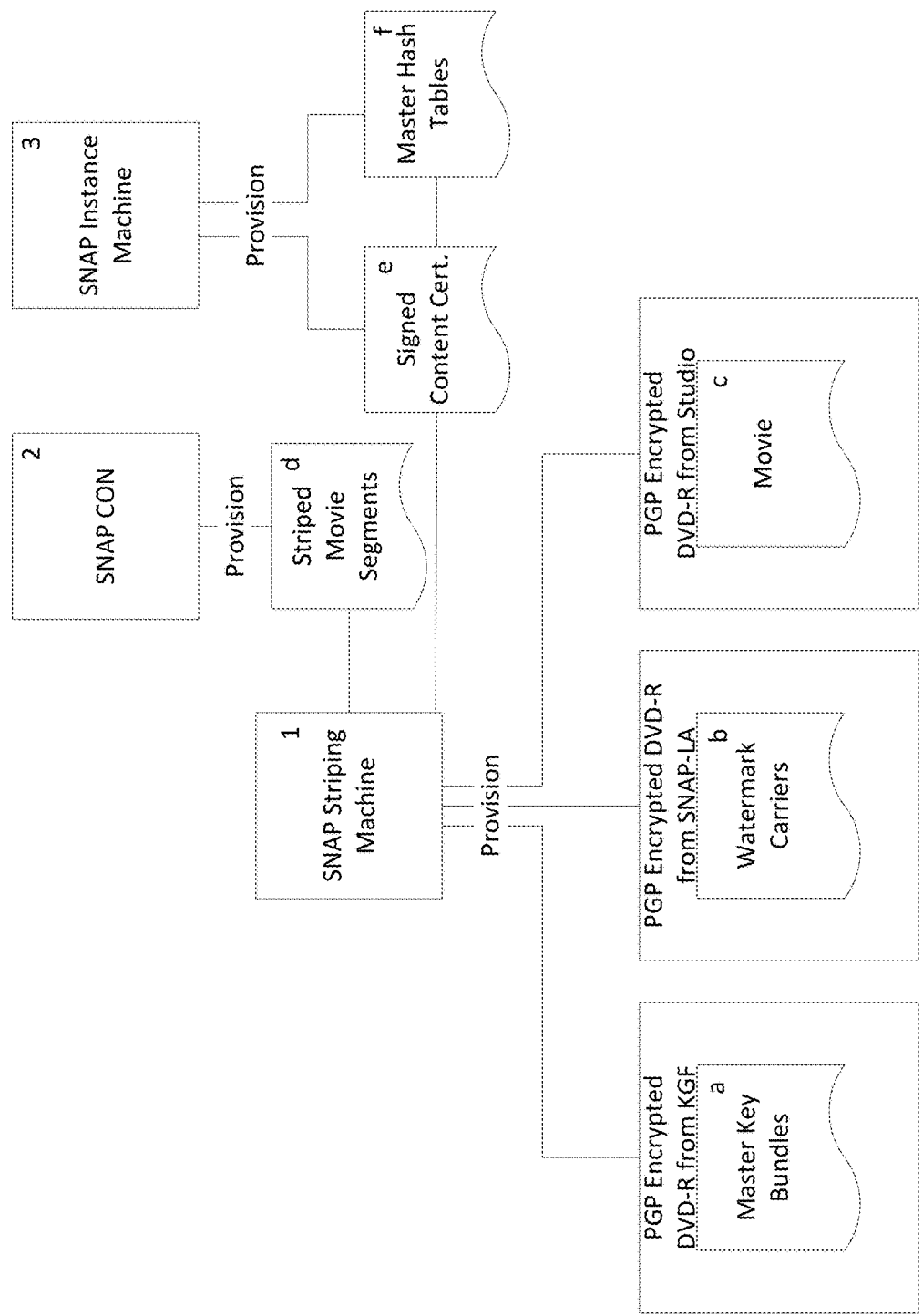
Figures 3, 6:
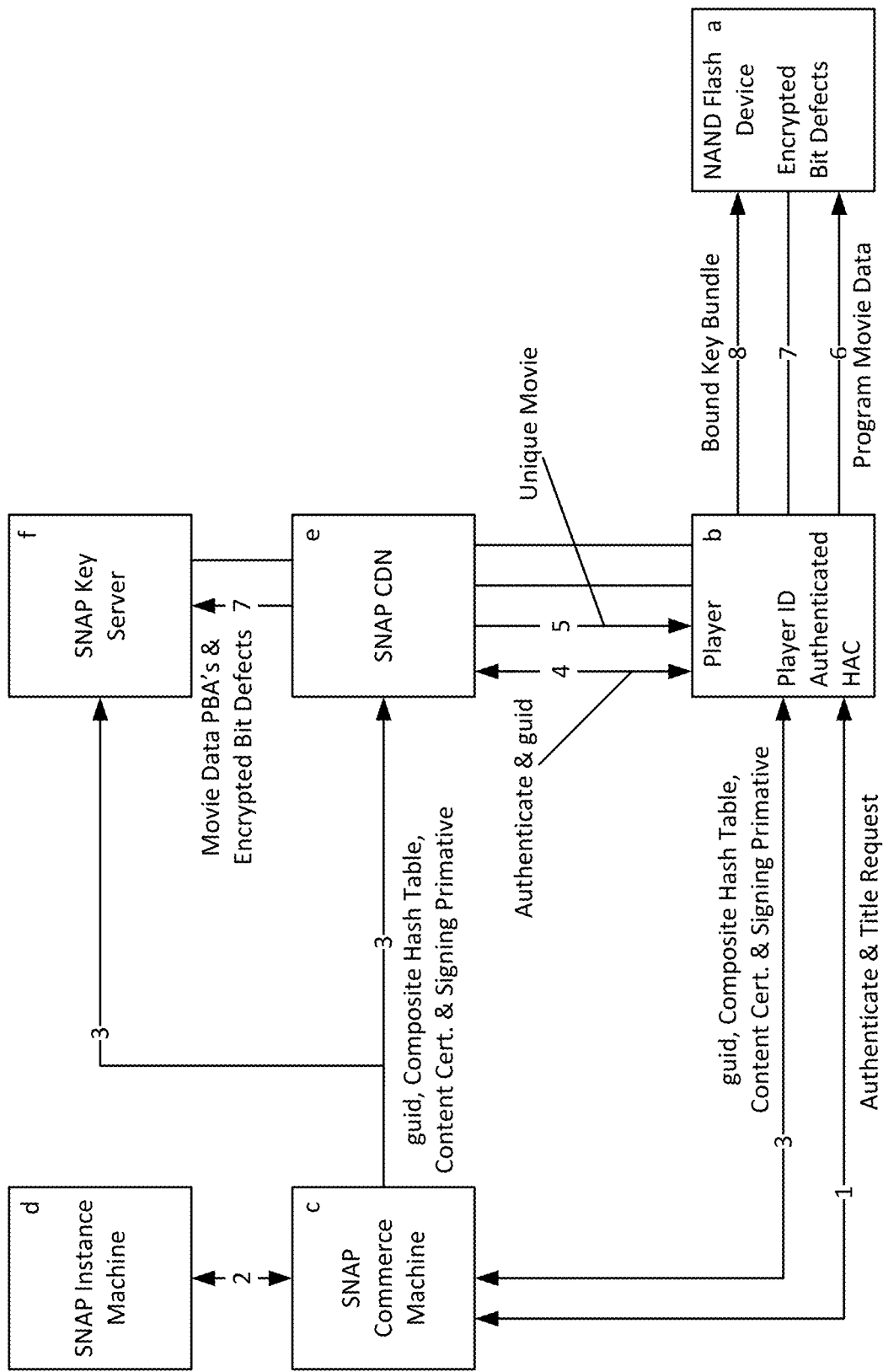

In FIG. 5-6, at 5-90 a user selects one of the titles presented in the user interface of 5-84 from FIG. 5-4 for network playback. At 5-92 the requesting player begins a combined latency/NNL AKE test with the peer playback device. This test might include pinging the peer playback device multiple times and interleaving AKE challenge and response commands between ping commands such that a time-of-test average latency may be calculated by the initiating playback device. It should be noted that in a compliant device, performance of AKE, calculations is sufficiently fast that they should have a negligible effect, if any on network latency test results. Assuming AKE and latency test results are within acceptable parameters, the requesting playback device updates its latency log entry for the peer device for future use.

At 5-100, the local player communicates directly with the network content memory device connected to the peer playback device via the network with the peer playback device serving as a proxy. The requesting player performs NNL update and AKE protocols at 5-100, as described in the referenced materials directly with the network media across the secure network. This provides session-based security between the requesting playback device and the network content memory device, and the requesting playback device secures access to the network content memory device's protected area as if it were local. In this manner, all communication of sensitive cryptographic data may be encrypted using the session key generated by the AKE between the requesting player and the network content storage device.

As discussed in co-pending application Ser. No. 12/713,111, the cryptographic authentication may be based on media key blocks. However, other cryptographic protocols, such as public/private key, are within the scope of this invention. In one embodiment, the authentication uses variants. A 'variant' as that term is used here is a particular version of a microcode that is used to derive the necessary keys and/or functions to access the content. A 'microcode function' as used here refers to a set of firmware instructions, algorithms and constants used by a player to perform cryptographic and other media-related functions. Upon manufacture, the playback device may have stored in it some predetermined number of these variants. These variants are stored encrypted in the player device.

In addition, there may be several different types of variants. In the SNAP system, for example, different types of variants may exist. A first variant may be used to derive a unique code related to the media device, and a second variant may use that in conjunction with another unique identifier for the media to verify the media. A third variant may be used to derive the keys to unlock or decrypt the content that is downloaded to the media. Other types of variants may be used, or the example variants given may not be used in any particular system depending upon the protection needs of the content.

Because the predetermined number of variants may be exhausted over time, the renewable protection scheme provides for a means to renew the variants as needed. The system generally accomplishes this by transmitting new variants with the downloaded content.

During the local playback device's preparation for media validation at 5-102, the selected renewable function variant for the title may indicate that its validation methods may not be performed remotely. This allows the content providers to disallow network playback for new releases, for example. After a particular time has elapsed, the network playback may be allowed.

If this occurs, the requesting player communicates with the peer playback device via authenticated command across the secure network, directing it to authenticate itself with the network content storage device local to it, and perform media validation locally. The peer playback device performs media validation and responds to the requesting playback device with the result of the validation test it performs, which must be consistent with the result expected by the requesting playback device based on the variant it has selected. Following successful media validation by either the requesting playback device, or the peer playback device, SNAP network playback can begin.

There has been described to this point a particular embodiment for SNAP network device playback, with the understanding that the examples given above are merely for purposes of discussion and not intended to limit the scope of the embodiments or the following claims to any particular implementation.

VI. Snap Striping and Binding

A. Introduction

The SNAP technology is a content protection system designed for flash memory cards. It has at least four innovative features:

The content/key bindings are tied to physical properties of a particular flash memory card. Memory cards are authenticated with a cryptographic signature of 1) specific timed NAND processing events and 2) a current (Amp) Waveform, 3) the physical properties of the flash memory card. Together they make it very difficult to mass-produce cloned content.

The technology has a renewal mechanism that works at the low-level firmware security layer. This enables fast renewal of security code, algorithms and variables in the playback device.

The technology has a tracing traitors mechanism that allows recovered pirate content to be traced to the individual download transaction that originally delivered the content. The mechanism works even if the content is decrypted.

Each of the components used in cryptographic functions are pre-certified before they are released into the marketplace. This prevents poorly prepared security components from being used in attacks. The SNAP system has a tight black box approach to ensure that only licensees are able to manufacture products for the ecosystem.

1. Physical Binding

Modern content protection schemes for physical media depend on two mechanisms: a media key block and a binding method. The media key block allows the licensing agency to stop attacks by excluding the use of compromised device keys. The binding method makes each piece of media cryptographically unique, so that the encrypted content cannot simply be copied from one piece of media to another and played. Until now, the binding method used (e.g., by CPRM and ARCS) depends upon a unique media identifier (Media ID) being assigned to each piece of media. This approach is sufficient to stop attacks by end-users, but provides no effective technical barrier to stop a media replicator from cloning media identifiers as part of the media manufacturing process and thereby mass-producing media pre-loaded with playable pirate content.

SNAP addresses this hole for content stored on flash memory, and provides a solution that is effective in preventing a successful 'pirate manufacturer' attack. Instead of a depending on a media identifier burned into the flash card at manufacturing time, SNAP depends on naturally occurring physical properties of each chip. Flash memory chips have intrinsic and unpredictable chip-to-chip differences that arise as a direct result of the manufacturing process. In SNAP, the unique identifiers are derived from naturally occurring properties that are very difficult for a pirate memory manufacturer to predict, control or simulate.

2. Renewal Mechanism

SNAP cryptographic calculations come in many variations. These variations are all equivalent in a cryptographic sense, but are very different in terms of actual details of implementation. These variations are designed and tested by the SNAP Licensing Agency, and are delivered to the manufacturers of players as encrypted blobs. The keys that allow these blobs to be decrypted and executed are only delivered with the downloaded content. Thus, the Licensing Agency and/or the content owner can change the way the SNAP cryptographic calculations work on a movie-by-movie basis. Note that this renewal is not a revocation action, and, importantly, requires no lengthy "due process"

to deploy a new variant. "Renewal" variants are in all players, even though the manufacturer of the player will not know the details of the variant until it gets unlocked by new content. New variants can also be deployed with each movie, giving Studios a very flexible and powerful renewal mechanism.

Since this renewal mechanism works at the low-level security firmware layer, it does not conflict with other renewal mechanisms, such as media key block revocation and application-layer security virtual machines, which act at higher levels.

3. Tracing Mechanism

The SNAP tracing methodology takes advantage of the content being downloaded, either directly or via an in-store kiosk, to the user's flash memory card. In this case, the server has an opportunity, within certain constraints, to provide each user with a different variation of the content. These variations have no effect on the user experience, but they are forensically detectable and distinguishable. The unique variation is generated by dividing the content into many segments, and providing differently marked (for example by using watermarking technology) variants for each segment. The assignments of the particular variants to individual downloads uniquely identify the transaction, a process called "tracing traitors" in cryptographic literature.

There are several important advantages inherent to the SNAP approach to tracing traitors.
1. Since the differently marked variants are selected by the server, no additional complexity or storage capacity is required of the player or flash memory card.
2. SNAP is compatible with other tracing traitor mechanisms such as AACS's sequence keys or BD+'s security VM, which identify the player, and may be applied in combination for a more effective solution.
3. By tracing back to the specific original transaction, SNAP offers the content owner and/or the service provider a direct remedial response based on the terms of use of the user's account.

4. Pre-Certification & Supply Chain Control

In order to avoid content protection implementation quality and integrity problems that have occurred in other content protection systems, this system has been designed to support a rigorous precertification process. Each flash memory card is tested (in the regular post manufacturing process) to determine if the product was made under license. If it was, a unique cryptographic identifier is added by a black box to each flash memory card. The black box system is operated by the licensing agency. The players get equally secure treatment. The code used to decrypt the content in the players is prepared by the SNAP licensing agency and provided to SoC makers. This is a practical approach because there are only a handful of SoC makers worldwide and they each only make a few products per year. If there are a half a dozen SoC makers and they each produce three SoC per year, that is just 180 products to be prepared and certified over 10 years.

B. SNAP Feature Summary

The purpose of this section is to summarize the key features of SNAP. The SNAP system has been designed to do the following:

Authenticate the media, player and content using the unique physical properties of NAND flash media. This occurs at three levels. SNAP generates unique signatures from the following:
1) The unique Bad Block defects and good block physical addresses. These elements are used for authentication, encryption and binding of content to a NAND Hash product.
2) The unique pattern of good and bad cells within a Bad Block. These signatures are used for authentication of NAND Flash products.
3) The unique length of time it takes to perform NAND operations. These signatures are used for authentication of NAND Flash products.
4) The unique patterns made by the power drawn by the USB Flash Drives and SD Cards ports while performing specific NAND operations. These signatures are used for authentication of NAND Flash products.

Provides security against media cloning. The most damaging attack in the Hollywood Home Entertainment business is an attack where a rogue company with basic NAND manufacturing tools makes a large quantity of cloned NAND products. The incentive for pirates to manufacture clones is the high margin that can be added to commodity memory for very little effort.

Secures both downloaded content (e.g. HTTPS) and streamed content (e.g. HTSP)

Media Key Block and uMKB (NNL) integration. SNAP is designed to work with a variety of content protection systems.

Effective and robust tracing traitors to the transaction level. Each consumer is delivered a unique movie that is linked to their identity, either a credit card or membership ID. This enables both a legal and a business response to an attack. The SNAP tracing traitors system does not add to the size of the file on the Flash Card, nor does it introduce any new playback mode in the players.

Renewable & revocable. SNAP depends both on secret keys which can be revoked, and secret firmware which can be renewed. Since the firmware renewal mechanism operates at the low-level key management layer, it does not conflict with other renewal mechanisms, such as BD+, which operate at the application layer.

Speed of Renewal. Many of the algorithms and variables used on SNAP Binding and SNAP Striping can be renewed in a very short time frame. The renewable items include:
The SoC/GPU at the time of manufacture and in the field
The variables and algorithms used to bind a movie to the Blocks on a NAND product
The keys used to encrypt the movie (this is a part of SNAP Striping)
The forensic data used in each movie delivered (this is a part of SNAP Striping)
The polynomial used to generate a unique ECC pattern.

Control of Security. Studios have control of renewable algorithms and variables. These items are adjusted in the authoring process.

Each of the key security components used in SNAP are controlled by strict supply chain controls.

Black Boxes are used in the manufacturing process to control what company may make SNAP products. The Card Controller, SoC/GPU and the assembled product are all "controlled" by Block Boxes.

Robustness and implementation integrity. Each security component is reviewed for compliance before being released into the market place.

Product architecture. All SNAP calculations are executed in secure memory, not insecure shared system memory like that found in Personal Computers.

The SNAP system can be applied to both removable NAND Flash Memory like USB Flash Drives and USB Flash Drives and embedded media like that found in an Apple iPOD.

The SNAP system can be applied to a product that is a hybrid of NAND Flash memory and a Hard Drive. In this implementation part of the content is stored on the NAND Flash memory and the other part of the content is stored on the Hard Drive.

1. Form Factors and Key Management

IBM's NNL Broadcast Encryption Technology is the basis of a number content protection systems, CPXM for SD Card, ARCS for Blu-ray and IBM Cryptographic Elements for SNAP (IBM CES) for use on USB Flash Drives. CPRM and IBM CES are functionally and cryptographic equivalent on how they perform key management. SNAP will be applied to both SD Card and USB memories to augment CPXM and IBM CES respectively.

2. SNAP Binding, CPXM and IBM CES

The SNAP implementation design discussed here uses the IBM NNL Media Key Block (MKB) as its key management scheme for both CPXM and IBM CES. Although the SNAP system defines two additional MKBs, they are syntactically compatible and are intended to augment the CPXM security system for SD Cards and the IBM CES scheme for USB Flash Drives. Both CPXM and IBM CES systems use MKBs to authenticate SD Cards and USB Flash Drives (respectively) with a host, and to provide keys to encrypt the content.

Both SD Cards and the forthcoming USB Flash Drives are required to have a unique Media ID and a unique set of device keys to process MKBs. However, the cards uniqueness is enforced by license provisions, not by technical means. If a dishonest card fabricator were to clone Media IDs and device keys in their cards, users could freely duplicate content between these cards. SNAP eliminates this potential weakness. SNAP uses the CPXM Media ID, but only as a convenient name for the physical properties of the chip, which are guaranteed to be unique, chip-to-chip.

C. Definitions aMKB is a CPXM-defined MKB (the Video MKB) that is used to simultaneously authenticate a SD Card and a Host and establish bus encryption. It allows compliant hosts to access the Protected Area on the SD Card. SNAP uses this MKB only for access to the Protected Area; content encryption is based on SNAP Binding and a per-movie MKB (see mMKB).

AES CMAC is a Cipher-based Message Authentication Code that uses an AES symmetric key block Cipher CMAC (k, D) where k is the key to be used to create the MAC, D is the data to be authenticated.

AES-D(k, d) is AES decryption in electronic codebook mode, where d is the data to be de-encrypted, k is a 128-bit key. The function returns cleartext.

AES-E(k, d) is AES encryption in electronic codebook mode, where d is the data to be encrypted, k is a 128-bit key. The function returns ciphertext.

AES-G is a cryptographic one-way function based on the AES algorithm. AES-G(x1, x2)=AES-D(x1, x2) □ x2

Array Configurations are logical representations of the Bad Blocks on a NAND Chip. An array of Bad Bocks is used in geometric calculations. An array of Bad Blocks can be configured in a large number of ways. Changing an array changes the calculations used in the SNAP Binding algorithm. See Word Wrap in the Primer Section of this document for more details.

Bad Blocks. Due to the nature of CMOS lithography and high storage density of NAND Flash memory, it is common for NAND Flash chips to contain up to 5.5% defects at the time of manufacture. This is necessitated in order for chip fabricators to maintain commercially viable production yields. Since NAND Flash memory is erased on a block-by-block basis, any defect detected either during a page program cycle, or a block erase cycle dictates that the entire block of memory be identified as "Bad" in order to avoid potential data corruption. Defective blocks are identified during rigorous post-manufacturing testing, by the chip fabricator, by programming a specific value (typically 000h) into the block's spare area. Runtime detected bad blocks are marked by programming a different value (typically FFFh for 16 bit devices) to the spare area. Note that even good blocks might have bad cells; a block is bad when it has "too many" bad cells.

Black Box is a tamper resistant, tamper evident device that is used to administer cryptographic elements in a secure manner. There are three types of Black Boxes, those used by card controller makers, those used by NAND Flash Memory Product assemblers and those used by SoC makers.

C1, C2, C3, C4 . . . are secret constants, many of which can be renewed. These are not keys; they are trade secrets which give the Licensing Agency additional licensable elements.

Card Controller is the microcontroller that performs a variety of NAND operations including and not limited to basic security functions, bad block management and wear leveling. SNAP requires that a digital identifier be included in the Card Controller. This digital identifier is used to authenticate the Card Controller as a Licensed product. This authentication occurs during boot up of the NAND flash device in Kiosks, Players etc.

IBM 4764 Cryptographic Coprocessor a FIPS level 4 device used to generate keys and perform cryptographic operations.

Content Certificates are used to certify the content. The following items are signed on the content license server: Movie Segments, Segments Hash, Usage Rules, and, optionally, Media Binding. Thus, Content Certificates are created and signed for each download transaction.

Cell Level Bad Block Forgery Detection and Playback Control is a process to log a cell level signature of a Bad Block during manufacturing of a NAND flash device and for a player to authenticate the cells in a Bad Block on a NAND flash device and stop playback of cloned NAND media. The purpose of this detection method is to force an attacker to use an indirection attack (see Firmware Clone Detection and Playback Control and Hardware Clone Detection and Playback Control.) Each of the Bad Blocks on the NAND Flash memory is validated by the player at the cell level. If the pattern of bad and good cells within a bad block does not match what was logged by the Black Box and stored on the NAND Flash Device during manufacturing, the NAND flash device is a cloned device. This cell level validation may be done prior to and/or during playback. Due to the rigorous nature of OEM testing it is possible that the single-pass test performed by the Black Box may not expose all defects identified during OEM testing. As such, only those cell failures detectable by the SNAP black box will be validated. A threshold value will be applied to the stop playback logic, for example: 80% or more of the bad cells detected by the black box must match those discovered in the field or playback will stop. However, field testing may discover additional cell failures due to normal NAND cell degradation, this is normal and to be expected. Since NAND flash degrades with usage we can apply a tighter threshold to improvements. If 2% or more of the cells in all of the bad blocks have improved (cells successfully complete program or erase cycles where they had previously failed), playback is stopped. A small deviation tolerance on improvements is needed because a cell on the margin of failure may test bad and then test okay, as a result of an environment change. A statistical deviation algorithm may be applied to determine the appropriate thresholds.

Firmware Clone Detection and Playback Control is a process to detect counterfeit firmware in a NAND flash product. An attacker of this system may try to add a layer of abstraction to a NAND Flash Memory product that simulates the cell level defects of an authentic NAND Flash Memory product. The purpose of this process is to require that special hardware be developed to perform this indirection attack. This is accomplished by the player occasionally and randomly reading data+ECC before the error correction has been applied and stopping playback if the cell-level defects are not consistent with the movie data that was downloaded to the original card. This test forces the attackers to both simulate the cell-level defects in the original card, and to remove their own cell-level defects. This requires more RAM or ROM that a Licensed Flash Card's controller has. Thus, the attackers are forced to use different hardware than the card they are simulating.

Hardware Clone Detection and Playback Control is a process to detect counterfeit hardware. An attacker of this system may try to circumvent the SNAP content protection system by building an indirection attack into hardware which simulates the cell level defects of an authentic NAND Flash Memory product. These attacks have measurable differences in power consumption and/or access time that can be detected by the player. SNAP's power/time Waveform signature validation tests can be specifically designed to maximize indirection overhead and therefore a change in the power/time Waveform of the indirection device. Detection of a Hardware Clone is accomplished by the player performing a power test of a known flash event line like power up computing a Waveform of this event and comparing the results to a Waveform stored in the HAC. If the two wave forms are different, playback is stopped.

Device Log is a tamper-evident log stored in the User Area of each NAND Flash device. For each Device Log entry, a CMAC is generated using log key ($K_1$) that is incremented via a secret one-way function $F_1$ such that tampering is evident since the keys used for earlier log entry CMAC's are not retained. The first Device Log entry is the hash of runtime detected block failures at time of manufacture which must be equal to 0 or the device has been tampered with during fabrication. The Device Log is also used to authentic the Flash Memory Product. There are two types of entries:

The Erase/Verify and Program/Verify results of each OEM Bad Block at a cell level. These Device Log Entries are used during playback to validate the NAND Flash device's authenticity.

The runtime block failure status and other metadata during selected events and is read by the SNAP License Server during tethered transactions to detect tampering and/or cloning attempts.

Log
Server Key=$K_1^i$
$F_1$=AES-G($K_1^i$,C1)=$K_1^{i+1}$
CMAC=AES-G ($K_1^{i+1}$,Text)

| (Assembler detected runtime bad blocks) | CMAC ($K_1^{i+1}$, (Assembler Runtime Bad Blocks)) |
|---|---|
| Text 2 | CMAC ($K_1^{i+2}$, Text 2) |
| ... | ... |

Erase Blocks contain a fixed number of sequential pages. NAND Flash memory may be read or programmed page-by-page, however, data is erased by resetting the registers of all pages within an Erase Block to either 0 or 1 according to a manufacturer's specification. This method is used to improve overall performance of the device.

FIPS 140-2 is the Federal Information Processing Standard version 140-2.

Flash Memory Products are USB Flash Drives, SD Cards, Embedded Memory devices and other cards that use NAND flash memory.

HAC is a Hardware Authentication Code. On SNAP-compliant USB Flash Drives, this is placed in the Protected Area at manufacturing time. It cryptographically binds together the Media ID with physical properties of the chip—its defect map. HACs can only be generated correctly by the SNAP License Server, but can be checked by any compliant host.

HAN is a Hardware Authentication Number. It is ciphertext of a NAND product's unique and digitally signed Chip ID. The HAN calculation method is devised such that logic, variables, and algorithms employed in its computation may be asymmetrically divided between two physically separate secure processors, a flash memory controller and a host GPU. In this manner, each device possesses logic insufficient to complete the HAN calculation in the absence of the other device. In addition to asymmetrical logic in the two devices, a third set of logic which is shared by the two devices such that they may perform random challenges as part of the HAN calculation. The HAN is authenticated at runtime by using two devices, for example a SD Card and the device playing the video, to co-derive the appropriate public key from the physical attributes of the NAND memory the NAND metadata. The two co-authenticating devices independently decrypt the HAN to validate the chip's unique ID using the encapsulated cryptographic signature.

Hardware Root of Trust is a mechanism that prevents 1) counterfeit NAND Products from being made and 2) prevents counter fit and boot leg copies of movies. The Hardware Root of Trust is composed of a signature of NAND Chips Bad Blocks, a Chip ID, an AES CMAC of a Chip ID, an AES-G of and physical write once strategy.

hMKB is the Hardware MKB. On Snap-compliant USB Flash Drives, this is placed in the Protected Area at manufacturing time, and can be updated during server interactions. It is used to provide part of the keying material for the HAC, and to enable or disable sections of host firmware as a renewal mechanism.

Individualized Root Key is the highest level key used to protect the firmware in a secure processor. The key is unique to each secure processor, and is not accessible from outside the secure processor to unauthorized processor. Hardware root keys are stored within the secure processor.

Individualized Device Keys are NNL keys protected by the Key Generation Facility's Individualized Root Key. These keys are unique for each secure processor. They are generated by the Cryptographic Coprocessor Card and may be generated from the root keys.

License Server is controlled and operated by the SNAP License Authority. It is an online server that generates HACs and issues signed Content Certificates.

License Authority is the legal entity that licenses and operates SNAP.

Movie Microcode is code that executes in a secure processor and is per movie. It is renewable in two ways. Microcode can be pre-installed on a host processor or stored on the media, and can be enabled by the movie's mMKB.

HAC Microcode is code that executes in a secure processor and is per. card. It is renewable in two ways. Microcode can be pre-installed on a host processor or stored on the media, and can be enabled by the hMKB.

Physical Defect Map is the list of Bad Blocks on a chip.

Players are consumer devices that decrypt SNAP protected content which may include set-top boxes, televisions, personal computers, netbook computers, portable devices. They are required to use a SNAP approved SoC with a secure processor.

Power Detection is the measurement by the player of the current being drawn by the flash card on the power pin on the port/card interface.

Obfuscated Defect Map is a Physical Defect Map that has been obfuscated by a renewable secret function. The function uses an array shape and a measuring algorithm to obfuscate the map.

Logical Block Address (LBA) is the address of a block of data on the card from the point of view of the operating system's file system. It corresponds roughly to a sector address on a disc. Unlike on a disc however, LBAs on flash memory have no pre-defined relationship with a physical location on the chip. Because the Flash Card and the host cooperate to manage defects, to even out the write cycles across the chip, and to write into erased blocks only, the physical location of a given logical block is highly variable chip-to-chip.

Media ID is the media ID as defined by CPXM or IBM CES.

Physical Block Address (PBA) is the actual physical location of a block of data on the flash chip.

Segment. For the purpose of SNAP Striping, content is divided into segments. The Segments are variable length; for movie content, they average about 8 seconds of video.

Bound Segment is a Segment which has been cryptographically bound to the PBA(s) where it is stored on a particular flash chip.

Segment Hash is the AES-based hash of a Segment.

Segment Key is the cryptographic key that was used to encrypt the Segment.

Bound Segment Key is a key encrypted with key based on a revokeable media key and the physical location of the segment.

mMKB is the per-movie MKB. There is one for each movie on the card, and it is stored in the user area of the card.

Media Key is the key compliant non-revoked devices calculated from a Media Key Block. Following CPXM's notation, the aMKB's Media Key is written $K^0_m$. The hMKB's Media Key is written $K_{hm}$. The mMKB's Media Key is written $K_{mm}$.

Media Key Variant. The SNAP MKBs (the hMKB and the mMKB) are unified MKBs, meaning devices use them to calculate one or more variants. These variants are used to enable pre-loaded microcode in the host. The variants are denoted $K_{hmv}$ and $K_{mmv}$ for the hMKB and mMKB respectively.

Most Significant Bit is (x)MSB_y, The most significant y bits of x. Or the leftmost bit in a binary number e.g. 1 in the bit-string 101010110.

RSA is the Rivest-Shamir-Adelmann public key system based on composite modulos. SNAP uses RSA for all public key calculations.

SNAP is a name that is derived from a related content protection system called Simple Non-Autonomous Peering. This name has its roots in the SNAP Striping portion of the system which can be used on a P2P network environment.

SNAP Binding see HAC and Segment Binding.

SNAP Striping is the content protection cousin to SNAP Binding. SNAP Striping is a method where several copies of a movie is cut into segments, watermarked and encrypted. During network delivery of the movie, different segments are selected per a database schema and an algorithm. This system makes each copy of a Movie unique to the consumer. The benefits of this system are 1) it works in a P2P network, 2) each movie can be traced back to the consumer that purchased the movie if it is pirated 3) the keys from one movie do not work with another movie which makes a hack-one/hack-all scenario impossible. SNAP Striping does not interfere with AACS movie variations, if a movie has already been authored with them. SNAP Striping serves a different purpose: in AACS, the variations allow tracing to the player involved in an attack; in SNAP Striping, the variations allow tracing to the original download transaction that was the source of the unauthorized copy.

License Server controlled and operated by the SNAP Licensing Agency. It is a server that generates HACs and issues signed Content Certificates.

Licensing Agency the legal entity that licenses and operates SNAP.

Movie Firmware is code that executes in a secure processor and is per-movie. It is renewable in two ways. Firmware can be pre-installed on a host processor or stored on the media, and can be enabled by the movie's mMKB.

HAC Firmware is code that executes in a secure processor and is per-card. It is renewable in two ways. Firmware can be pre-installed on a host processor or stored on the media, and can be enabled by the hMKB.

NAND Flash is a type of non-volatile solid-state memory containing 2 distinct physical storage areas: 1) a "user data area" composed of pages physically grouped into Blocks and 2) a "spare area" for the storage of logical and physical metadata about the data area. While the configuration and naming of these two areas may vary from Fabricator to Fabricator, both areas are present in all NAND Flash chips. NAND Flash chips are programmed on a page-by-page basis and erased in a block-wise manner in an effort to optimize performance.

NAND Products are consumer devices that include USB Flash Drives, Secure Digital Cards, Sony Memory Sticks and devices with embedded memory like the Apple iPods.

Natural NAND Defects are cell level defects that occur in NAND Memories. Although the quantity of defective cells, pages and blocks are sensitive and proprietary numbers for each manufacture, they can be estimated from published tidbits of data:

"A chip is defective if it has more than 2% bad blocks"
"The yield of NAND flash chips is about 70%"
"A block is bad if more than 4 (out of 68) pages have a bad cell"
Assume a 2 GB chip with 4096 blocks; 256 usable pages/block+4 spares; 2 KB/page
Therefore:
Estimating the probability of a bad block, $p_B$:

$4096*p_B+\text{sqrt}(4096*p_B*(1-p_B))=2\%*4096; p_B=1.80\%$

Estimating the probability of a bad page, $p_p$:

$\text{combin}(260,5)*(p_p)^5=p_B; p_p=0.45\%$

In the future, processes get better improving the error rate, but cells get smaller, increasing the error rate, this estimate seems reasonable.
The blocks in a 8 GB HD movie would have 9,000 hard cell defects.

Waveform is the shape of a curve over time that are used to authenticate firmware and hardware. These authentication waveforms are stored in the HAC.

Usage Rules are business rules expressed in Blu-ray syntax. Additional SNAP business rules will be incorporated into the Blu-ray syntax.

D. SNAP Functions

1. SNAP Renewal and MKBs

FIG. 6-1 is a diagram illustrating firmware renewal. There are three MKBs used in the SNAP/IBM CES scheme. The first is the aMKB, which is simply the IBM CES Authentication MKB. At Card insertion, the host reads the Card's Authentication MKB and calculates an authentication key $K_{auth}$ as explained in the IBM CES specification. Also, if necessary, the host updates the Card's MKB if the host has a more recent aMKB in its permanent memory. Likewise, if the card has a more recent aMKB, the host updates its own stored version. Again, this is standard IBM CES operation, and at the end of it, the host has a key which it can use to securely read and write the Flash Card's Protected Area.

At this point, the host can read and process the Hardware MKB, hMKB, which has been previously stored in the Protected Area under the direction of a License Server. It is stored as file hMKB.bin in the \SNAP directory, which is a root directory in the Protected Area. A second copy of the hMKB is stored with the same name in the \SNAP\BACKUP directory in the case that original hMKB becomes unreadable due to media errors.

The processing of the hMKB yields the Hardware Media Key $K_{hm}$. This key is combined with the IBM CES Media ID, $ID_m$, to form the Hardware Unique Key, $K_{hu}$, as follows:

$K_{hu}=\text{AES-G}(K_{hm},ID_m)$ $K_{hu}$ is one of the inputs to the important Hardware Authentication Code (HAC) calculation, see section "HAC". It also can be used to renew some of the secret firmware functions, as described in the following section.

Assuming that the HAC is successfully verified, meaning that the Physical Defect Map of the Flash Card is recognized as valid SNAP Media, the host can proceed to play one of the movies stored in the User Area of the Flash Card. The movies are stored in the \SNAP root directory in the User Area, each movie in its own sub-directory. When a Download Server downloads a Licensed SNAP Movie to the Flash Card, it creates a sub-directory for the movie, using a user-meaningful name. A Licensed Player shall present the names of the sub-directories to the user, in the case that there are more than one, and allow the user to select which movie to view.

Each movie sub-directory has its own SNAP sub-sub-directory. In it, among other things, the Download Server will have stored the Movie MKB, mMKB, as file mMKB.bin. This sub-sub-directory also has its own BACKUP directory. The processing of the mMKB yields the Movie Media Key $K_{mm}$. This key is combined with the IBM CES Media ID, $ID_m$, to form the Movie Unique Key, $K_{mmu}$, as follows:

$K_{mmu}=\text{AES-G}(K_{mm},ID_m)$

This key is one of the inputs to the Segment Binding function, and can also be used to renew some per-movie secret firmware as explained in the following section. Note that only hosts and servers have the keys necessary to process the hMKB and the mMKBs. The Flash Card has its own set of keys, but those keys are only usable with the aMKB. However, all three types of MKBs use the same syntax, as described in the IBM CES specification.

2. Renewable Secret Firmware Functions

There are three secret functions executed in a SNAP host:
1. $F_o$—The Physical Defect Map obfuscation function.
2. $F^{-1}_h$—The HAC verification function.
3. $F^{-1}_s$—The Segment Key decryption function.

These functions are described in more detail in the following sections.

At initial deployment, adopters are given 16 versions of each function. However, these versions are delivered as encrypted blobs, with a different set of 3×16 blobs for each unique hardware platform that SNAP has approved. In other words, the functions are not revealed to the adopters. Instead they are designed by the Licensing Agency or one of its approved sub-contractors. Although all the 16 variants of a function perform roughly the same function, the details of each variant are completely different.

A firmware variant is selected by a Firmware Variant Selection File. These files are placed on the media at manufacturing time, and can be changed by the License Server during content download. The idea is firmware variants remain dormant in the Licensed Players until the License Agency decides to activate a new variant by distributing a new Firmware Variant Selection File. In effect, these files act as renewal messages to the system, causing the important SNAP cryptographic algorithms to change.

The Firmware Variant Selection Files are named FxCODE.SEL, where x is either O, H, or S, corresponding to $F_o$, $F^{-1}_h$, and $F^{-1}_s$. They are stored in the Protected Area of the SD Card. FOCODE.SEL and FHCODE.SEL are directly in the \SNAP directory. There is one FMCODE.SEL for each movie on the SD Card. In the Protected Area, there is one sub-directory per movie, named the same as the movie sub-directory in the User Area.

The format of the Firmware Variant Selection Files is as follows:

| BYTE OFFSET | 0 | 1 | 2 | 3 | 4 | 5 | 6 | 7 |
|---|---|---|---|---|---|---|---|---|
| 0 | Firmware Variant Key Bytes 0-7 ||||||||
| 8 | Firmware Variant Key Bytes 8-15 ||||||||

-continued

| BYTE OFFSET | 0 | 1 | 2 | 3 | 4 | 5 | 6 | 7 |
|---|---|---|---|---|---|---|---|---|
| 16 | Variant Number | | Reserved | | | | | |
| 24 | Check String (0BADBEEF01234567$8_{16}$) | | | | | | | |

Where the fields have the following meaning:

The "Firmware Variant Key" is the key to decrypt the firmware variant.

The "Variant Number" is an unsigned integer 0:65535, most significant byte first, identifying which variant to use. Variants 0:15 are the initially deployed variants. If a Licensed Player encounters a variant number that is not pre-stored in its memory, it looks for the encrypted variant in a file on the media, in the same place as the Firmware Variant Selection File. The names of these files are Fxnnnn.ext, where x is the function 'O', 'H', or 'M', nnnn is the decimal number of the variant, and ext is an extension that identifies which Authorized Platform the firmware is for. The License Agency assigns extensions when it authorizes a platform The "Check String" allows the Licensed Player to detect if the file has been corrupted. Files are encrypted with AES in CBC mode. The initial vector is $IV_c$, confidential constant given to Licensees. The key depends on the function. The 'O' and 'H' files are encrypted with $K_{hu}$; the 'M' files are encrypted with the matching $K_{mmu}$. Licensed Players shall abort play if the Check String is not correct. In the case that the end-user has renamed the movie sub-directory in the User Area, the Licensed Player will not initially find the movie directory in the Protected Area. In that case, the License Player shall check all FMCODE.SEL files in the Protected Area to see which one correctly decrypts using that movie's $K_{mmu}$. It then shall rename the associated sub-directory in the Protected Area to match the user's preferred name.

Note, it is possible that more than 16 variants will be deployed, and also after a platform is authorized. To accomplish this, firmware can be delivered with content. The firmware variants that are delivered with content are instantiated during playback of the movie and do not modify the SoC. This minimizes the risk that a player is broken (bricked.) The firmware delivered with a movie is instantiated as stateless and thus is removed from the player SoC secure memory when the movie is stopped. This limits the potential programmer quality problem to a title level. Furthermore, if a problem arises such as firmware/player incompatibility, a new variant can be delivered quickly, perhaps the next day. Optical disc based systems have an inventory problem and therefore cannot respond as frequently as the SNAP system on NAND Flash media.

All the files discussed in this section have bit-for-bit duplicates in the associated BACKUP sub-directories.

3. SNAP Binding Design

The SNAP Binding system is applied throughout the SNAP chain of trust; from manufacturing of NAND Flash Products, to Kiosks and to Players. SNAP Binding involves binding the content to both the physical media properties and the physical locations where the movie is written. The former function is called the HAC (Hardware Authentication Code). The latter function is called Segment Binding. SNAP Content Binding also supports progressive downloading and streaming.

a. Obfuscated Defect Map

The method of obfuscating the Physical Defect Map is the renewable function $F_o$ in SNAP. For performance sizing and cryptographic analysis, below is an example $F_o$. It is not an actual $F_o$:

1. The Physical Defect Map list of defect PBAs is added to two pre-defined arrays of random numbers, modulo the total number of blocks on the chip. If necessary, the defect PBA list is repeated so it is the same length as the pre-defined arrays.
2. The two lists of blocks are combined pairwise; e.g., the first block in the first list is paired with the first block in the second list.
3. The Euclidean distance of each pair in a Device Block Array of width 61 is calculated in an 8.24 bit fixed point calculation.
4. The list of distances is XORed with a pre-defined list of random masks.
5. The resulting bits are the Obfuscated Defect Map.

b. HAC Generation

In the SNAP System, each Flash Memory Product has a signature of the Media ID, Obfuscated Defect Map and AMP Waveform generated with the $F_h$ renewable function.

$F_h$(License Agency Private Key, Obfuscated Defect Map, Timing Data, Waveform, Media ID)=HAC Each Licensed Player has the corresponding HAC verification function, $F^{-1}_h$:

$F^{-1}_h$(License Agency Public Key, Obfuscated Defect Map, Timing Data, Waveform, Media ID, HAC)=true or false For the purpose of performance sizing and cryptographic analysis, here is an example $F^{-1}_h$. It is not an actual $F^{-1}_h$:

RSA-Verify(Public key,(AES-HASH(C1∥Obfuscated Defect Map∥Timing Data∥Waveform(s)∥$K_{hu}$)
⊕C2))

The HAC is stored in the Protected Area of the Flash Card as file HAC.bin in the \SNAP directory. Licensed Manufacturers contact the License Agency to calculate a HAC for each Card they manufacture, and place this HAC in the Card at manufacturing time. Licensed Servers may update the HAC (to use a new hMKB or $F_h$) during content download.

c. Segment Binding

SNAP Content is downloaded to flash media in Segments. Segments are estimated to be 8 seconds each on average and there are about 1000 segments per movie. They are guaranteed to be on Cell boundaries, and no navigation path would ever enter the video in the middle of a Segment. Segment sizes will vary. The watermarking system selected will influence the size of the segments. Each segment is encrypted with its own unique random 128-bit key. As these segments are written to the flash media, the Segment Keys are bound to media using a key derived from the physical location where the Segments are actually written.

The Segments are written to blocks and then bound to the media with the $F_m$ renewable function:

$F_m(K_{mmu}$,Segment Key,PBA(s),Segment Hash)= Bound Segment Key

The Licensed Players have the inverse function $F^{-1}_m$:

$F^{-1}_m(K_{mmu}$,Bound Segment Key,PBA(s),Segment Hash)=Segment Key

Note that the Segment Hash is available in the Content Certificate and need not be checked until the Licensed Player actually plays the Segment—in fact, the hash can be calculated as a side-effect of reading and playing the Segment.

For the purpose of performance sizing and cryptographic analysis, here is an example $F^{-1}{}_m$. It is not a real $F^{-1}{}_m$:

$$\text{AES-D(AES-G}(K_{mmu}, \text{AES-HASH}(C3\|PBA_1\| \ldots \|PBA_n\|\text{Segment Hash})), \text{Bound Segment Key} + C4)$$

d. NAND Flash Considerations for SNAP Binding

Runtime Block Failure/Retirement—NAND Flash as a storage medium is prone to two main classes of runtime failures: Hard failures when a device catastrophically fails a program operation beyond the capacity of ECC, or fails a block erase operation due to degeneration of the die's oxide layer. This class of errors does not affect SNAP Binding since SNAP waits until the Flash memory controller reports that it has successfully programmed and verified all segment data before a key may be bound. Additionally, the usage pattern of a movie is such that once recorded and bound, there will be no program or erase operations performed on blocks containing movie data.

Soft failures—when the bit stored in a gate gets "flipped" from 0 to 1, or vice versa. These errors are frequently referred to as disturb errors as they are predominantly caused by program or even read activities in physically neighboring gates. Soft errors are particularly common with MLC flash, which has lead manufacturers to use Reed Solomon ECC typically capable of correcting 4 or more symbol errors (typically 8 or more bits per symbol) per 512 bytes. This enables the ECC to correct 4 random bit errors per 512 Bytes. It is not uncommon for modern MLC NAND Flash to employ 4 KByte pages arranged 64 pages per erase block, so ECC can theoretically correct up to 2048 concurrent random bit errors within a single erase block before it must be retired.

Wear Leveling Algorithms

In order to limit premature oxide layer wear due to frequent programming/erasure of high usage files, NAND Flash devices employ various "Wear Leveling" algorithms to ensure that data is written to the least used available erase block whenever possible. Since there is no "Seek Time" penalty, there is no significant disincentive to this method as long as data is not unnecessarily split between multiple erase blocks if it will fit into a single block.

SNAP takes full advantage of wear leveling functionality in that it further randomizes the PBA's used to store Movie Segment data, thus increasing each movie instance's uniqueness, as well as minimizing the risk of Soft Errors during playback. Since SNAP does not bind data or keys until it has been successfully programmed into a device, the presence of wear leveling does not directly affect SNAP at all.

Garbage Collection & SNAP Binding

Since NAND Flash can be programmed on a page-by-page basis, but must be erased in a block-wise manner, many manufacturers employ a system by which a memory controller in conjunction with Flash Translation Layer logic can perform multiple "partial page writes" within an erase block. This is done when data occupies less than all pages within an erase block. In the event the data is modified, the memory controller may write the new data to unused pages within the same erase block and simply mark the old pages as "garbage" rather than completely erasing the block and re-programming it (a far slower process). While methods and thresholds vary from vendor to vendor, eventually the block will be tagged for garbage collection where all valid data is written to a new "clean" block, and the garbage filled block is erased for re-use.

SNAP binding avoids interference with garbage collection by ensuring that a movie partition contains a sufficient number of "clean" erase blocks (containing no other data, either valid or garbage) to accommodate all movie data before programming. Additionally, once programmed, SNAP required that all erase blocks containing SNAP movie data be marked as "Write Protect", or "Read Only" in accordance with the manufacturers' specification. Due to the relatively large size of SNAP movie Segments, they may be expected to completely fill and span multiple erase blocks. If necessary, segments may be padded during pre-processing to ensure optimal compatibility with NAND Flash storage media.

4. Content Encryption a. Segment Encryption

SNAP/CPXM uses Blu-ray format for video. The encryption is slightly different than the encryption used on optical discs. SNAP uses AES in CTR mode. The CTR value for a given cipher block is:

$$\text{CTR} = \text{nonce} \oplus \text{block\#}$$

Where:
"block#" is the cipher block number within the segment. In other words, it is the byte offset of the cipher block within the segment divided by 16 (since cipher blocks are 128 bits). It is expanded with high-order $0_2$'s until it is a 128-bit number.

"nonce" is a one-way function of the segment key, as follows $$\text{nonce} = \text{AES-G}(K_s, C_{nonce})$$

$C_{nonce}$ is a confidential constant available to licensees.

b. Content Certificate

The SNAP Licensing Agency issues a unique Content Certificate for each instance of a movie that is downloaded. In addition to allowing a player to validate Movie Segment data it receives, SNAP uses the Content Certificate and its associated hash tables to direct a P2P client to download segments containing different watermarks according to the SNAP Striping scheme for the title. A Content Certificate lists the offsets of each Segment within a video object, and a hash for that Segment. Segment Hash tables are named ContentHashi.tbl, where i is the number of the associated Clip AV Stream in the User Area. The Content Certificate file named Content.cer, where x is the Title of the associated Movie instance in the User Area. The Content Certificate is stored in the User Area, in the \SNAP\movie\SNAP directory, where movie is the directory name of the movie in the User Area. An identical duplicate of the Content Certificate is stored in the \SNAP\movie\SNAP\BACKUP directory.

The format of the Content Certificate is as follows:

| Byte OFFSET | 0 | 1 | 2 | 3 | 4 | 5 | 6 | 7 |
|---|---|---|---|---|---|---|---|---|
| 0 | Certificate Type | | | | | | | |
| 1-6 | Content ID | | | | | | | |

-continued

| Byte OFFSET | 0 | 1 | 2 | 3 | 4 | 5 | 6 | 7 |
|---|---|---|---|---|---|---|---|---|
| 7 | Transaction Type | | | | | | | |
| 8-11 | Transaction ID | | | | | | | |
| 12-27 | Retail ID | | | | | | | |
| 28-43 | Media ID or Null | | | | | | | |
| 44-45 | CRL Version Number | | | | | | | |
| 46-47 | Hash of Usage Rules Table | | | | | | | |
| 48 | Number of Clip AV Streams (0-N) | | | | | | | |
| 49-65 | Hash of Clip AV Stream #0 Hash Table | | | | | | | |
| 66-81 | Hash of Clip AV Stream #1 Hash Table | | | | | | | |
| ... | ... | | | | | | | |
| | Hash of Clip AV Stream #N Hash Table | | | | | | | |
| | Signature Data | | | | | | | |

Where the fields have the following meaning:
"Certificate Type"—Identifies data structure for the Content Certificate.
"Content ID"—Is the atomic identifier for the content certificate.
"Transaction Type"—Identifies the transaction as purchase or rent transaction or subscription.
"Transaction ID"—Is the retail purchase or rent transaction or subscription identifier.
"Media ID"—The Media ID of the SD card that the Content Certificate is bound to. If the Device's Media ID is present, then the movie instance and/or Content Certificate may not be transferred to another authenticated device via an un-tethered Move or Copy, as in the case of rental content. If no Media ID is present, then the movie instance may be moved or copied to another authenticated device pursuant to the title's usage rules. This would be the case for sell-through content.
"Retail ID"—Is the licensees that sold the content.
"CRL Version Number"—The current Content Revocation List version number at the time the Content Certificate is generated.
"Hash of Usage Rules Table"—AES-H (Usage Rules Table)
"Number of Clip AV Streams"—The number of Clip AV Streams in the selected title interpreted most significant byte first. If this number is N, then the length of the file is 2+N*16. N entries follow, each entry having:
"Hash of Clip AV Stream #N Hash Table". Each Clip AV Stream file has a SNAP Hash Table associated with it containing the individual hashes of each SNAP Segment within the Clip AV Stream. The Hash of each SNAP Hash table is stored in the Content Certificate as AES-H (SNAP Hash Table for Clip AV Stream #N)
"Signature Data"—Each Content Certificate is cryptographically signed such and shall be verified by the host device.

c. Content Revocation List

The content revocation list is a list of content certificates which correspond to unauthorized content. It is in the format defined by AACS, although it is signed by the SNAP Licensing Agency instead of the AACS Licensing Agency. It is named CRL.bin and is stored in the SNAP directory in the Protected Area. If the content revocation list is missing, corrupt, or at a level lower than the level demanded by a movie's Content Certificate, the player shall not play the movie. Likewise, if the a movie's Content ID is on the content revocation list, a player shall not play the movie.

d. Move and Copy

SNAP Binding enables content owners to specify if content may be moved or copied from one authenticated SNAP NAND Device to another authenticated SNAP NAND Device. A SNAP device can also be joined to a Domain. This functionality is enabled with business rules that are stored in CCI during content preparation/encryption. Content Certificated are used to protect these business rules.

These functions operate either tethered or un-tethered to a license server.
1. Media ID can be placed in the Content Certificate at transaction time. If included, content can only be copied at with a tethered connection.
2. The system can deliver multiple Content Certificates at transaction time. Each Content Certificate can have different usage rules which are stored in CCI.
3. A Domain Certificate allows the player to accept multiple Devices (Device IDs) in a domain e. Bound Key Bundle Licensed Players obtain Segment Keys, allowing them to decrypt Segments, by reading and processing Bound Key Bundles. A Bound Key Bundle lists the offsets of each Segment within a video object, and a Bound Segment Key for that segment. Bound Key Bundle files are named bound-i.keys, where i is the number of the associated Clip AV Stream in the User Area. The Bound Key Bundle files are stored in the Protected Area, in the \SNAP\movie\SNAP directory, where movie is the directory name of the movie in the User Area. Bound Key Bundle files have identical duplicates in the \SNAP\movie\SNAP\BACKUP directory.

The format of the Key Bundle File is as follows:

| Byte OFFSET | 0 | 1 | 2 | 3 | 4 | 5 | 6 | 7 |
|---|---|---|---|---|---|---|---|---|
| 0 | Number of Segments | | Byte Offset of Segment #0 | | | | | |
| 8 | Bound Segment Key for Segment #0, Bytes 0-7 | | | | | | | |
| 16 | Bound Segment Key for Segment #0, Bytes 8-15 | | | | | | | |
| 24 | Byte offset of Segment #1 | | | | | BSK#1 Bytes 0-1 | | |
| 32 | Bound Segment Key for Segment #1, Bytes 2-9 | | | | | | | |
| 40 | Bound Segment Key for Segment #1, Bytes 10-15 | | | | | | | |
| ... | ... | | | | | | | |
| N-22 | Byte Offset of Segment #N-1 | | | | | BSK#N-1 Bytes 0-1 | | |
| N-14 | Bound Segment Key for Segment #N-1, Bytes 2-9 | | | | | | | |
| N-6 | Bound Segment Key for Segment #N-1, Bytes 10-15 | | | | | | | |

Where the fields have the following meaning:
"Number of Segments"—the number of Segments in associated Clip AV Stream file, interpreted most significant byte first. If this number is N, then the length of the file is 2+N*22. N entries follow, each entry having:
"Byte Offset". The byte offset of the Segment in the associated Clip AV Stream file, interpreted most significant byte first.
"Bound Segment Key". The Bound Segment Key for that Segment.

E. Content Preparation Use Case

FIG. 6-2 illustrates the Content Preparation Use Case related to the SNAP/IBM content protection system. The content delivery service security policies and protocols are out of scope for this document.
1. Plain text content (movies) are delivered to the content vault. The content vault shall be built to the same standards as the KGF cage.
2. Content is parsed into SNAP Segments, encrypted and hashed.
3. Keys used to encrypt the segments are generated by the IBM 4764 Cryptographic Coprocessor in the content vault.
4. The encryption equipment is not connected to any outside network, office or to the internet.
5. Encrypted movie segments and keys are moved from the encryption servers to origin servers via USB drives.
6. The origin servers are firewall protected. On both sides of the firewall, are managed intrusion detection appliances and managed vulnerability scanners.
7. Via the origin server, encrypted content keys are published to the SNAP Key Server.
8. Via the origin server, encrypted and hashed movie segments are published to the Content Delivery.

F. Download Use Case

Below is the download preparation Use Case related to the SNAP/IBM content protection system. Although the content delivery service security policies and protocols are out of scope for this document, some of the basics are included. The following is illustrated in FIG. 6-2.
1. After a movie is purchased or rented, the commerce server generates a guid and adds it to a URL. The guid is calculated by
2. AES(nonce||SKU, key)=guid
3. The player presents this guid to the SNAP Key Server to authenticate to receive a key bundle for a given SKU
4. Over HTTPS, the encrypted key bundle and hash table are downloaded to the player
5. The hash table is used to identify which segments the player shall to download.
6. The key bundle is programmed to the NAND Memory Product protected area.
7. Encrypted keys and movie segments are bound and programmed to the NAND Memory Product user area. See Segment Binding in the SNAP Functions Section of this document above.

G. Playback Use Case

SNAP's anti-cloning technology depends on Licensed Players checking the physical properties of the Flash Card during playback of the movie. If there is a mismatch, the Licensed Player shall stop play. Here are the Use Cases involved:

1. Establish Secure Session Use Case

1. The Licensed Player performs a digital signature check of the Card Controller to make sure that the card controller is a licensed device.
2. The Licensed Player performs the IBM CES protocol to establish a secure session and to obtain access to the Protected Area of the Flash Card.
3. The Licensed Player reads the \SNAP\hMKB.bin file in the Protected Area and calculates $K_{hu}$.
4. The Licensed Player reads and decrypts \SNAP\FOCODE.SEL and \SNAP\FHCODE.SEL in the Protected Area. If the "Check String" field in either file is invalid, the Licensed Player shall abort play.
5. The Licensed Player reads \SNAP\HAC.bin in the Protected Area and the Physical Defect Map from the SD Card.
6. The Licensed Player decrypts and executes the selected firmware for $F_o$ and $F^{-1}{}_h$. If this HAC verification fails, the player shall abort play.
7. If there is more than one movie on the SD Card, the Licensed Player allows the user to select which movie he wants to play.
8. The Licensed Player reads the \SNAP\movie\SNAP\mMIKB.bin file for the selected movie in the User Area and calculates $K_{mmu}$.
9. The Licensed Player reads the \SNAP\movie\SNAP\FMCODE.SEL in the Protected Area. If the Protected Area does not have the movie sub-directory, the Licensed Player shall search for the matching Protected Area directory and rename it, as described previously.
10. If the Check String field in the FMCODE.SEL file is invalid, the player shall abort play.
11. The Licensed Player reads a Bound Key Bundle file, \SNAP\movie\SNAP\boundi.keys in the Protected Area.
12. The Licensed Player plays Bound Segments as directed by the movie navigation. It shall use PBAs, not LBAs, to access the Segments. The Licensed Player uses the selected $F^{-1}{}_m$ to calculate the Segment Key for each Bound Segment. The PBAs used in the $F^{-1}{}_m$ shall be the same PBAs used for access. Furthermore, the player will verify that all Segment PBAs are not marked as defective in the Physical Defect Map and abort playback if this is true. For smooth playback, the Licensed Player is permitted to cache and/or pre-calculate Segment Keys.

2. Cell Level Bad Block Forgery Detection and Playback Control Use Case

Perform Cell Level Bad block Forgery Detection and Playback Control which involves the following steps. This case test assumes that bad blocks are all in a previously erased state and are therefore programmable.
1. Perform Program/Verify (a NAND Command) the entire bad block. The program function typically consists of writing all 0's to all cells of the selected erase block. Any cell failing to properly record the appropriate value is said to have suffered a program failure.
2. The player compares the results of the Program/Verify to that which is recorded in the Device Log. If the results are different and beyond the threshold, stop playback.
3. Perform Erase/Verify (a NAND Command) of the bad block. This function should reset all cells to the 0 state. Following the verify step, any cell still containing a 1 charge is said to have suffered an erase failure.
4. The player compares the results of the Erase/Verify to that which is recorded in the Device Log. If the results are different and beyond the threshold, stop playback.

3. Firmware Clone Detection and Playback Control Test Use Case

To detect a firmware indirection attack, a player will perform a timing test. There are several timing test that can be performed.

Player Timing Test
1. Makes multiple internal data moves between pages known to contain hard failed, ECC correctable bit errors. For example n erased blocks are internally moved; partially program block A, internal move block A to block B, partially program block B, internal move block B to block C, etc.
2. Compare the results on step 1 above to a value stored in the HAC. If the difference is greater than x standard deviations, stop playback. This timing test is hard to beat because internal data movies are 8% faster than a Read access that involves a controller to perform a look up in an indirection table and a subsequent red of the cloned movie and ECC data. This fact requires fast memory and more computational power to simulate.

4. Hardware Clone Detection and Playback Control Test Use Case

To detect cloned hardware, a player will perform:
1. Timed Event Test
a. Monitor NAND Flash products current loads under specific NAND events and the timing of events (Waveform). In this case, an Internal Move Data event described in the Firmware Clone Detection Test.
b. Compare the observed Waveform against a Waveform encrypted in the HAC.
c. Apply threshold logic and business rules.
d. If the Waveforms do not match, playback is stopped.
2. Hot Plug Power Test
a. SNAP Power and Timing compliance testing starts when a USB device is hot-plugged into a Host Device.
b. After the initial inrush (<10 µsec.) to charge the device's internal bypass capacitor, the device has 20 µsec for port configuration or the USB Host resets it and tries again.
c. An attacker's clone with extra SRAM for indirection will be detected by our power and timing signature validation.
d. Apply threshold logic and business rules.
e. If the Waveforms do not match, playback is stopped.

CONCLUSION

This concludes the description of the preferred embodiments of the present disclosure. In summary, a method and apparatus for playing back a media content instance from a storage device is described.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto. The above specification, examples and data provide a complete description of the manufacture and use of the media player.

What is claimed is:

1. A method of playing back a media content instance according to at least one of a plurality of microcode variants, each of the plurality of microcode variants for performing an associated microcode function, the method comprising:
  downloading, by a playback device communicatively coupled to a storage device the media content instance from an online server, the media content instance comprising a sequence of encrypted media content segments, each encrypted media content segment encrypted by a different segment key than other of the encrypted media content segments and representing a different temporal portion of a content title and selected from differing ones of a plurality of unencrypted versions of the temporal portion of the content title, each encrypted media content segment decryptable by the segment key associated with the encrypted media content segment, wherein the media content instance is downloaded with renewed microcode variants and respective indexes, the renewed microcode variants comprising a first renewed microcode variant and a second renewed microcode variant and the respective indexes identifying the associated renewed microcode variant for replacing an originally provisioned one of the plurality of microcode variants for execution to enable playback of the media content instance;
  decrypting a defect map with the second renewed microcode variant, and matching the decrypted defect map to an actual defect map of the storage device;
  validating the storage device at least in part by matching the decrypted defect map to the actual defect map of the storage device;
  generating the segment key for each encrypted media content segment at least in part by the playback device executing the first renewed microcode variant identified by the associated index;
  decrypting each of the encrypted media content segments of the media content instance according to the generated segment key associated with the respective encrypted media content segment; and
  playing, with the playback device, the decrypted media content segments.

2. The method of claim 1, wherein playing, with the playback device, the decrypted media content segments further comprises:
  generating a locator for each media content segment of the media content instance; and
  assembling the media content segments of the media content instance according to the locator.

3. The method of claim 1, wherein the storage device is communicatively coupled to the online server via the playback device.

4. The method of claim 1, wherein:
  the execution of the second renewed microcode variant is performed by both the storage device and the playback device.

5. The method of claim 1, wherein the segment keys are stored in a secure memory of the storage device.

6. The method of claim 1, wherein at least one of the renewed microcode variants is specific to the content title.

7. The method of claim 1, wherein:
  the segment keys generated for each of the encrypted media content segments are generated from a plurality media keys received from the online server.

8. The method of claim 1, wherein the renewed microcode variants are specific to the storage device.

9. The method of claim 1, wherein:
  the originally provisioned microcode variants are pre-installed in the playback device communicatively coupled to the storage device, the playback device generating each segment key and decrypting each of the encrypted media content segments.

10. The method of claim 1, wherein the originally provisioned microcode variants are stored on the storage device.

11. The method of claim 1, wherein:
the originally provisioned microcode variants are executed by a processor of a playback device communicatively coupled to the storage device; and
the renewed microcode variants is are instantiated as stateless so as to be removed from processor memory when playback of the media content instance is stopped.

12. The method of claim 1, wherein:
the method further comprises:
deriving a device hardware authentication code with the decrypted defect map and matching the derived device hardware authentication code with an existing hardware authentication code;
validating the storage device at least in part by matching the decrypted defect map to the actual defect map of the storage device comprises:
validating the storage device at least in part by matching the decrypted defect map to the actual defect map of the storage device and matching the device hardware authentication code with an existing hardware authentication code.

13. An apparatus for playing back a media content instance, according to at least one of a plurality of processor microcode variants, each of the plurality of processor microcode variants for performing an associated microcode function, comprising:
a playback device, comprising a processor communicatively coupled to a processor memory, the memory storing processor instructions for:
downloading, by the playback device communicatively coupled to a storage device, the media content instance from an online server, the media content instance comprising an assembly of media content segments, each media content segment comprising differing ones of a plurality of versions of a temporal portion of a content title, and each media content segment encrypted by a different segment key than other of the encrypted media content segments and decryptable by the segment key associated with the encrypted media content segment, wherein the media content instance is downloaded with renewed processor microcode variants and respective indices, the renewed microcode variants comprising a first renewed processor microcode variant and a second renewed processor microcode variant, wherein the respective indices identify the associated renewed processor microcode variant for replacing an originally provisioned one of the plurality of processor microcode variants for execution to enable playback of the media content instance;
decrypting a defect map with the second renewed processor microcode variant, and matching the decrypted defect map to the actual defect map of the storage device;
validating the storage device at least in part by matching the decrypted defect map to the actual defect map of the storage device;
generating, the segment key for each encrypted media content segment at least in part by the playback device executing the first renewed processor microcode identified by the associated index;
decrypting each of the encrypted media content segments of the media content instance according to the generated segment key associated with the respective encrypted media content segment; and
playing, with the playback device, the decrypted media content segments.

14. The apparatus of claim 13, wherein instructions for playing, with the playback device, the decrypted media content segments of the media content instance further comprise instructions for:
generating a locator for each media content segment of the media content instance; and
assembling the media content segments of the media content instance according to the locator.

15. The apparatus of claim 13, wherein:
the execution of the second renewed processor microcode variant is performed by both the storage device and the playback device.

16. The apparatus of claim 13, wherein:
the each of the generated segment keys are generated from a plurality media keys received from the online server.

17. The apparatus of claim 13, wherein the originally provisioned processor microcode variant is stored on the storage device.

18. The apparatus of claim 13, wherein:
the renewed processor microcode variants are instantiated as stateless so as to be removed from the processor memory when playback of the media content instance is stopped.

19. The apparatus of claim 13, wherein at least one of the first renewed processor microcode variant and the second renewed processor microcode variant is specific to the content title.

20. The apparatus of claim 13, wherein at least one of the first renewed processor microcode variant and the second renewed processor microcode variant is specific to the storage device.

21. The apparatus of claim 13, wherein:
the processor instructions further comprise processor instructions for:
deriving a device hardware authentication code with the decrypted defect map and matching the derived device hardware authentication code with an existing hardware authentication code;
the processor instructions for validating the storage device at least in part by matching the decrypted defect map to the actual defect map of the storage device comprise processor instructions for:
validating the storage device at least in part by matching the decrypted defect map to the actual defect map of the storage device and matching the device hardware authentication code with an existing hardware authentication code.

* * * * *